US012598022B2

(12) United States Patent
Hu et al.

(10) Patent No.: US 12,598,022 B2
(45) Date of Patent: Apr. 7, 2026

(54) NOMINAL PACKET PADDING VALUE INDICATION METHOD, DETERMINING METHOD, AND COMMUNICATION APPARATUS

(71) Applicant: HUAWEI TECHNOLOGIES CO., LTD., Shenzhen (CN)

(72) Inventors: Mengshi Hu, Shenzhen (CN); Jian Yu, Shenzhen (CN); Chenchen Liu, Shenzhen (CN); Ming Gan, Shenzhen (CN); Ju Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 18/349,510

(22) Filed: Jul. 10, 2023

(65) Prior Publication Data

US 2023/0353274 A1 Nov. 2, 2023

Related U.S. Application Data

(63) Continuation of application No. PCT/CN2022/070798, filed on Jan. 7, 2022.

(30) Foreign Application Priority Data

Jan. 11, 2021 (CN) .......................... 202110031666.3

(51) Int. Cl.
*H04L 1/00* (2006.01)
(52) U.S. Cl.
CPC .................................. *H04L 1/0008* (2013.01)

(58) Field of Classification Search
CPC ...................................................... H04L 1/0008
See application file for complete search history.

(56) References Cited

U.S. PATENT DOCUMENTS

| 9,769,703 B2 * | 9/2017 | Liu ........................ H04W 16/14 |
|---|---|---|
| 10,148,460 B2 * | 12/2018 | Blanksby .............. H04L 1/0083 |
| 10,548,146 B2 * | 1/2020 | Chun .................... H04W 72/21 |
| 11,128,505 B2 * | 9/2021 | Chen ..................... H04L 5/0094 |
| 11,140,745 B2 * | 10/2021 | Srinivasa .............. H04W 80/02 |

(Continued)

FOREIGN PATENT DOCUMENTS

| CN | 111200480 A | 5/2020 |
|---|---|---|
| JP | 2017529757 A | 10/2017 |

OTHER PUBLICATIONS

Mengshi Hu et al:"EHT PPE Thresholds Field", IEEE 802.11-20/1847r0, Huawei, Nov. 10, 2020, total 14 pages.

(Continued)

*Primary Examiner* — Guang W Li

(74) *Attorney, Agent, or Firm* — HAUPTMAN HAM, LLP

(57) ABSTRACT

A feeding network, an antenna, an antenna system, a base station, and a beam forming method. The antenna includes an array antenna, a feeding network, and an antenna port. The array antenna includes a plurality of radiating elements. Each output of each feeding network is connected to at least one radiating element in the array antenna. Each input of each feeding network is connected to the antenna port. Each feeding network has one input and two outputs, and one of the two outputs includes a phase shifter. The phase shifter has a first operating state to increase the coverage space of beam forming.

16 Claims, 12 Drawing Sheets

(56)            References Cited

U.S. PATENT DOCUMENTS

| | | | |
|---|---|---|---|
| 2016/0227437 A1* | 8/2016 | Blanksby | H04L 1/00 |
| 2017/0012683 A1* | 1/2017 | Bharadwaj | H04L 5/0007 |

OTHER PUBLICATIONS

Japanese Office Action issued in corresponding Japanese Application No. 2023-541999, dated Sep. 2, 2024, pp. 1-6.
Rui Cao et al:"EHT Pre-FEC Padding and Packet Extension." IEEE 802.11-20/1331r0, Aug. 26, 2020. total 18 pages.
Mengshi Hu et al:"EHT PPE Thresholds Field." IEEE 802.11-20/xxxxr0, Nov. 10, 2020. total 14 pages.
IEEE P802.11ax/D8.0, Oct. 2020. Draft Standard for Information technology—Telecommunications and information exchange between systems Local and metropolitan area networks—Specific requirements Part 11: Wireless LAN Medium Access Control (MAC) and Physical Layer (PHY) Specifications. Amendment 1: Enhancements for High Efficiency WLAN. total 820 pages.
802 11 Working Group of the LAN/MAN Standards Committee of the IEEE Computer Society: "Draft Standard for Information technology—Tele-communications and information exchange between systems Local and metropolitan area networks—Specific requirements Part 11: Wireless LAN Medium Access Control (MAC) and Physical Layer (PHY) Specifications Amendment 1: Enhancements for High Efficiency", IEEE Draft; Draft P802.11AX_D7.0, IEEE-SA, Piscataway, NJ USA, vol. 802.11ax drafts, No. D7.0, Sep. 2, 2020 (Sep. 2, 2020).
Edward Au: "Draft P802.11 be_D0.4_redline_compared_to_D0.3.pdf", IEEE Draft Wgds; 941084550011, IEEE-SA IMEET Central Piscataway, NJ USA, vol. 802.11—Editorial Mar. 1, 2021 (Mar. 1, 2021), pp. 1-605, XP068255957.
Extended European Search Report issued in corresponding European Application No. 22736606.9, dated Apr. 25, 2024, pp. 1-8.
India Office Action issued in corresponding India Application No. 202317049860, dated Feb. 4, 2025, pp. 1-7.
Youhan Kim:"D4.0 Comment Resolution-Part 4", IEEE 802.11-19//1226r0,2019-7-16, total 10 pages.
Search Report and Written Opinion issued in corresponding Singapore Patent Application No. 11202305293X, dated Feb. 21, 2026, pp. 1-7.

* cited by examiner

Wireless access point
(AP)

Station 1                    Station 2
(STA1)                       (STA2)

| ... | Physical layer packet extension thresholds present subfield (PPE thresholds present subfield) | ... | Nominal packet padding subfield (nominal packet padding subfield) | ... |
| --- | --- | --- | --- | --- |

FIG. 4

| Element (element) | Length (length) | Element identifier extension (element ID Extension) | High efficiency media access control capabilities information (HE MAC capabilities information) | High efficiency physical layer capabilities information (HE PHY capabilities information) | Supported HE-MCS And NSS Set | Physical layer packet extension thresholds (optional) (PPE Thresholds) |
| --- | --- | --- | --- | --- | --- | --- |
| 1 | 1 | 1 | 6 | 11 | 4, 8, or 12 | Variable |

FIG. 5

| | Number of space-time streams (NSTS) | Resource unit index bitmask (RU index bitmask) | Physical layer packet extension thresholds information (PPE thresholds Info) | Physical layer packet extension padding (PPE Pad) |
| --- | --- | --- | --- | --- |
| Quantity of bits | 3 | 4 | Variable | 0-7 |

FIG. 6

| PPET16 NSTS1 RUm | PPET8 NSTS1 RUm | ... | PPET16 NSTS1 RUM | PPET8 NSTS1 RUM | ... | PPET16 NSTS$n$ RUM | PPET8 NSTS$n$ RUM |
|---|---|---|---|---|---|---|---|

Quantity of bits

| 3 | 3 | | 3 | 3 | | 3 | 3 |
|---|---|---|---|---|---|---|---|

| PPET16 NSTSn RUb | Physical layer packet extension thresholds (PPET) subfield of 16 µs corresponding to a number of space-time streams (NSTS) of n and a resource unit (RU) with a sequence number b |
|---|---|

| PPET8 NSTSn RUb | Physical layer packet extension thresholds (PPET) subfield of 8 µs corresponding to the number of space-time streams (NSTS) of n and the resource unit (RU) with the sequence number b |
|---|---|

FIG. 7

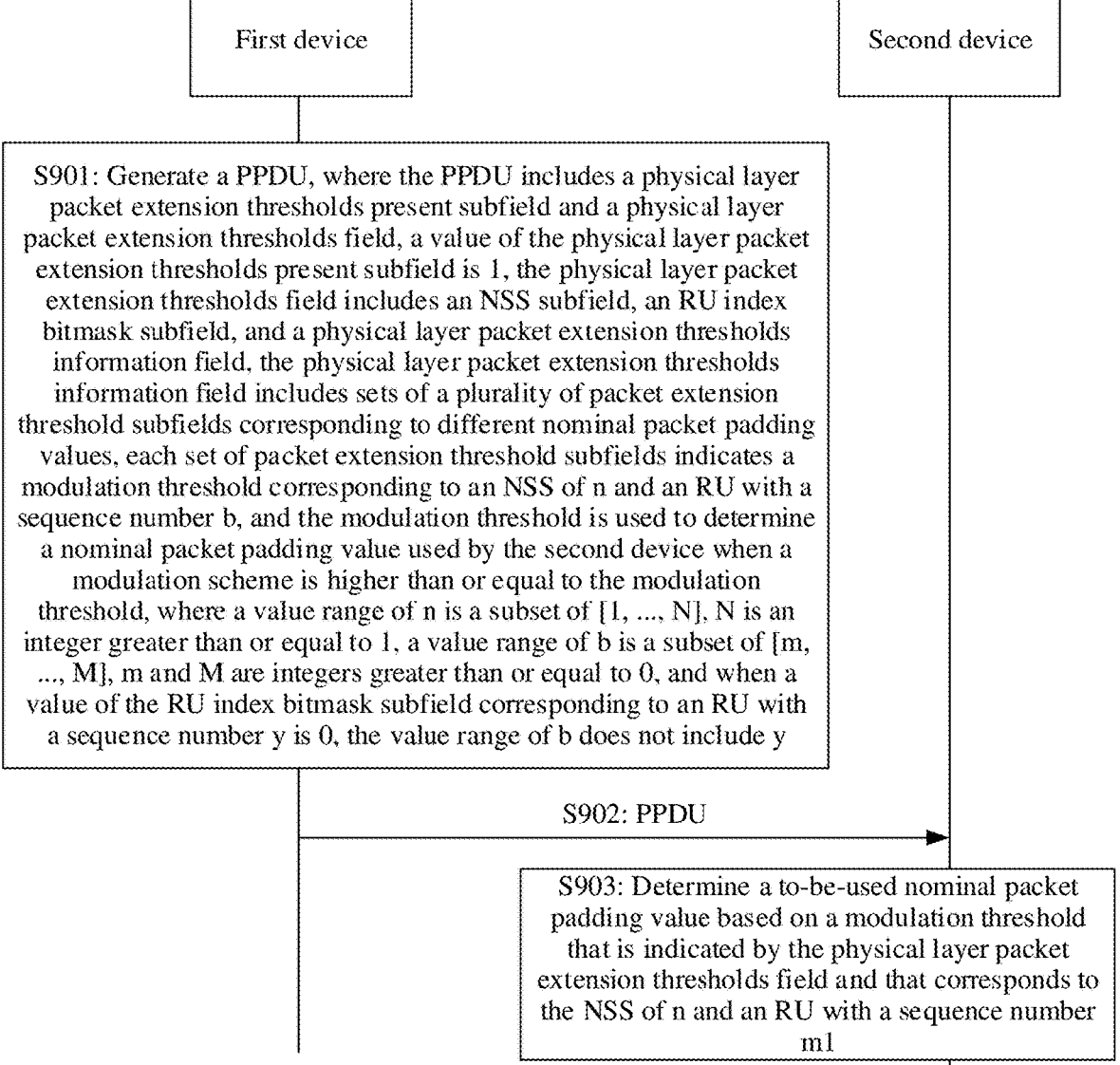

First device

Second device

S901: Generate a PPDU, where the PPDU includes a physical layer packet extension thresholds present subfield and a physical layer packet extension thresholds field, a value of the physical layer packet extension thresholds present subfield is 1, the physical layer packet extension thresholds field includes an NSS subfield, an RU index bitmask subfield, and a physical layer packet extension thresholds information field, the physical layer packet extension thresholds information field includes sets of a plurality of packet extension threshold subfields corresponding to different nominal packet padding values, each set of packet extension threshold subfields indicates a modulation threshold corresponding to an NSS of n and an RU with a sequence number b, and the modulation threshold is used to determine a nominal packet padding value used by the second device when a modulation scheme is higher than or equal to the modulation threshold, where a value range of n is a subset of [1, ..., N], N is an integer greater than or equal to 1, a value range of b is a subset of [m, ..., M], m and M are integers greater than or equal to 0, and when a value of the RU index bitmask subfield corresponding to an RU with a sequence number y is 0, the value range of b does not include y

S902: PPDU

S903: Determine a to-be-used nominal packet padding value based on a modulation threshold that is indicated by the physical layer packet extension thresholds field and that corresponds to the NSS of n and an RU with a sequence number m1

FIG. 9

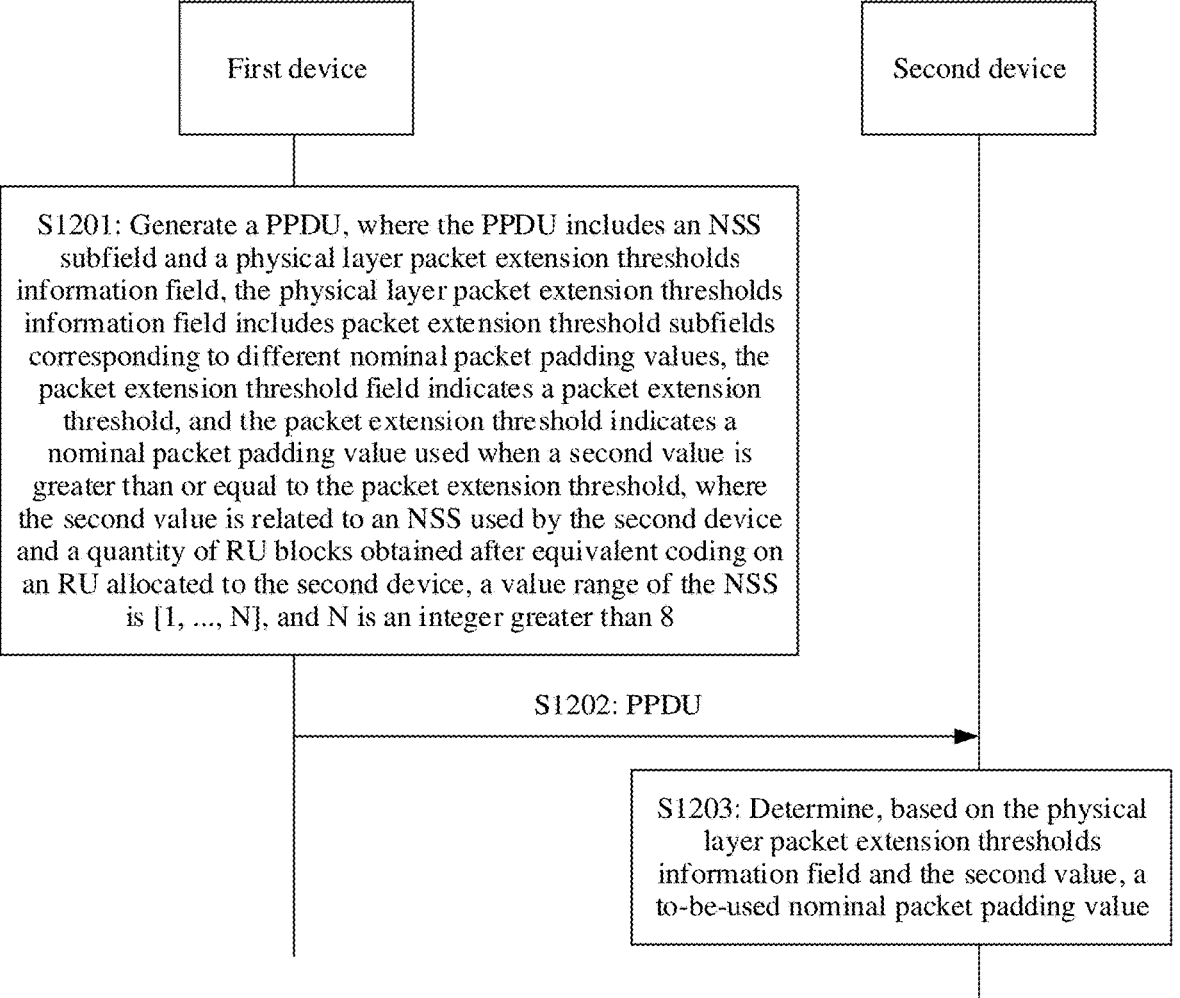

First device

Second device

S1201: Generate a PPDU, where the PPDU includes an NSS subfield and a physical layer packet extension thresholds information field, the physical layer packet extension thresholds information field includes packet extension threshold subfields corresponding to different nominal packet padding values, the packet extension threshold field indicates a packet extension threshold, and the packet extension threshold indicates a nominal packet padding value used when a second value is greater than or equal to the packet extension threshold, where the second value is related to an NSS used by the second device and a quantity of RU blocks obtained after equivalent coding on an RU allocated to the second device, a value range of the NSS is [1, ..., N], and N is an integer greater than 8

S1202: PPDU

S1203: Determine, based on the physical layer packet extension thresholds information field and the second value, a to-be-used nominal packet padding value

FIG. 12

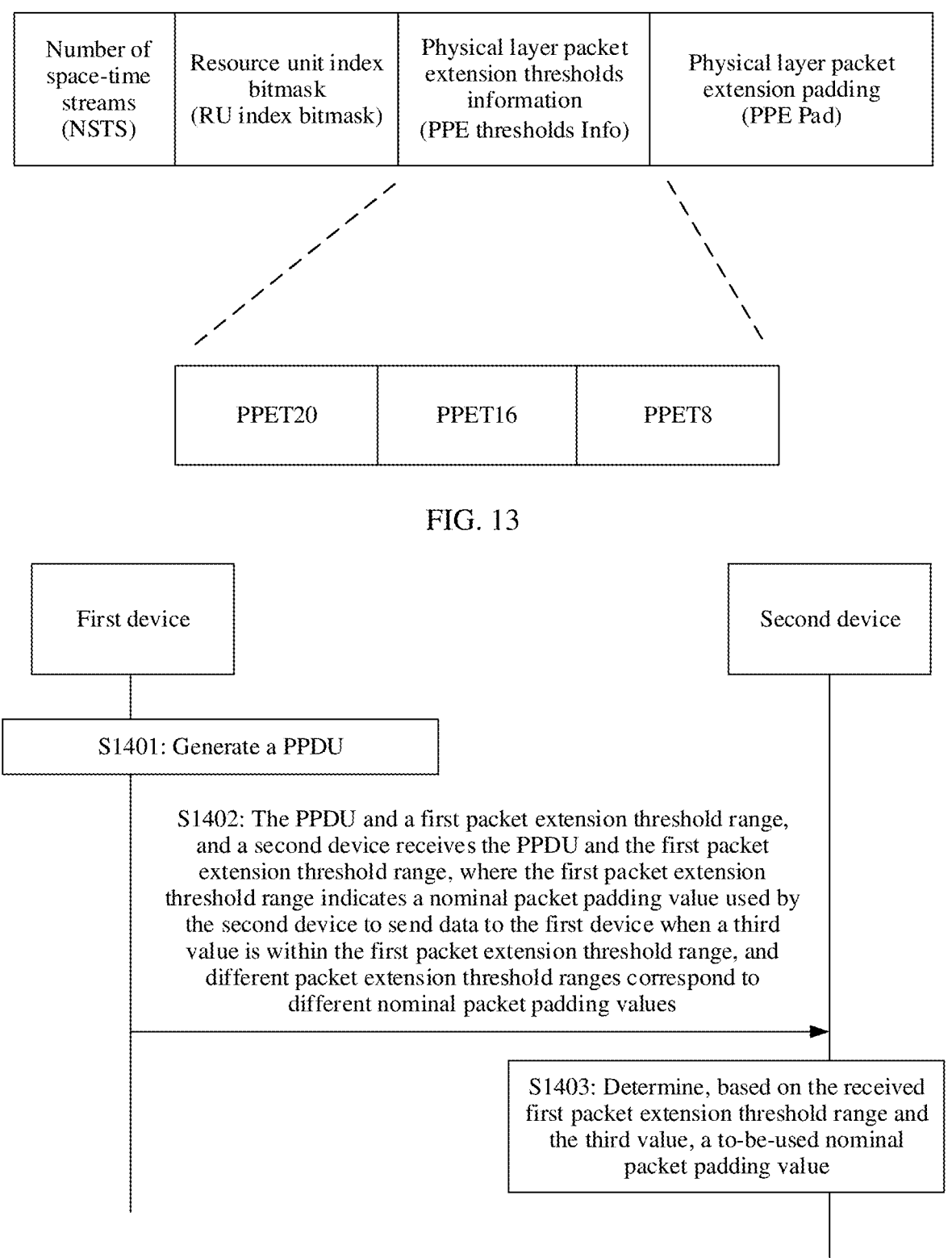

| Number of space-time streams (NSTS) | Resource unit index bitmask (RU index bitmask) | Physical layer packet extension thresholds information (PPE thresholds Info) | Physical layer packet extension padding (PPE Pad) |
|---|---|---|---|

| PPET20 | PPET16 | PPET8 |
|---|---|---|

FIG. 13

First device

Second device

S1401: Generate a PPDU

S1402: The PPDU and a first packet extension threshold range, and a second device receives the PPDU and the first packet extension threshold range, where the first packet extension threshold range indicates a nominal packet padding value used by the second device to send data to the first device when a third value is within the first packet extension threshold range, and different packet extension threshold ranges correspond to different nominal packet padding values S1403: Determine, based on the received first packet extension threshold range and the third value, a to-be-used nominal packet padding value

FIG. 14

NOMINAL PACKET PADDING VALUE INDICATION METHOD, DETERMINING METHOD, AND COMMUNICATION APPARATUS

CROSS-REFERENCE TO RELATED APPLICATIONS

This application is a continuation of International Application No. PCT/CN2022/070798, filed on Jan. 7, 2022, which claims priority to Chinese Patent Application No. 202110031666.3, filed on Jan. 11, 2021. The disclosures of the aforementioned applications are hereby incorporated by reference in their entireties.

BACKGROUND

To ensure that a receiver has sufficient processing time for a data packet received from a transmitter, the receiver indicates a modulation threshold corresponding to a number of space-time streams (number of spatial and time stream, NSTS)/a number of space-time streams (number of spatial and time stream, NSTS) and a resource unit (resource unit, RU) size. The transmitter determines, based on the modulation threshold, a to-be-used nominal packet padding value. Then, the transmitter determines an actual padding value based on the nominal packet padding value, to pad, based on the actual padding value, a packet extension that is included in the data packet sent to the receiver. Data in the packet extension is not used by the receiver. Therefore, other data is processed within the processing time of the packet extension, to ensure that the receiver has sufficient processing time.

In response to one or more of an NSTS, an RU size, and a modulation scheme used by a transmit end being different, corresponding minimum processing time used by a receive end is also different. In other words, corresponding nominal packet padding values is different. Currently, a nominal packet padding value corresponding to each NSTS, RU, and modulation threshold is provided in an exhaustive or traversal manner. As an NSTS supported by a device increases, and an RU size increases, providing the nominal packet padding value corresponding to each NSTS, RU, and modulation threshold in an exhaustive formula or traversal manner causes large overheads.

SUMMARY

Embodiments described herein provide a nominal packet padding value indication method, a determining method, and a communication apparatus, to reduce overheads for indicating a nominal packet padding value, and flexibly indicate a nominal packet padding value corresponding to each NSTS and each RU size.

According to a first aspect, a nominal packet padding value indication method is provided. The method is performed by a first communication apparatus. The first communication apparatus is a communication device or a communication apparatus, for example, a chip system, that supports the communication device to implement a function used in the method. The following description uses an example in which the communication device is a first device. The first device is an AP. The method includes the following steps.

A first device generates a physical layer protocol data unit (physical protocol data unit, PPDU), and sends the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold. A value range of n is a subset of $[1, \ldots, N]$, and N is an integer greater than or equal to 1. A value range of b is a subset of $[m, \ldots, M]$, and m and M are integers greater than or equal to 0. In response to a value of the RU index bitmask subfield corresponding to an RU with an index y being 0, the value range of b does not include y.

In a packet extension threshold subfield set that corresponds to a same nominal packet padding value, that the value of the RU index bitmask subfield corresponding to the RU with the index y is 0 indicates that a modulation threshold corresponding to the NSS of n and the RU with the index y is a modulation threshold corresponding to an NSTS of n and an RU with an index m1, where m1 is a smallest index in indexes that correspond to a bit being 1 in the RU index bitmask subfield and that are greater than y; or m1 is a largest index in indexes that correspond to a bit being 1 in the RU index bitmask subfield and that are less than y.

In this solution, the modulation threshold corresponding to the NSS of n and the RU with the index y is the modulation threshold corresponding to the NSS of n and the RU with the index m1. That is, the modulation threshold corresponding to the NSS of n and the RU with the index y is indicated by using a packet extension threshold subfield, where the packet extension threshold subfield indicates the modulation threshold corresponding to the NSS of n and the RU with the index m1. Therefore, the physical layer packet extension thresholds information field omits the packet extension threshold subfield indicating the modulation threshold corresponding to the NSS of n and the RU with the index y, and still indicates, by using the packet extension threshold subfield indicating the modulation threshold corresponding to the NSS of n and the RU with the index m1, the modulation threshold corresponding to the NSS of n and the RU with the index y. In other words, a modulation threshold corresponding to an RU is indicated without traversing all RUs of different sizes. In this way, overheads of the physical layer packet extension thresholds field are reduced.

According to a second aspect, a nominal packet padding value determining method is provided. The method is performed by a second communication apparatus. The second communication apparatus is a communication device or a communication apparatus, for example, a chip system, that supports the communication device to implement a function used in the method. The following description uses an example in which the communication device is a second device. The second device is a STA. The method includes the following steps.

A second device receives a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold. A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the value range of b does not include y.

The second device determines, based on a modulation threshold that corresponds to the NSS of n and an RU with an index m1 and that is indicated by the physical layer packet extension thresholds field, a modulation threshold corresponding to the NS S of n and the RU with the index y, where m1 is a smallest index in indexes that correspond to a bit being 1 in the RU index bitmask subfield and that are greater than y; or m1 is a largest index in indexes that correspond to a bit being 1 in the RU index bitmask subfield and that are less than y.

Corresponding to the solution provided in the first aspect, although the PPDU sent by the first device to the second device does not include a packet extension threshold subfield set indicating the modulation threshold corresponding to the NSS of n and the RU with the index y, the second device still determines the modulation threshold corresponding to the NSS of n and the RU with the index y. For example, the second device determines, based on the modulation threshold corresponding to the NSS of n and the RU with the index m1, the modulation threshold corresponding to the NSS of n and the RU with the index y. A condition that m1 is to meet is: m1 is a smallest index in indexes that correspond to a bit being 1 in the RU index bitmask subfield and that are greater than y; or m1 is a largest index in indexes that correspond to a bit being 1 in the RU index bitmask subfield and that are less than y. To be specific, in response to determining that m1 that meets the condition existing, the second device determines the modulation threshold corresponding to the NSS of n and the RU with the index y.

In at least one embodiment of the first aspect and the second aspect, a value of the RU index bitmask subfield corresponding to an index less than y includes 1. That a value of the RU index bitmask subfield is 0 corresponds to a plurality of RUs, that is, a plurality of indexes less than y. Based on such case, this solution further limits a condition that y is to meet. To be specific, in response to a value of the RU index bitmask subfield corresponding to an index less than y including 1, the modulation threshold corresponding to the NSS of n and the RU with the index y is the modulation threshold corresponding to the NSTS of n and the RU with the index m1. That is, in response to y that meets this condition not existing, the modulation threshold corresponding to the NSS of n and the RU with the index y is another value, for example, a fixed value. In this case, the second device directly determines that a to-be-used nominal packet padding value is a fixed value, and does not determine the to-be-used nominal packet padding value based on the modulation threshold corresponding to the NSS of n and the RU with the index m1. This is simpler.

In at least one embodiment of the first aspect, in response to no index corresponding to a bit being 1 in the RU index bitmask subfield being greater than y, that the value of the RU index bitmask subfield corresponding to the RU with the index y is 0 indicates that a nominal packet padding value corresponding to the NSS of n and the RU with the index y is 20 microseconds. Correspondingly, in at least one embodiment of the second aspect, in response to no index corresponding to a bit being 1 in the RU index bitmask subfield being greater than y, the second device determines that a nominal packet padding value corresponding to the RU with the index y is 20 microseconds. In this solution, in response to m1 that meets the condition not existing, the nominal packet padding value corresponding to the RU with the index y is a fixed value, for example, 20 microseconds.

In at least one embodiment of the second aspect, in response to the second device using (dual carrier modulation, DCM), the second device determines a to-be-used nominal packet padding value based on a modulation threshold corresponding to the NSS of n and an RU with an index y+1, where the index y corresponds to a plurality of RUs of different sizes.

In this solution, multiple types of RUs (a combination of an RU and an MRU) correspond to one RU allocation index, that is, correspond to one index. A plurality of RUs are combined, and therefore overheads of the physical layer packet extension thresholds field is reduced. In this case, the second device does not determine a to-be-used nominal packet padding value based on the modulation threshold corresponding to the NSS of n and the RU with the index y. For example, the second device determines the to-be-used nominal packet padding value based on the modulation threshold corresponding to the NSS of n and the RU with the index y+1.

In at least one embodiment of the second aspect, in response to the second device using DCM, the second device determines the nominal packet padding value based on the modulation threshold corresponding to the NSS of n and the RU with the index y. The index y corresponds to multiple types of RUs, the multiple types of RUs include at least one type of multiple resource unit MRU, and an RU used by the second device is not a largest RU in the plurality of RUs.

Similarly, to reduce overheads of the physical layer packet extension thresholds field, multiple types of RUs is combined. In other words, multiple types of RUs (a combination of an RU and an MRU) correspond to one RU allocation index, that is, correspond to one index. In this case, in response to the RU used by the second device to send data not being the largest RU in the plurality of RUs, even in response to the second device using DCM, the second device still determines a to-be-used nominal packet padding value based on the modulation threshold corresponding to the NSS of n and the RU with the index y, instead of determining the to-be-used nominal packet padding value based on the modulation threshold corresponding to the NSS of n and the RU with the index y+1.

According to a third aspect, a nominal packet padding value indication method is provided. The method is performed by a first communication apparatus. The first communication apparatus is a communication device or a communication apparatus, for example, a chip system, that supports the communication device to implement a function used in the method. The following description uses an example in which the communication device is a first device. The first device is an AP. The method includes the following steps.

A first device generates a PPDU, and sends the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the physical layer packet extension thresholds field indicates that a nominal packet padding value corresponding to the RU with the index y is 0 microseconds, and the value range of b does not include y.

Similar to the solution of the first aspect, in this solution, a packet extension threshold subfield indicating a modulation threshold corresponding to the NSS of n and the RU with the index y is also omitted in the physical layer packet extension thresholds field. Although the packet extension threshold subfield indicating the modulation threshold corresponding to the NSS of n and the RU with the index y is omitted, the nominal packet padding value corresponding to the RU is indicated with the index y is 0 microseconds, reducing overheads of the physical layer packet extension thresholds field.

According to a fourth aspect, a nominal packet padding value determining method is provided. The method is performed by a second communication apparatus. The second communication apparatus is a communication device or a communication apparatus, for example, a chip system, that supports the communication device to implement a function used in the method. The following description uses an example in which the communication device is a second device. The second device is a STA. The method includes the following steps.

A second device receives a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold. A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the value range of b does not include y.

The second device determines, based on the physical layer packet extension thresholds field, that a nominal packet padding value corresponding to the RU with the index y is 0 microseconds.

Corresponding to the solution in the third aspect, the PPDU sent by the first device to the second device does not include a packet extension threshold subfield indicating a modulation threshold corresponding to the NS S of n and the RU with the index y. However, in response to the value of the RU index bitmask subfield corresponding to the RU with the index y being 0, the second device determines that a to-be-used nominal packet padding value is 0 microseconds. This is simpler.

In at least one embodiment of the third aspect and the fourth aspect, a value of the RU index bitmask subfield corresponding to an index less than y does not include 1. That a value of the RU index bitmask subfield is 0 corresponds to a plurality of RUs, that is, a plurality of indexes less than y. Based on such case, this solution further limits a condition that y are to be meet. To be specific, in response to a value of the RU index bitmask subfield corresponding to an index less than y not including 1, the nominal packet padding value corresponding to the NSS of n and the RU with the index y is 0 microseconds.

According to a fifth aspect, a nominal packet padding value indication method is provided. The method is performed by a first communication apparatus. The first communication apparatus is a communication device or a communication apparatus, for example, a chip system, that supports the communication device to implement a function used in the method. The following description uses an example in which the communication device is a first device. The first device is an AP. The method includes the following steps.

A first device generates a PPDU, and sends the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of [1, . . . , N], and N is an integer greater than or equal to 1. A value range of b is a subset of [m, . . . , M], and m and M are integers greater than or equal to 0. In response to an RU with an index y corresponding to a bit set to 0 in the RU index bitmask subfield, the value range of b does not include y, and the physical layer packet extension thresholds field indicates that a nominal packet padding value corresponding to the RU with the index y is 8 microseconds, 16 microseconds, or 20 microseconds.

Similar to the solution of the third aspect, in this solution, a packet extension threshold subfield indicating a modulation threshold corresponding to the NSS of n and the RU with the index y is also omitted in the physical layer packet extension thresholds field. For the omitted modulation threshold corresponding to the NSS of n and the RU with the index y, the corresponding nominal packet padding value is a fixed value, for example, 8 microseconds, 16 microseconds, or 20 microseconds. In other words, although the packet extension threshold subfield indicating the modulation threshold corresponding to the NSS of n and the RU with the index y is omitted, the nominal packet padding value corresponding to the RU with the index y is still indicated, reducing overheads of the physical layer packet extension thresholds field.

According to a sixth aspect, a nominal packet padding value determining method is provided. The method is performed by a second communication apparatus. The second communication apparatus is a communication device or a communication apparatus, for example, a chip system, that supports the communication device to implement a function used in the method. The following description uses an example in which the communication device is a second device. The second device is a STA or a STA. The method includes the following steps.

A second device receives a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold. A value range of n is a subset of $[1, \ldots, N]$, and N is an integer greater than or equal to 1. A value range of b is a subset of $[m, \ldots, M]$, and m and M are integers greater than or equal to 0. In response to an RU with an index y corresponding to a bit set to 0 in the RU index bitmask subfield, the value range of b does not include y.

The second device determines, based on the physical layer packet extension thresholds field, that a nominal packet padding value corresponding to the RU with the index y is 8 microseconds, 16 microseconds, or 20 microseconds.

Corresponding to the solution in the fifth aspect, the PPDU sent by the first device to the second device does not include a packet extension threshold subfield indicating a modulation threshold corresponding to the NS S of n and the RU with the index y. However, in response to the value of the RU index bitmask subfield corresponding to the RU with the index y being 0, the second device determines that the to-be-used nominal packet padding value is a fixed value, without referring to a modulation threshold corresponding to an RU with another index to determine the to-be-used nominal packet padding value. This is simpler.

In at least one embodiment of the fifth aspect or the sixth aspect, at least one bit whose value is 1 exists before the bit set to 0. That a value of the RU index bitmask subfield is 0 corresponds to a plurality of RUs, that is, a plurality of indexes less than y. Based on such case, in this solution, at least one bit set to 1 exists before the bit set to 0, that is, a condition that y is to meet is further limited. Only in response to at least one bit set to 1 existing before the bit that corresponds to the index y and that is set to 0 in the RU index bitmask subfield, the nominal packet padding value corresponding to the RU with the index y is a fixed value.

In at least one embodiment of the fifth aspect, in response to an NSS used by the second device being greater than a value indicated by NSS subfield, the physical layer packet extension thresholds field indicates that a nominal packet padding value used by the second device is 8 microseconds, 16 microseconds, or 20 microseconds. Correspondingly, in at least one embodiment of the sixth aspect, in response to an NSS used by the second device being greater than a value indicated by the NSS subfield, the second device determines that a to-be-used nominal packet padding value is 8 microseconds, 16 microseconds, or 20 microseconds.

In this solution, NSSs is not to be traversed. To be specific, in response to the NSS used by the second device being greater than the value indicated by the NSS subfield, the nominal packet padding value to be used by the second device is a fixed value, for example, 8 microseconds, 16 microseconds, or 20 microseconds. In this way, overheads of the physical layer packet extension thresholds field is further reduced.

In at least one embodiment of the fifth aspect, in response to an NSS used by the second device being greater than a value indicated by the NSS subfield, the physical layer packet extension thresholds field indicates that second device determines, based on a modulation threshold corresponding to the NSS used by the second device and the RU with the index y, a to-be-used nominal packet padding value. Correspondingly, in at least one embodiment of the sixth aspect, in response to an NSTS used by the second device being greater than a value indicated by the NSS subfield, the second device determines, based on a modulation threshold corresponding to the NSS used by the second device and the RU with the index y, a to-be-used nominal packet padding value.

In this solution, NSSs is not to be traversed either. To be specific, in response to the NSS used by the second device being greater than the value indicated by the NSS subfield, the second device determines, based on the modulation threshold corresponding to the NSS used by the second device and the RU with the index y, the to-be-used nominal packet padding value, so that overheads of the physical layer packet extension thresholds field is further reduced.

According to a seventh aspect, a nominal packet padding value determining method is provided. The method is performed by a first communication apparatus. The first communication apparatus is a communication device or a communication apparatus, for example, a chip system, that supports the communication device to implement a function used in the method. The following description uses an example in which the communication device is a first device. The first device is an AP. The method includes the following steps.

A first device generates a PPDU, and sends the PPDU to a second device. The PPDU includes a number of spatial streams NSS index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set includes a plurality of packet extension threshold subfields indicating an NSS of n, and the packet extension threshold subfield indicates, to the second device, a corresponding packet extension threshold used in response to a quantity of RU blocks obtained after equivalent coding on an allocated resource unit RU being a first value and an NSS used by the second device being n. The packet extension threshold subfield indicates a nominal packet padding value used by the second device in response to the first value being greater than or equal to the packet extension threshold, a value range of n is [1, . . . , N], and N is an integer greater than 8.

According to an eighth aspect, a nominal packet padding value determining method is provided. The method is performed by a second communication apparatus. The second communication apparatus is a communication device or a communication apparatus, for example, a chip system, that supports the communication device to implement a function used in the method. The following description uses an example in which the communication device is a second device. The second device is a STA. The method includes the following steps.

A second device receives a PPDU from a first device. The PPDU includes a number of spatial streams NSS index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set includes a plurality of packet extension threshold subfields indicating an NSS of n, and the packet extension threshold subfield indicates, to the second device, a corresponding packet extension threshold used in response to a quantity of RU blocks obtained after equivalent coding on an allocated resource unit RU being a first value and an NSS used by the second device is n. The packet extension threshold subfield indicates a nominal packet padding value used by the second device in response to the first value being greater than or equal to the packet extension threshold, a value range of n is [1, . . . , N], and N is an integer greater than 8.

The second device determines, based on the physical layer packet extension thresholds information field and the first value, a nominal packet padding value used in response to an NSS being j, where j is an integer greater than or equal to 1.

In the solution of the seventh aspect, the physical layer packet extension thresholds information field indicates, by using the plurality of packet extension threshold subfield sets corresponding to different nominal packet padding values, the corresponding packet extension threshold used in response to the used NSS being n and the quantity RU blocks obtained after equivalent coding on the resource units RU allocated to the second device is the first value. In this way, the second device determines, based on the packet extension threshold subfield corresponding to the NSS used by the second device and the first value, the to-be-used nominal packet padding value. That is, in response to the used NSS being n and the quantity of RU blocks obtained after equivalent coding on the allocated resource unit RU is the first value, the corresponding packet extension threshold, instead of a modulation threshold corresponding to an NSS and an RU size, is used to indicate the nominal packet padding value. This reduces a dimension of the physical layer packet extension thresholds information field, simplifying the physical layer packet extension thresholds information field, and reducing overheads of the physical layer packet extension thresholds information field.

In at least one embodiment, the first value satisfies the following formula:

$$N_{CBPRU} = N_{RU242} \times N_{BPSCS}.$$

$N_{CBPRU}$ is the first value, $N_{RU242}$ is a maximum quantity of RU242s that is included in the RU, and $N_{BPSCS}$ is a quantity of coded bits carried on each subcarrier of a single space-time stream.

The first value is considered to be related to an RU allocated to the second device, and is actually quantization of the RU allocated to the second device. This solution provides an example manner of determining the first value. A specific manner of determining the first value is not limited in at least one embodiment.

In response to quantities of nominal packet padding values indicated by the plurality of packet extension threshold subfield sets being different, manners in which the second device determines the to-be-used nominal packet padding value are also different. The following several cases is included.

Case 1: The plurality of packet extension threshold subfield sets include a set of first packet extension threshold subfields that corresponds to a first nominal packet padding value, and a first packet extension threshold subfield in the set of first packet extension threshold subfields indicates, to the second device, a corresponding first packet extension threshold used in response to the quantity of RU blocks obtained after equivalent coding on the allocated resource unit RU being the first value and the NSS used by the second device being n. The first packet extension threshold indicates that a nominal packet padding value used by the second device in response to the first value corresponding to the allocated RU being greater than or equal to the first packet extension threshold is the first nominal packet padding value, and the first nominal packet padding value is 20 microseconds. Correspondingly, in response to the NSS is j, and $N_{CBPRU}$ being greater than or equal to the first nominal packet padding value corresponding to the first packet extension threshold subfield in response to the NSS being j, the second device determines that the nominal packet padding value used in response to the NSS being j being the first nominal packet padding value.

Case 2: The plurality of packet extension threshold subfield sets further include a set of second packet extension threshold subfields that corresponds to a second nominal packet padding value, and a second packet extension threshold subfield in the set of second packet extension threshold subfields indicates, to the second device, a corresponding second packet extension threshold used in response to the quantity of RU blocks obtained after equivalent coding on the allocated resource unit RU being the first value and the NSS used by the second device is n. The second packet extension threshold indicates that a nominal packet padding value used by the second device in response to the first value corresponding to the allocated RU being greater than or equal to the second packet extension threshold is the second nominal packet padding value, and the second nominal packet padding value is 16 microseconds. Correspondingly, in response to the NSS being j, and $N_{CBPRU}$ being greater than or equal to the second nominal packet padding value corresponding to the second packet extension threshold subfield in response to the NSS being j, and less than the first nominal packet padding value corresponding to the first packet extension threshold subfield in response to the NSS being j, the second device determines that the nominal packet padding value used in response to the NSS being j is the second nominal packet padding value.

Case 3: The plurality of packet extension threshold subfield sets further include a set of third packet extension threshold subfields that corresponds to a third nominal packet padding value, and a third packet extension threshold subfield in the set of third packet extension threshold subfields indicates, to the second device, a corresponding third packet extension threshold used in response to the quantity of RU blocks obtained after equivalent coding on the allocated resource unit RU being the first value and the NSS used by the second device being n. The third packet extension threshold indicates that a nominal packet padding value used by the second device in response to the first value corresponding to the allocated RU being greater than or equal to the third packet extension threshold is the third nominal packet padding value, and the third nominal packet padding value is 8 microseconds. Correspondingly, in response to the NSS being j, and $N_{CBPRU}$ is greater than or equal to the third nominal packet padding value corresponding to the third packet extension threshold subfield in response to the NSTS being j, and less than the second nominal packet padding value corresponding to the second packet extension threshold subfield in response to the NSTS being j, the second device determines that a nominal packet padding value used in response to the NSS being j is the third nominal packet padding value.

In at least one embodiment of the seventh aspect, the NSS index bitmask subfield occupies at least 8 bits, an $i^{th}$ bit of the NSS index bitmask subfield is 0, and the physical layer packet extension thresholds information field does not include a packet extension threshold subfield set that corresponds to an NSS of i. In this solution, the packet extension threshold subfield that is omitted is indicated by using the NSS index bitmask subfield, to further reduce overheads of the physical layer packet extension thresholds information field.

In at least one embodiment of the eighth aspect, in response to the NSS used by the second device being greater than an NSS corresponding to a most significant bit of bits not set to 0 in the NSS index bitmask subfield, a nominal packet padding value used by the second device in response to the first value corresponding to the allocated RU being greater than or equal to the packet extension threshold is 20 microseconds. In this solution, a specific condition is defined. For example, in response to the NSS used by the second device being greater than an NSS corresponding to a most significant bit of bits not set to 0 in the NSS index bitmask subfield, the nominal packet padding value used by the second device is a fixed value, for example, 20 microseconds. In this way, in response to determining a to-be-used nominal packet padding value, the second device does not to compare an NSS with a plurality of packet extension threshold subfield sets one by one. This is more direct and simpler.

According to a ninth aspect, a nominal packet padding value determining method is provided. The method is performed by a first communication apparatus. The first communication apparatus is a communication device or a communication apparatus, for example, a chip system, that supports the communication device to implement a function used in the method. The following description uses an example in which the communication device is a first device. The first device is an AP. The method includes the following steps.

A first device generates a PPDU, and sends the PPDU to a second device. The PPDU includes an NSS subfield and a physical layer packet extension thresholds information field. The physical layer packet extension thresholds information field includes packet extension threshold subfields corresponding to different nominal packet padding values, the packet extension threshold subfield indicates a packet extension threshold, and the packet extension threshold subfield indicates a nominal packet padding value used by the second device in response to a second value being greater than or equal to the packet extension threshold. A value range of n is [1, . . . , N], N is an integer greater than 8, and the second value is related to an NSS used by the second device and a quantity of RU blocks obtained after equivalent coding on an allocated resource unit RU.

A difference from the solution in the seventh aspect lies in that, in this solution, the physical layer packet extension threshold information field does not separately indicate a packet extension threshold related to an NSS, that is, one packet extension threshold field indicates packet extension thresholds corresponding to a plurality of NSSs. This further simplifies the physical layer packet extension thresholds information field, to reduce overheads of the physical layer packet extension thresholds information field.

According to a tenth aspect, a nominal packet padding value determining method is provided. The method is performed by a second communication apparatus. The second communication apparatus is a communication device or a communication apparatus, for example, a chip system, that supports the communication device to implement a function used in the method. The following description uses an example in which the communication device is a second device. The second device is a STA. The method includes the following steps.

A second device receives a PPDU from a first device. The PPDU includes a number of spatial streams NSS subfield and a physical layer packet extension thresholds information field. The physical layer packet extension thresholds information field includes packet extension threshold subfields corresponding to different nominal packet padding values, the packet extension threshold subfield indicates a packet extension threshold, and the packet extension threshold subfield indicates a nominal packet padding value used by the second device in response to a second value being greater than or equal to the packet extension threshold. A value range of n is [1, . . . , N], N is an integer greater than 8, and the second value is related to an NSS used by the second device and a quantity of RU blocks obtained after equivalent coding on an allocated resource unit RU.

The second device determines the second value based on the used NSS and the quantity of RU blocks obtained after equivalent coding on the allocated resource unit RU; and determines a to-be-used nominal packet padding value based on the second value and the physical layer packet extension thresholds information field.

In this solution, the second value is considered as a value related to the NSS used by the second device and the quantity of RU blocks obtained after equivalent coding on the allocated resource unit RU. For example, the second value is determined based on the used NSS and the quantity of RU blocks obtained after equivalent coding on the allocated resource unit RU. Before determining a to-be-used nominal packet padding value, the second device first determines the second value, so as to determine the to-be-used nominal packet padding value based on the second value and the physical layer packet extension thresholds information field.

In at least one embodiment of the tenth aspect, that the second device determines the second value based on the used NSS and the quantity of RU blocks obtained after equivalent coding on the allocated resource unit RU includes: The second device determines the second value according to the following relationship:

$$F_{index} = f(NSS, N_{CBPRU}).$$ NSS is an NSS corresponding to the RU allocated to the second device, $N_{CBPRU}$ is the quantity of RU blocks obtained after equivalent coding on the RU allocated to the second device, and the following relationship is satisfied:

$$N_{CBPRU} = N_{RU242} \times N_{BPSCS}.$$

$N_{RU242}$ is a maximum quantity of RU242s that is included in the RU, and $N_{BPSCS}$ is a quantity of coded bits carried on each subcarrier of a single space-time stream.

In response to quantities of nominal packet padding values indicated by the plurality of packet extension threshold subfields being different, manners in which the second device determines the to-be-used nominal packet padding value are also different. The following several cases is included.

In at least one embodiment of the ninth aspect or the tenth aspect, the physical layer packet extension thresholds information field includes a first packet extension threshold subfield corresponding to a first nominal packet padding value. The first packet extension threshold subfield indicates a first packet extension threshold to the second device, the first packet extension threshold indicates that a nominal packet padding value used by the second device in response to the second value being greater than or equal to the first packet extension threshold being the first nominal packet padding value, and the first nominal packet padding value is 20 microseconds. Correspondingly, in response to the second value being greater than or equal to the first packet extension threshold, the second device determines that the to-be-used nominal packet padding value is the first nominal packet padding value.

In at least one embodiment of the ninth or the tenth aspect, the physical layer packet extension thresholds information field includes a second packet extension threshold subfield corresponding to a second nominal packet padding value. The second packet extension threshold subfield indicates a second packet extension threshold to the second device, the second packet extension threshold indicates that a nominal packet padding value used by the second device in response to the second value being greater than or equal to the second packet extension threshold being the second nominal packet padding value, and the second nominal packet padding value is 16 microseconds. Correspondingly, in response to the second value being greater than or equal to the second packet extension threshold and the second value being less than the first packet extension threshold, the second device determines that the to-be-used nominal packet padding value is the second nominal packet padding value.

In at least one embodiment of the ninth or the tenth aspect, the physical layer packet extension thresholds information field includes a third packet extension threshold subfield corresponding to a third nominal packet padding value. The third packet extension threshold subfield indicates a third packet extension threshold to the second device, the third packet extension threshold indicates that a nominal packet padding value used by the second device in response to the second value being greater than or equal to the third packet extension threshold being the third nominal packet padding value, and the third nominal packet padding value is 8 microseconds. Correspondingly, in response to the second value being greater than or equal to the third packet extension threshold and the second value being less than the second packet extension threshold, the second device determines that the to-be-used nominal packet padding value is the third nominal packet padding value.

According to an eleventh aspect, a nominal packet padding value determining method is provided. The method is performed by a first communication apparatus. The first communication apparatus is a communication device or a communication apparatus, for example, a chip system, that supports the communication device to implement a function used in the method. The following description uses an example in which the communication device is a first device. The first device is an AP. The method includes the following steps.

A first device generates a PPDU, and sends the PPDU and a first packet extension threshold range to a second device. The first packet extension threshold range indicates a nominal packet padding value used by the second device to send data to the first device in response to a third value being within the first packet extension threshold range, and different packet extension threshold ranges correspond to different nominal packet padding values.

According to a twelfth aspect, a nominal packet padding value determining method is provided. The method is performed by a second communication apparatus. The second communication apparatus is a communication device or a communication apparatus, for example, a chip system, that supports the communication device to implement a function used in the method. The following description uses an example in which the communication device is a second device. The first device is a STA. The method includes the following steps.

A second device receives a physical layer protocol data unit PPDU and a first threshold range from a first device. The first threshold range indicates a nominal packet padding value used by the second device to send data to the first device in response to a third value being within the first packet extension threshold range, and different packet extension threshold ranges corresponding to different nominal packet padding values. The third value is related to one or more parameters of a number of spatial streams NSS, an RU size, and a modulation scheme that are used by the second device.

In response to the third value being within the first packet extension threshold range, the second device determines that the to-be-used nominal packet padding value is a nominal packet padding value corresponding to the first packet extension threshold range.

Different from the solution of the seventh aspect or the ninth aspect, in this solution, a plurality of packet extension threshold ranges is defined, and different packet extension threshold ranges correspond to different nominal packet padding values. The first device indicates a packet extension threshold range to the second device. The second device determines a quantized value based on a factor that affects the nominal packet padding value, for example, one or more of an NSS, an RU, or an order of a modulation scheme that are used by the second device, and then compare the quantized value with the first packet extension threshold range sent by the first device, to determine the nominal packet padding value. In this manner, because the first packet extension threshold range is not indicated by using the physical layer packet extension thresholds field, overheads of the physical layer packet extension thresholds field is further reduced. Even in response to the physical layer packet extension thresholds field being used for indication, one packet extension threshold range, instead of a plurality of packet extension threshold ranges, is indicated. Overheads of the physical layer packet extension thresholds field is also reduced.

In at least one embodiment of the eleventh aspect or the twelfth aspect, the third value satisfies the following relationship:

$$x=f(NSTS,RU,Modulation)$$

x is the third value, NSS is an NSS used by the second device, RU is an RU size used by the second device, and Modulation is an order of a modulation scheme used by the second device.

In this solution, a manner of determining the third value is used as an example. That is, the third value is related to one or more of an NSS, an RU, and an order of a modulation scheme used by the second device. A specific determining manner is not limited in at least one embodiment.

According to a thirteenth aspect, a communication apparatus is provided. For example, the communication apparatus is the foregoing first device or an apparatus disposed in the first device. The communication apparatus is configured to perform the method according to any one of the first aspect or embodiments of the first aspect. Specifically, the communication apparatus includes modules configured to perform the method according to any one of the first aspect or the embodiments of the first aspect, for example, include a processing module and a transceiver module that are coupled to each other. For example, the communication apparatus is the foregoing first device.

The processing module is configured to generate a PPDU, and the transceiver module is configured to send the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the value range of b does not include y.

In a packet extension threshold subfield set that corresponds to a same nominal packet padding value, that the value of the RU index bitmask subfield corresponding to the RU with the index y is 0 indicates that a modulation threshold corresponding to the NSS of n and the RU with the index y is a modulation threshold corresponding to an NSTS of n and an RU with an index m1, where m1 is a smallest index in indexes that correspond to a bit being 1 in the RU index bitmask subfield and that are greater than y; or m1 is a largest index in indexes that correspond to a bit being 1 in the RU index bitmask subfield and that are less than y.

In at least one embodiment, a value of the RU index bitmask subfield corresponding to an index less than y includes 1.

In at least one embodiment, in response to no index corresponding to a bit being 1 in the RU index bitmask subfield being greater than y, that the value of the RU index bitmask subfield corresponding to the RU with the index y is 0 indicates that a nominal packet padding value corresponding to the NSS of n and the RU with the index y is 20 microseconds.

According to a fourteenth aspect, a communication apparatus is provided. For example, the communication apparatus is the foregoing second device or an apparatus disposed in the second device. The communication apparatus is configured to perform the method according to any one of the second aspect or the embodiments of the second aspect. Specifically, the communication apparatus includes modules configured to perform the method according to any one of the second aspect or the embodiments of the second aspect, for example, include a processing module and a transceiver module that are coupled to each other. For example, the communication apparatus is the foregoing second device.

The transceiver module is configured to receive a physical layer protocol data unit PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the communication apparatus in response to a modulation scheme being higher than or equal to the modulation threshold. A value range of n is a subset of [1, . . . , N], and N is an integer greater than or equal to 1. A value range of b is a subset of [m, M], and m and M are integers greater than or equal to 0. In response to a value of the RU index bitmask subfield corresponding to an RU with an index y being 0, the value range of b does not include y.

The processing module is configured to determine, based on a modulation threshold that corresponds to the NSS of n and an RU with an index m1 and that is indicated by the physical layer packet extension thresholds field, a modulation threshold corresponding to the NSS of n and the RU with the index y, where m1 is a smallest index in indexes that correspond to a bit being 1 in the RU index bitmask subfield and that are greater than y; or m1 is a largest index in indexes that correspond to a bit being 1 in the RU index bitmask subfield and that are less than y.

In at least one embodiment, a value of the RU index bitmask subfield corresponding to an index less than y includes 1.

In at least one embodiment, in response to no index corresponding to a bit being 1 in the RU index bitmask subfield being greater than y, the processing module is configured to determine that a nominal packet padding value corresponding to an RU with an index x is 20 microseconds.

In at least one embodiment, the communication apparatus uses DCM, and the processing module is configured to determine a to-be-used nominal packet padding value based on a modulation threshold corresponding the NSS of n and an RU with an index y+1, where the index y corresponds to a plurality of RUs of different sizes. Alternatively, the processing module is configured to determine the nominal packet padding value based on the modulation threshold corresponding to the NSS of n and the RU with the index y, where the index y corresponds to a plurality of RUs of different sizes, and an RU used by the communication apparatus is not a largest RU in the plurality of RUs of different sizes.

According to a fifteenth aspect, a communication apparatus is provided. For example, the communication apparatus is the foregoing first device or an apparatus disposed in the first device. The communication apparatus is configured to perform the method according to any one of the third aspect or the embodiments of the third aspect. Specifically, the communication apparatus includes modules configured to perform the method according to any one of the third aspect or the embodiments of the third aspect, for example, include a processing module and a transceiver module that are coupled to each other. For example, the communication apparatus is the foregoing first device.

The processing module is configured to generate a PPDU, and the transceiver module is configured to send the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, in physical layer packet extension threshold subfields corresponding to a same nominal packet padding value, that the value of the RU index bitmask subfield corresponding to the RU with the index y is 0 indicates that a nominal packet padding value corresponding to the RU with the index y is 0 microseconds, and the value range of b does not include y.

In at least one embodiment, a value of the RU index bitmask subfield corresponding to an index less than x does not include 1.

According to a sixteenth aspect, a communication apparatus is provided. For example, the communication apparatus is the foregoing second device or an apparatus disposed in the second device. The communication apparatus is configured to perform the method according to any one of the fourth aspect or the embodiments of the fourth aspect. Specifically, the communication apparatus includes modules configured to perform the method according to any one of the fourth aspect or the embodiments of the fourth aspect, for example, include a processing module and a transceiver module that are coupled to each other. For example, the communication apparatus is the foregoing second device.

The transceiver module is configured to receive a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the communication apparatus in response to a modulation scheme being higher than or equal to the modulation threshold. A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the value range of b does not include y.

The processing module is configured to determine, based on the physical layer packet extension thresholds field, that a nominal packet padding value corresponding to the RU with the index y is 0 microseconds.

In at least one embodiment, a value of the RU index bitmask subfield corresponding to an index less than y does not include 1.

According to a seventeenth aspect, a communication apparatus is provided. For example, the communication apparatus is the foregoing first device or an apparatus disposed in the first device. The communication apparatus is configured to perform the method according to any one of the fifth aspect or the embodiments of the fifth aspect. Specifically, the communication apparatus includes modules configured to perform the method according to any one of the fifth aspect or the embodiments of the fifth aspect, for example, include a processing module and a transceiver module that are coupled to each other. For example, the communication apparatus is the foregoing first device.

The processing module is configured to generate a PPDU, and the transceiver module is configured to send the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of [1, . . . , N], and N is an integer greater than or equal to 1. A value range of b is a subset of [m, . . . , M], and m and M are integers greater than or equal to 0. In response to an RU with an index y corresponding to a bit set to 0 in the RU index bitmask subfield, the value range of b does not include y, and the physical layer packet extension thresholds field indicates that a nominal packet padding value corresponding to the RU with the index y is 8 microseconds, 16 microseconds, or 20 microseconds.

In at least one embodiment, at least one bit whose value is 1 exists before the bit set to 0.

In at least one embodiment, in response to a used NSS being greater than a value indicated by the NSS subfield, the physical layer packet extension thresholds field indicates that a nominal packet padding value used by the second device is 8 microseconds, 16 microseconds, or 20 microseconds. Alternatively, in response to a used NSS being greater than a value indicated by the NSS subfield, the physical layer packet extension thresholds field indicates that the second device determines the to-be-used nominal packet padding value based on the used NSS and a modulation threshold corresponding to the RU with the index y.

According to an eighteenth aspect, a communication apparatus is provided. For example, the communication apparatus is the foregoing second device or an apparatus disposed in the second device. The communication apparatus is configured to perform the method according to any one of the sixth aspect or the embodiments of the sixth aspect. Specifically, the communication apparatus includes modules configured to perform the method according to any one of the sixth aspect or the embodiments of the sixth aspect, for example, include a processing module and a transceiver module that are coupled to each other. For example, the communication apparatus is the foregoing second device.

The transceiver module is configured to receive a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the communication apparatus in response to a modulation scheme being higher than or equal to the modulation threshold. A value range of n is a subset of [1, . . . , N], and N is an integer greater than or equal to 1. A value range of b is a subset of [m, . . . , M], and m and M are integers greater than or equal to 0. In response to an RU with an index y corresponding to a bit set to 0 in the RU index bitmask subfield, the value range of b does not include y.

The processing module is configured to determine, based on the physical layer packet extension thresholds field, that a nominal packet padding value corresponding to the RU with the index y is 8 microseconds, 16 microseconds, or 20 microseconds.

In at least one embodiment, at least one bit whose value is 1 exists before the bit set to 0.

In at least one embodiment, in response to an NSS used by the communication apparatus being greater than a value indicated by the NSS subfield, the processing module is further configured to determine that the nominal packet padding value corresponding to the RU with the index y is 8 microseconds, 16 microseconds, or 20 microseconds. Alternatively, in response to an NSS used by the communication apparatus being greater than a value indicated by the NSS subfield, the processing module is further configured to determine, based on a modulation threshold corresponding to the used NSS and the RU with the index y, the nominal packet padding value corresponding to the RU with the index y.

According to a nineteenth aspect, a communication apparatus is provided. For example, the communication apparatus is the foregoing first device or an apparatus disposed in the first device. The communication apparatus is configured to perform the method according to any one of the seventh aspect or the embodiments of the seventh aspect. Specifically, the communication apparatus includes modules configured to perform the method according to any one of the seventh aspect or the embodiments of the seventh aspect, for example, include a processing module and a transceiver module that are coupled to each other. For example, the communication apparatus is the foregoing first device.

The processing module is configured to generate a PPDU, and the transceiver module is configured to send the PPDU to a second device. The PPDU includes a number of spatial streams NSS index bitmask subfield, an NSS subfield, and a physical layer packet extension thresholds information field. The physical layer packet extension thresholds information field includes a plurality of packet extension threshold subfield sets corresponding to different nominal packet padding values, and each packet extension threshold subfield set includes a plurality of packet extension threshold subfields indicating an NSS of n. The packet extension threshold subfield indicates, to the second device, a corresponding packet extension threshold used in response to an NSS used by the second device being n and a quantity of RU blocks obtained after equivalent coding on an allocated resource unit RU being a first value, and the packet extension threshold subfield indicates a nominal packet padding value used by the second device in response to the first value being greater than or equal to the packet extension threshold. A value range of n is [1, . . . , N], and N is an integer greater than 8.

In at least one embodiment, the first value satisfies the following formula:

$$N_{CBPRU}=N_{RU242} \times N_{BPSCS}.$$

$N_{CBPRU}$ is the first value, $N_{RU242}$ is a maximum quantity of RU242s that is included in the RU, and $N_{BPSCS}$ is a quantity of coded bits carried on each subcarrier of a single space-time stream.

In at least one embodiment, the plurality of packet extension threshold subfield sets include a set of first packet extension threshold subfields that corresponds to a first nominal packet padding value, and a first packet extension threshold subfield in the set of first packet extension threshold subfields indicates, to the second device, a corresponding first packet extension threshold used in response to the quantity of RU blocks obtained after equivalent coding on the allocated resource unit RU being the first value and the NSS used by the second device being n. The first packet extension threshold indicates that a nominal packet padding value used by the second device in response to the first value corresponding to the allocated RU being greater than or equal to the first packet extension threshold is the first nominal packet padding value, and the first nominal packet padding value is 20 microseconds.

In at least one embodiment, the plurality of packet extension threshold subfield sets further include a set of second packet extension threshold subfields that corresponds to a second nominal packet padding value, and a second packet extension threshold subfield in the set of second packet extension threshold subfields indicates, to the second device, a corresponding second packet extension threshold used in response to the quantity of RU blocks obtained after equivalent coding on the allocated resource unit RU being the first value and the NSS used by the second device being n. The second packet extension threshold indicates that a nominal packet padding value used by the second device in response to the first value corresponding to the allocated RU being greater than or equal to the second packet extension threshold being the second nominal packet padding value, and the second nominal packet padding value is 16 microseconds.

In at least one embodiment, the plurality of packet extension threshold subfield sets further include a set of third packet extension threshold subfields that corresponds to a third nominal packet padding value, and a third packet extension threshold subfield in the set of third packet extension threshold subfields indicates, to the second device, a corresponding third packet extension threshold used in response to the quantity of RU blocks obtained after equivalent coding on the allocated resource unit RU being the first value and the NSS used by the second device being n. The third packet extension threshold indicates that a nominal packet padding value used by the second device in response to the first value corresponding to the allocated RU being greater than or equal to the third packet extension threshold is the third nominal packet padding value, and the third nominal packet padding value is 8 microseconds.

In at least one embodiment, the NSS index bitmask subfield occupies at least 8 bits, an $i^{th}$ bit of the NSS index bitmask subfield is 0, and the physical layer packet extension thresholds information field does not include a packet extension threshold subfield set that corresponds to an NSS of i.

In at least one embodiment, in response to the physical layer packet extension thresholds information field indicates that the NSS used by the second device being greater than an NSS corresponding to a most significant bit of bits not set to 0 in the NSS index bitmask subfield, a nominal packet padding value used by the second device in response to the first value corresponding to the allocated RU being greater than or equal to the packet extension threshold being 20 microseconds.

According to a twentieth aspect, a communication apparatus is provided. For example, the communication apparatus is the foregoing second device or an apparatus disposed in the second device. The communication apparatus is configured to perform the method according to any one of the eighth aspect or the embodiments of the eighth aspect. Specifically, the communication apparatus includes modules configured to perform the method according to any one of the eighth aspect or the embodiments of the eighth aspect, for example, include a processing module and a transceiver module that are coupled to each other. For example, the communication apparatus is the foregoing second device.

The transceiver module is configured to receive a physical layer protocol data unit PPDU from a first device. The PPDU includes a number of spatial streams NSS index bitmask subfield, an NSS subfield, and a physical layer packet extension thresholds information field. The physical layer packet extension thresholds information field includes a plurality of packet extension threshold subfield sets corresponding to different nominal packet padding values, and each packet extension threshold subfield set includes a plurality of packet extension threshold subfields indicating an NSS of n. The packet extension threshold subfield indicates, to the communication apparatus, a corresponding packet extension threshold used in response to a quantity of RU blocks obtained after equivalent coding on an allocated resource unit RU being a first value and an NSS used by the second device is n, and the packet extension threshold subfield indicates a nominal packet padding value used by the communication apparatus in response to the first value being greater than or equal to the packet extension threshold. A value range of n is [1, . . . , N], and N is an integer greater than 8.

The processing module is configured to determine, based on the physical layer packet extension thresholds information field and the first value, a nominal packet padding value used in response to an NSS being j, where j is an integer greater than or equal to 1.

In at least one embodiment, the first value satisfies the following formula:

$$N_{CBPRU} = N_{RU242} \times N_{BPSCS}.$$

$N_{CBPRU}$ is the first value, $N_{RU242}$ is a maximum quantity of RU242s that is included in the RU, and $N_{BPSCS}$ is a quantity of coded bits carried on each subcarrier of a single space-time stream.

In at least one embodiment, the plurality of packet extension threshold subfield sets include a set of first packet extension threshold subfields that corresponds to a first nominal packet padding value, and a first packet extension threshold subfield in the set of first packet extension threshold subfields indicates, to the communication apparatus, a corresponding first packet extension threshold used in response to the quantity of RU blocks obtained after equivalent coding on the allocated resource unit RU being the first value and the NSS used by the second device being n. The first packet extension threshold indicates the first nominal packet padding value used by the communication apparatus in response to the first value corresponding to the allocated RU being greater than or equal to the first packet extension threshold, and the first nominal packet padding value being 20 microseconds.

In response to the NSS being j, and $N_{CBPRU}$ being greater than or equal to the first nominal packet padding value corresponding to the first packet extension threshold subfield in response to the NS S being j, the communication apparatus determines that the nominal packet padding value used in response to the NSS being j being the first nominal packet padding value.

In at least one embodiment, the plurality of packet extension threshold subfield sets further include a set of second packet extension threshold subfields that corresponds to a second nominal packet padding value, and a second packet extension threshold subfield in the set of second packet extension threshold subfields indicates, to the communication apparatus, a corresponding second packet extension threshold used in response to the quantity of RU blocks obtained after equivalent coding on the allocated resource unit RU being the first value and the NSS used by the second device is n. The second packet extension threshold indicates the second nominal packet padding value used by the communication apparatus in response to the first value corresponding to the allocated RU being greater than or equal to the second packet extension threshold, and the second nominal packet padding value is 16 microseconds.

In response to the NSS is j, and $N_{CBPRU}$ being greater than or equal to the second nominal packet padding value corresponding to the second packet extension threshold subfield in response to the NSS being j, and less than the first nominal packet padding value corresponding to the first packet extension threshold subfield in response to the NSS being j, the communication apparatus determines that the nominal packet padding value used in response to the NSS being j is the second nominal packet padding value.

In at least one embodiment, the plurality of packet extension threshold subfield sets further include a set of third packet extension threshold subfields that corresponds to a third nominal packet padding value, and a third packet extension threshold subfield in the set of third packet extension threshold subfields indicates, to the communication apparatus, a corresponding third packet extension threshold used in response to the quantity of RU blocks obtained after equivalent coding on the allocated resource unit RU being the first value and the NSS used by the second device being n. The third packet extension threshold indicates the third nominal packet padding value used by the communication apparatus in response to the first value corresponding to the allocated RU being greater than or equal to the third packet extension threshold, and the third nominal packet padding value being 8 microseconds.

In response to the NSS being j, and $N_{CBPRU}$ is greater than or equal to the third nominal packet padding value corresponding to the third packet extension threshold subfield in response to the NSTS being j, and less than the second nominal packet padding value corresponding to the second packet extension threshold subfield in response to the NSTS being j, the communication apparatus determines that the nominal packet padding value used in response to the NSS being j is the third nominal packet padding value.

In at least one embodiment, the NSS index bitmask subfield occupies at least 8 bits, an $i^{th}$ bit of the NSS index bitmask subfield is 0, and the physical layer packet extension thresholds information field does not include a set of subfields that corresponds to an NSS of i.

In at least one embodiment, in response to the NSS used by the communication apparatus being greater than an NSS corresponding to a most significant bit of bits not set to 0 in the NSS index bitmask subfield, the processing module is further configured to use a nominal packet padding value of 20 microseconds in response to the first value corresponding to the allocated RU being greater than or equal to the packet extension threshold.

According to a twenty-first aspect, a communication apparatus is provided. For example, the communication apparatus is the foregoing first device or an apparatus disposed in the first device. The communication apparatus is configured to perform the method according to any one of the ninth aspect or the embodiments of the ninth aspect. Specifically, the communication apparatus includes modules configured to perform the method according to any one of the ninth aspect or the embodiments of the ninth aspect, for example, include a processing module and a transceiver module that are coupled to each other. For example, the communication apparatus is the foregoing first device.

The processing module is configured to generate a PPDU, and the transceiver module is configured to send the PPDU to a second device. The PPDU includes a number of spatial streams NSS subfield and a physical layer packet extension thresholds information field. The physical layer packet extension thresholds information field includes packet extension threshold subfields corresponding to different nominal packet padding values, the packet extension threshold subfield indicates a packet extension threshold, and the packet extension threshold subfield indicates a nominal packet padding value used by the second device in response to a second value being greater than or equal to the packet extension threshold. A value range of n is [1, . . . , N], N is an integer greater than 8, and the second value is related to an NSS used by the second device and a quantity of RU blocks obtained after equivalent coding on an allocated RU.

In at least one embodiment, the physical layer packet extension thresholds information field includes a first packet extension threshold subfield corresponding to a first nominal packet padding value. The first packet extension threshold subfield indicates a first packet extension threshold, the first packet extension threshold indicates that a nominal packet padding value used by the second device in response to the second value being greater than or equal to the first packet extension threshold being the first nominal packet padding value, and the first nominal packet padding value is 20 microseconds.

In at least one embodiment, the physical layer packet extension thresholds information field includes a second packet extension threshold subfield corresponding to a second nominal packet padding value. The second packet extension threshold subfield indicates a second packet extension threshold, the second packet extension threshold indicates that a nominal packet padding value used by the second device in response to the second value being greater than or equal to the second packet extension threshold being the second nominal packet padding value, and the second nominal packet padding value is 16 microseconds.

In at least one embodiment, the physical layer packet extension thresholds information field includes a third packet extension threshold subfield corresponding to a third nominal packet padding value. The third packet extension threshold subfield indicates a third packet extension threshold, the third packet extension threshold indicates that a nominal packet padding value used by the second device in response to the second value being greater than or equal to the third packet extension threshold being the third nominal packet padding value, and the third nominal packet padding value is 8 microseconds.

According to a twenty-second aspect, a communication apparatus is provided. For example, the communication apparatus is the foregoing second device or an apparatus disposed in the second device. The communication apparatus is configured to perform the method according to any one of the tenth aspect or the embodiments of the tenth aspect. Specifically, the communication apparatus includes modules configured to perform the method according to any one of the tenth aspect or the embodiments of the tenth aspect, for example, include a processing module and a transceiver module that are coupled to each other. For example, the communication apparatus is the foregoing second device.

The transceiver module is configured to receive a PPDU from a first device. The PPDU includes a number of spatial streams NSS subfield and a physical layer packet extension thresholds information field. The physical layer packet extension thresholds information field includes packet extension threshold subfields corresponding to different nominal packet padding values, the packet extension threshold subfield indicates a packet extension threshold, and the packet extension threshold subfield indicates a nominal packet padding value used by the second device in response to a second value being greater than or equal to the packet extension threshold. A value range of n is [1, . . . , N], N is an integer greater than 8, and the second value is related to an NSS used by the second device and a quantity of RU blocks obtained after equivalent coding on an allocated RU.

The processing module is configured to: determine the second value based on the used NSS and the quantity of RU blocks obtained after equivalent coding on the allocated resource unit RU; and determine a to-be-used nominal packet padding value based on the second value and the physical layer packet extension thresholds information field.

In at least one embodiment, the processing module is specifically configured to determine the second value according to the following relationship:

$P_{index}=f(NSS,N_{CBPRU})$. NSS is an NSS corresponding to the RU allocated to the communication apparatus. $N_{CBPRU}$ is the quantity of RU blocks obtained after equivalent coding on the RU allocated to the communication apparatus, and satisfies the following relationship:

$$N_{CBPRU}=N_{RU242}\times N_{BPSCS}.$$

$N_{RU242}$ is a maximum quantity of RU242s that is included in the RU, and $N_{BPSCS}$ is a quantity of coded bits carried on each subcarrier of a single space-time stream.

In at least one embodiment, the physical layer packet extension thresholds information field includes a first packet extension threshold subfield corresponding to a first nominal packet padding value. The first packet extension threshold subfield indicates a first packet extension threshold, the first packet extension threshold indicates that a nominal packet padding value used by the communication apparatus in response to the second value being greater than or equal to the first packet extension threshold being the first nominal packet padding value, and the first nominal packet padding value is 20 microseconds.

In response to the second value being greater than or equal to the first packet extension threshold, the processing module determines that the nominal packet padding value used by the communication apparatus is the first nominal packet padding value.

In at least one embodiment, the physical layer packet extension thresholds information field includes a second packet extension threshold subfield corresponding to a second nominal packet padding value. The second packet extension threshold subfield indicates a second packet extension threshold, the second packet extension threshold indicates that a nominal packet padding value used by the communication apparatus in response to the second value being greater than or equal to the second packet extension threshold being the second nominal packet padding value, and the second nominal packet padding value is 16 microseconds.

In response to the second value being greater than or equal to the second packet extension threshold, and the second value being less than the first packet extension threshold, the processing module determines that the nominal packet padding value used by the communication apparatus is the second nominal packet padding value.

In at least one embodiment, the physical layer packet extension thresholds information field includes a third packet extension threshold subfield corresponding to a third nominal packet padding value. The third packet extension threshold subfield indicates a third packet extension threshold, the third packet extension threshold indicates that a nominal packet padding value used by the communication apparatus in response to the second value being greater than or equal to the third packet extension threshold being the third nominal packet padding value, and the third nominal packet padding value is 8 microseconds.

In response to the second value being greater than or equal to the third packet extension threshold, and the second value being less than the second packet extension threshold, the processing module determines that the nominal packet padding value used by the communication apparatus is the third nominal packet padding value.

According to a twenty-third aspect, a communication apparatus is provided. For example, the communication apparatus is the foregoing first device or an apparatus disposed in the first device. The communication apparatus is configured to perform the method according to any one of the eleventh aspect or the embodiments of the eleventh aspect. Specifically, the communication apparatus includes modules configured to perform the method according to any one of the eleventh aspect or the embodiments of the eleventh aspect, for example, include a processing module and a transceiver module that are coupled to each other. For example, the communication apparatus is the foregoing first device.

The processing module is configured to generate a PPDU, and the transceiver module is configured to send the PPDU and a first packet extension threshold range. In response to a third value being within the first packet extension threshold range, the first packet extension threshold range indicates a nominal packet padding value used by the communication apparatus to send data to the first device. Different packet extension threshold ranges correspond to different nominal packet padding values.

In at least one embodiment, the third value satisfies the following relationship:

$$x=f(NSTS,RU,Modulation)$$

x is the third value, NSS is an NSS used by the communication apparatus, RU is an RU size used by the communication apparatus, and Modulation is an order of a modulation scheme used by the communication apparatus.

According to a twenty-fourth aspect, a communication apparatus is provided. For example, the communication apparatus is the foregoing second device or an apparatus disposed in the second device. The communication apparatus is configured to perform the method according to any one of the twelfth aspect or the embodiments of the twelfth aspect. Specifically, the communication apparatus includes modules configured to perform the method according to any one of the twelfth aspect or the embodiments of the twelfth aspect, for example, include a processing module and a transceiver module that are coupled to each other. For example, the communication apparatus is the foregoing second device.

The transceiver module is configured to receive a PPDU and a first packet extension threshold range from a first device. In response to a third value being within the first packet extension threshold range, the first packet extension threshold range indicates a nominal packet padding value used by the communication apparatus to send data to the first device. Different packet extension threshold ranges correspond to different nominal packet padding values. The third value is related to one or more parameters of a number of spatial streams NSS, an RU size, and a modulation scheme that are used by the communication apparatus.

In response to the third value being within the first packet extension threshold range, the processing module determines that the nominal packet padding value used by the communication apparatus is a nominal packet padding value corresponding to the first packet extension threshold range.

In at least one embodiment, the third value satisfies the following relationship:

$$x=f(NSTS,RU,Modulation)$$

x is the third value, NSS is an NSS used by the communication apparatus, RU is an RU size used by the communication apparatus, and Modulation is an order of a modulation scheme used by the communication apparatus.

According to a twenty-fifth aspect, at least one embodiment provides a communication apparatus. The communication apparatus is the communication apparatus in any one of the thirteenth aspect to the twenty-fourth aspect in the foregoing embodiments, or a chip disposed in the communication apparatus in any one of the thirteenth aspect to the twenty-fourth aspect. The communication apparatus includes a communication interface and a processor, and optionally, further includes a memory. The memory is configured to store a computer program, instructions, or data. The processor is coupled to the memory and the communication interface. In response to the processor reading the computer program, the instructions, or the data, the communication apparatus performs the method performed by the first device or the second device in the method embodiment in any one of the first aspect to the twelfth aspect.

The communication interface is implemented by using an antenna, a feeder, a codec, and the like in the communication apparatus. Alternatively, in response to the communication apparatus being a chip disposed in the first device or the second device, the communication interface is an input/output interface of the chip, for example, an input/output pin. The communication apparatus further includes a transceiver, configured to perform communication between the communication apparatus and another device. For example, in response to the communication apparatus being the first device, the another device is the second device; or in response to the communication apparatus being the second device, the another device is the first device.

According to a twenty-sixth aspect, at least one embodiment provides a chip system. The chip system includes a processor, and further includes a memory, configured to implement the method performed by the communication apparatus in any one of the first aspect to the twelfth aspect. In at least one embodiment, the chip system further includes the memory, configured to store program instructions and/or data. The chip system includes a chip, or includes a chip and another discrete device.

According to a twenty-seventh aspect, at least one embodiment provides a communication system. The communication system includes the communication apparatus according to the thirteenth aspect and the fourteenth aspect; or the communication system includes the communication apparatus according to the fifteenth aspect and the sixteenth aspect; or the communication system includes the communication apparatus according to the seventeenth aspect and the eighteenth aspect; or the communication system includes the communication apparatus according to the nineteenth aspect and the twentieth aspect; or the communication system includes the communication apparatus according to the twenty-first aspect and the twenty-second aspect; or the communication system includes the communication apparatus according to the twenty-third aspect and the twenty-fourth aspect.

According to a twenty-eighth aspect, at least one embodiment provides a computer-readable storage medium. The computer-readable storage medium stores a computer program. In response to the computer program being run, the method performed by the first device in the foregoing aspects is implemented, or the method performed by the second device in the foregoing aspects is implemented.

According to a twenty-ninth aspect, a computer program product is provided. The computer program product includes computer program code. In response to the computer program code being run, the method performed by the first device in the foregoing aspects is performed, or the method performed by the second device in the foregoing aspects is performed.

For beneficial effects of the thirteenth aspect to the twenty-ninth aspect and the implementations thereof, refer to the descriptions of the beneficial effects of the method according to the first aspect to the twelfth aspect and the implementations thereof.

BRIEF DESCRIPTION OF DRAWINGS

FIG. 4 is a schematic diagram depicting a structure of an HE physical layer capabilities information field according to at least one embodiment;

FIG. 5 is a schematic diagram depicting a structure of an HE capabilities element according to at least one embodiment;

FIG. 6 is a schematic diagram depicting a structure of a physical layer packet extension thresholds field according to at least one embodiment;

FIG. 7 is a schematic diagram depicting a structure of an existing physical layer packet extension thresholds information field;

FIG. 9 is a schematic flowchart of a nominal packet padding value indication method 1 according to at least one embodiment;

FIG. 12 is a schematic flowchart of a nominal packet padding value indication method 3 according to at least one embodiment;

FIG. 13 is a schematic diagram depicting another structure of a physical layer packet extension thresholds information field according to at least one embodiment;

FIG. 14 is a schematic flowchart of a nominal packet padding value indication method 4 according to at least one embodiment;

DESCRIPTION OF EMBODIMENTS

To make objectives, technical solution, and advantages of at least one embodiment clearer, the following further describes at least one embodiment in detail with reference to the accompanying drawings.

At least one embodiment is applied to a wireless local area network (wireless local area network, WLAN) scenario, and is applied to an IEEE 802.11 system standard, for example, 802.11a/b/g, 802.11n, 802.11ac, 802.11ax, or a next-generation standard, for example, 802.11be, or a further next-generation standard. Alternatively, at least one embodiment is applied to a wireless local area network system, for example, an internet of things (internet of things, IoT) or a vehicle-to-everything (Vehicle to X, V2X) network. Certainly, at least one embodiment is further applied to another communication system, for example, a long term evolution (long term evolution, LTE) system, an LTE frequency division duplex (frequency division duplex, FDD) system, LTE time division duplex (time division duplex, TDD), a universal mobile telecommunication system (universal mobile telecommunication system, UMTS), a worldwide interoperability for microwave access (worldwide interoperability for microwave access, WiMAX) communication system, and a future 5G communication system.

The following uses an example in which at least one embodiment are applicable to a WLAN scenario. The WLAN develops from the 802.11a/g standard, and goes through 802.11n, 802.11ac, 802.11ax, and 802.11be that is currently being discussed. 802.11n is also referred to as high throughput (high throughput, HT), 802.11ac is also referred to as very high throughput (very high throughput, VHT), 802.11ax is also referred to as high efficiency (high efficient, HE) or Wi-Fi 6, and 802.11be is also referred to as extremely high throughput (extremely high throughput, EHT) or Wi-Fi 7. Standards before HT, such as 802.11a/b/g, are collectively referred to as non-high throughput (Non-HT).

Figure 1:
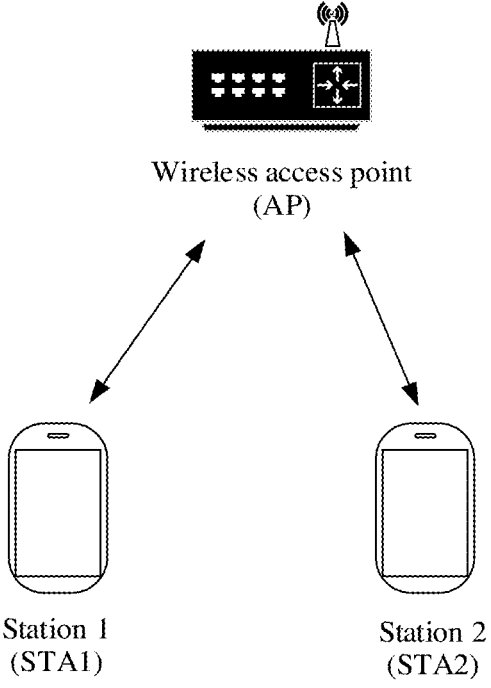
FIG. 1 is a schematic diagram of a network architecture of a WLAN according to at least one embodiment.

Refer to FIG. 1. FIG. 1 is a schematic diagram of a network architecture of a WLAN to which at least one embodiment is applicable. In FIG. 1, that the WLAN includes one wireless access point (access point, AP) and two stations (station, STA) is used as an example. A STA associated with an AP receives a radio frame sent by the AP, and also sends a radio frame to the AP. In addition, at least one embodiment are also applicable to communication between Aps. For example, the Aps communicates with each other by using a distributed system (distributed system, DS). Embodiments described herein are also applicable to communication between STAs. Quantities of Aps and STAs in FIG. 1 are merely an example. There is more or less Aps and STAs.

The STA in at least one embodiment is a user terminal, a user apparatus, an access apparatus, a subscriber station, a subscriber unit, a mobile station, a user agent, a user device, or another device that has a wireless communication function. The user terminal is a handheld device, a vehicle-mounted device, a wearable device, a computing device, another processing device connected to a wireless modem that has a wireless communication function. The user terminal is also user equipment (user equipment, UE), a mobile station (mobile station, MS), a terminal (terminal), a terminal device (terminal equipment), a portable communication device, a handheld device, a portable computing device, an entertainment device, a game device or system, a global positioning system device, or any other suitable device in various forms configured to perform network communication via wireless media. For example, the STA is a router, a switch, a bridge, or the like. Herein, for ease of description, the devices mentioned above are collectively referred to as a station or a STA.

The AP and the STA in at least one embodiment is an AP and a STA that are applicable to an IEEE 802.11 system standard. The AP is an apparatus that is deployed in a wireless communication network and that provides a wireless communication function for a STA associated with the AP. The AP is used as a center of the communication system, and is usually a network-side product that supports MAC and PHY in the 802.11 system standard, for example, is a communication device such as a base station, a router, a gateway, a repeater, a communication server, a switch, or a bridge. The base station includes a macro base station, a micro base station, a relay station, or the like in various forms. Herein, for ease of description, the devices mentioned above are collectively referred to as an AP. The STA is usually a terminal product that supports media access control (media access control, MAC) and a physical layer (physical, PHY) of the 802.11 system standard, for example, a mobile phone or a notebook computer.

According to 802.11ax, a pre-forward error correction padding (pre-(forward error correction, FEC) padding), a post-forward error correction padding (post-FEC padding), and a packet extension (packet extension) is added to a PPDU. The pre-FEC padding and excess information (excess information) occupy about a multiple of one quarter (for example, one quarter, two quarters, three quarters, and all) of subcarriers in a last coded symbol, and remaining subcarriers is used to carry the post-FEC padding. Decoding of the last coded symbol of the PPDU is performed only on the multiple of one quarter of subcarriers occupied by the pre-FEC padding and the excess information, without decoding the entire coded symbol. This saves decoding time and reserves more processing time for the PPDU.

Figure 2:
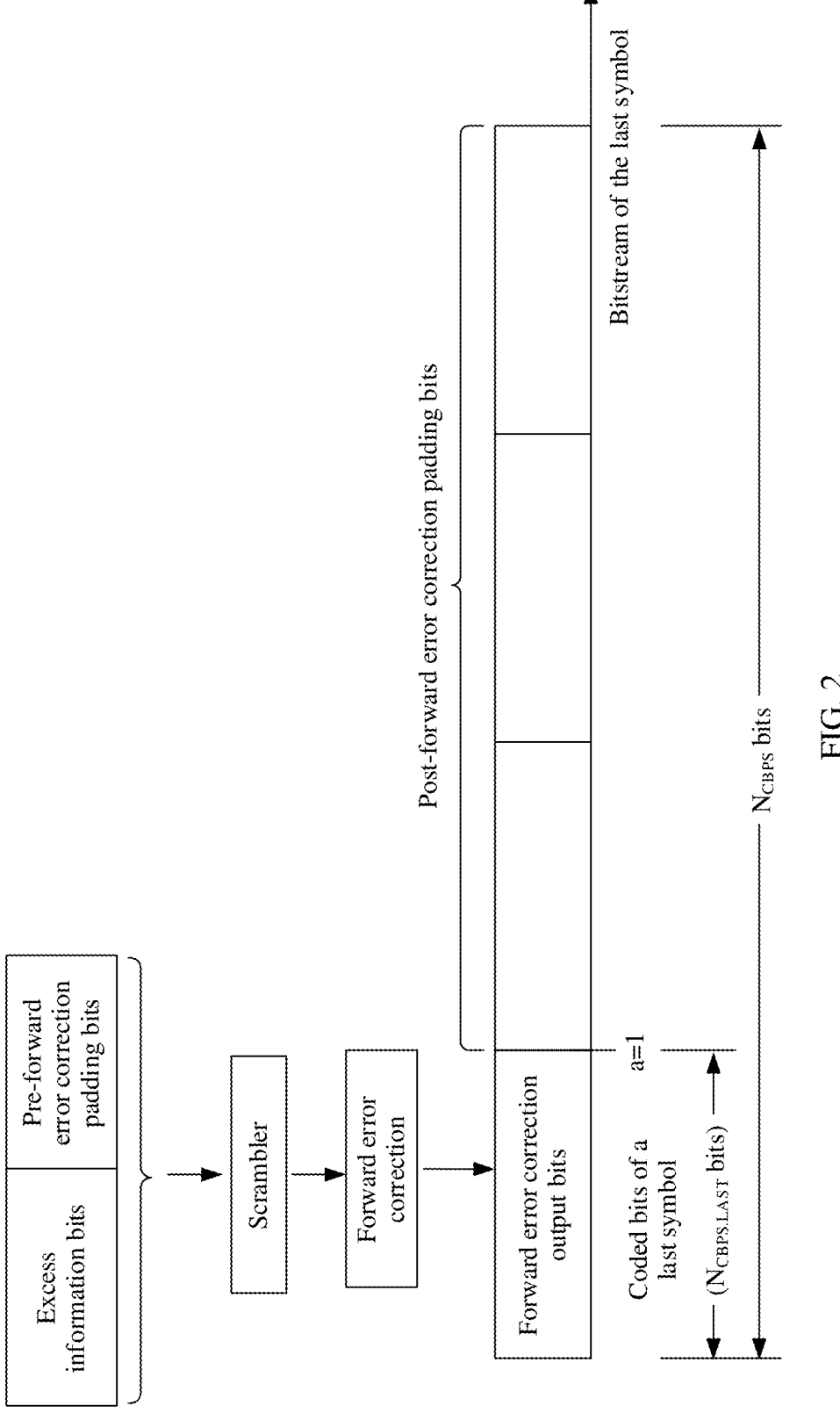
FIG. 2 is a PPDU bit padding process in a last coded symbol.

For ease of understanding, the following describes this with reference to FIG. 2.

FIG. 2 is a PPDU bit padding process in a last coded symbol. In FIG. 2, a indicates that excess information bits and pre-forward error correction padding bits occupy about a multiples of one quarter of subcarriers in a symbol after scrambling and coding. For example, in FIG. 2, a=1 indicates that the excess information bits and the pre-forward error correction padding bits occupy about one quarter of subcarriers in a symbol after scrambling and coding. Similarly, a=2 indicates that the excess information bits and the pre-forward error correction padding bits occupy about two quarters of subcarriers in a symbol after scrambling and coding; a=3 indicates that the excess information bits and the pre-forward error correction padding bits occupy about three quarters of subcarriers in a symbol after scrambling and coding; and a=3 indicates that the excess information bits and the pre-forward error correction padding bits occupy all subcarriers in a symbol after scrambling and coding.

As shown in FIG. 2, remaining subcarriers in a symbol are padded through post-FEC padding, so that a quantity of bits occupied by data reaches $N_{CBPS}$ bits, where $N_{CBPS}$ represents a quantity of bits coded in each symbol (coded bits per symbol). The pre-FEC padding bits and the excess information bits occupy about one quarter of subcarriers in the last coded symbol, in response to receiving the PPDU, a receive end decodes only the multiple of one quarter of subcarriers to decode the last coded symbol of the PPDU, without decoding the entire coded symbol. This saves decoding time and reserve more processing time for the PPDU.

However, due to uncertainty of duration corresponding to post-FEC padding and limitation of total duration, extra processing time reserved for the PPDU does not meet minimum time used by a receiver. To ensure that the extra processing time reserved for the PPDU reaches the minimum time (for example, 8 μs and 16 μs) used by the receiver, a field that is to be added is introduced into the last symbol of the PPDU, that is, a packet extension (packet extension, PE) field (field).

Figure 3:
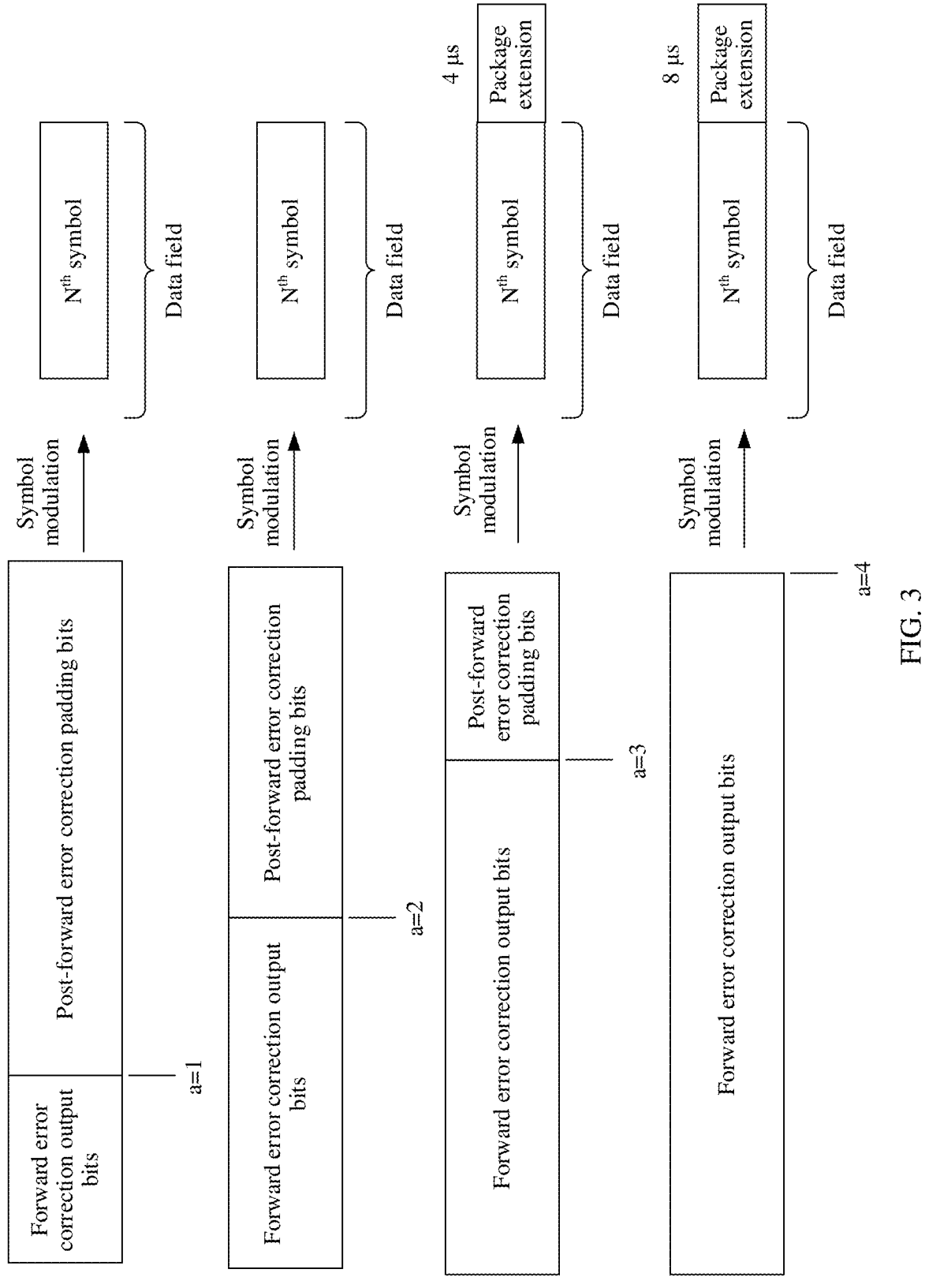
FIG. 3 is a schematic diagram of a PPDU according to at least one embodiment.

Refer to FIG. 3. FIG. 3 is a schematic diagram of a PPDU. FIG. 3 shows duration of a PE field in a PPDU in response to a=1, a=2, a=3, and a=4 in FIG. 2. The duration of the PE field is also referred to as nominal packet extension time (nominal $T_{PE}$). The nominal packet extension time is related to a nominal packet padding value (nominal packet padding value) included in the PPDU. From FIG. 3 that the nominal packet extension time is related to a value of a and the nominal packet padding value. For details, refer to Table 1.

TABLE 1

| Nominal packet extension time value (nominal $T_{PE}$ value) | | | |
|---|---|---|---|
| Nominal packet padding value (nominal packet padding value) | | | |
| a | 0 µs | 8 µs | 16 µs |
| 1 | 0 µs | 0 µs | 4 µs |
| 2 | 0 µs | 0 µs | 8 µs |
| 3 | 0 µs | 4 µs | 12 µs |
| 4 | 0 µs | 8 µs | 16 µs |

The second row in Table 1 represents the nominal packet padding value, which is 0 µs, 8 µs, or 16 µs. The post-FEC padding also provides extra processing time, and the processing time provided by the post-FEC padding and the nominal packet extension time are combined to obtain actual packet extension time ($T_{PE}$). From Table 1 the packet extension time is not necessarily equal to the minimum time used by the receiver (for example, 0 µs, 8 µs, or 16 µs). For example, the nominal packet padding value is equal to 16 µs, and the nominal $T_{PE}$ is 4 µs, 8 µs, 12 µs, or 16 µs. That is, $T_{PE}$ is greater than or equal to the nominal $T_{PE}$. Usually, the value of $T_{PE}$ is a minimum value.

For two communication ends, for example, a first device and a second device, to ensure that the first device has sufficient processing time for a data packet received from the second device, the first device indicates a modulation threshold corresponding to an NSTS and an RU size, and the second device determines, based on the modulation threshold, a to-be-used nominal packet padding value. Then, the second device determines the duration of the PE field based on the nominal packet padding value and the foregoing a, and pads, based on the duration of the PE, a PE field that is included in a PPDU sent to the first device. The second device generates the PPDU based on the duration of the PE field and sends the PPDU to the first device. This ensures that the first device has sufficient processing time, that is, ensure a minimum processing time requirement of the first device. In at least one embodiment, the first device indicates, to the second device, a nominal packet padding value to be used by the second device. To be used herein means that the second device determines the duration of the PE field based on the nominal packet padding value and the foregoing a.

In some embodiments, the first device indirectly indicates the nominal packet padding value to be used by the second device. In an example, the first device indicates a nominal packet padding value by using a nominal packet padding subfield (nominal packet padding subfield) that indicates the nominal packet padding value. For example, the first device sends, to the second device, a PPDU carrying a nominal packet padding subfield.

In some other embodiments, the first device indirectly indicates the nominal packet padding value to be used by the second device. In an example, the first device indirectly indicates a nominal packet padding value by using a modulation threshold related to the nominal packet padding value. For example, the first device sends, to the second device, a PPDU carrying a packet extension threshold subfield that indicates a modulation threshold.

In at least one embodiment, a manner in which a nominal packet padding subfield indicates a nominal packet padding value used by the second device is referred to as a direct indication manner, and a manner in which a packet extension threshold subfield indicating a modulation threshold indirectly indicates a nominal packet padding value used by the second device is referred to as an indirect indication manner. A PPDU includes a nominal packet padding subfield and a packet extension threshold subfield indicating a modulation threshold. To distinguish in response to the nominal packet padding subfield or the packet extension threshold subfield indicating a modulation threshold being used to indicate a nominal packet padding value, the PPDU further includes a physical layer packet extension thresholds present subfield (physical packet extension (PPE) thresholds present subfield). In response to a value of the physical layer packet extension thresholds present subfield being 0, the nominal packet padding subfield indicates the nominal packet padding value. In response to a value of the physical layer packet extension thresholds present subfield being 1, the packet extension threshold subfield indicating a modulation threshold indicates the nominal packet padding value.

The following separately describes the direct indication manner and the indirect indication manner of the nominal packet padding value.

Direct Indication Manner

As shown in FIG. 4, the physical layer packet extension thresholds present subfield and the nominal packet padding subfield are carried in an HE physical layer capabilities information field (HE PHY capabilities information field). The HE physical layer capabilities information field is included in an HE capabilities element (HE capabilities element), as shown in FIG. 5. The HE capabilities element includes an element field (element field), a length field (length field), an element identifier extension field (element ID extension field), an HE media access control capabilities information field (HE (medium access control, MAC) capabilities Information), an HE physical layer capabilities information field (HE PHY capabilities information), a supported high efficiency (HE)-modulation and coding scheme (modulation and coding scheme, MCS) and number of spatial streams (number of spatial streams, NSS) set field (Supported HE-MCS and NSS Set), and further includes a physical layer packet extension thresholds field (PPE thresholds field). In at least one embodiment, a quantity of bits occupied by each field or subfield included in the HE capabilities element is not limited. As shown in FIG. 5, the element field occupies 1 bit, the length field occupies 1 bit, the element identifier extension field occupies 1 bit, the HE media access control capabilities information field occupies 6 bits, the HE physical layer capabilities information field occupies 11 bits, and the physical layer packet extension thresholds field occupies a variable (variable) quantity of bits. In addition, the physical layer packet extension thresholds field is optional, that is, not mandatory.

In response to the value of the physical layer packet extension thresholds present subfield being 0, refer to Table 2 for the nominal packet padding value indicated by the nominal packet padding subfield.

TABLE 2

| Nominal packet padding subfield (nominal packet padding subfield) | | |
| --- | --- | --- |
| Subfield | Definition | Coding |
| Nominal packet padding subfield | In response to a PPE thresholds present subfield indicating 0, the nominal packet padding subfield indicates a nominal packet padding value, and the value is the same for all modulation schemes, quantities of space-time streams, and allocated RUs.<br>(Indicates the nominal packet padding to be used for all constellations, NSS and RU allocations the STA supports in response to the PPE Thresholds Present subfield being set to 0.) | In response to the nominal packet padding value being 0 µs for all constellations, NSSs, and RU allocations the STA supports, the nominal packet padding subfield is set to 0. (Set to 0 in response to the nominal packet padding being 0 µs for all constellations, NSS and RU allocations the STA supports.)<br>In response to the nominal packet padding value being 8 µs for all constellations, NSSs, and RU allocations the STA supports, the nominal packet padding subfield is set to 1. (Set to 1 in response to the nominal packet padding being 8 µs for all constellations, NSS and RU allocations the STA supports.)<br>In response to the nominal packet padding value being 16 µs for all constellations, NSSs, and RU allocations the STA supports, the nominal packet padding subfield is set to 2. (Set to 2 in response to the nominal packet padding being 16 µs for all constellations, NSS and RU allocations the STA supports.)<br>In response to the PPE thresholds presence being 1, the nominal packet padding subfield is set to 3, indicating a reserved state. (The value 3 is reserved, Reserved in response to the PPE Thresholds Present subfield being 1) |

As a quantity of streams supported by each device changes from 8 to 16, a supported modulation scheme changes from 1K quadrature amplitude modulation (quadrature amplitude modulation, QAM) to 4KQAM, and a supported bandwidth changes from 160 MHz to 320 MHz. A receiver uses more processing time in these cases. Based on this, a nominal packet padding value greater than 16 µs is proposed, for example, a nominal packet padding value supporting 20 µs is proposed.

Table 2 is still used, and an indication of the value 3 is added to the nominal packet padding subfield. For example, in response to the nominal packet padding value being 16 µs for all modes with a constellation less than or equal to 1024, an NSTS less than or equal to 8, and an RU smaller than or equal to 996×2, the nominal packet padding subfield is set to 3, and the nominal packet padding value corresponding to other modes is 20 µs. (Set to 3 in response to the nominal packet padding being 16 µs for all modes with constellation<=1024, NSTS<=8 and RU<=996×2, and 20 µs for all other modes the STA supports.) In other words, in response to the value of nominal packet padding subfield being 3, in response to the modulation scheme being less than or equal to 1KQAM, the NSTS is less than or equal to 8, and the RU size is less than or equal to 2×996, the nominal packet padding value is 16 µs. Otherwise, the nominal packet padding value is 20 µs.

In an example, the nominal packet padding field in the HE physical layer capabilities information field is still used, and a quantity of bits occupied by the nominal packet padding field is increased, to indicate a nominal packet padding value. In another example, a field indicating the nominal packet padding value is set in the newly defined EHT capabilities element.

Indirect Indication Mode:

The nominal packet padding value is indirectly indicated by using the physical layer packet extension thresholds present subfield and the physical layer packet extension thresholds field (PPE thresholds field) in the PPDU. For example, the value of the physical layer packet extension thresholds present subfield is 1, the physical layer packet extension thresholds field indicates a modulation threshold corresponding to an NSTS of n and an RU. The second device determines the nominal packet padding value based on the modulation threshold. In this manner, different nominal packet padding values is indicated based on different NSTSs, RU sizes, and modulation schemes, and this is more flexible.

Refer to FIG. 6 for an example. FIG. 6 is a schematic diagram depicting a structure of a physical layer packet extension thresholds field. The physical layer packet extension thresholds field includes an NSTS subfield, an RU index bitmask subfield (RU Index Bitmask subfield), a physical layer packet extension thresholds information field, and a physical layer packet extension padding (PPE padding) field.

The NSTS subfield indicates a quantity of space-time streams for sending data. For example, the NSTS subfield occupies 3 bits, and values of the 3 bits are 0 to 7, respectively indicating a first stream to an eighth stream. In other words, one value of the 3 bits corresponds to one space-time stream quantity. The RU index bitmask subfield indicates an RU size. Table 3 shows a relationship between the RU index bitmask subfield and the RU size.

TABLE 3

| RU allocation index | RU allocation size |
|---------------------|--------------------|
| 0 (bitmap 1000) | 242 |
| 1 (bitmap 0100) | 484 |
| 2 (bitmap 0010) | 996 |
| 3 (bitmap 0001) | 2 × 996 |

The RU index bitmask subfield is a bitmap (bitmap). In Table 3, the RU allocation index indicates a specific bit in the bitmap. For example, in Table 3, the RU index bitmask occupies 4 bits. The first row in Table 3 indicates that the first bit of the RU index bitmask is set to 1, and therefore, a corresponding RU indicated in FIG. 6 is 242. Similarly, the second row indicates that the second bit of the RU index bitmask is set to 1, and therefore, a corresponding RU indicated in FIG. 6 is 484, and so on. The RU allocation index is also referred to as an RU index (number). A smaller index (number) indicates a smaller RU size. In at least one embodiment, a granularity of the RU size is subcarrier. For example, 242 refers to 242 subcarriers, and 484 refers to 484 subcarriers.

In response to one or more of an NSTS, an RU size, and a modulation scheme used by a transmit end being different, corresponding minimum processing time used by a receive end is also different. In other words, corresponding nominal packet padding values is different. In an implementation, modulation thresholds corresponding to NSTSs from a $1^{st}$ stream to an $N^{th}$ stream and different RU sizes indicated from a minimum granularity are provided in an exhaustive or a traversal manner. A value of N is a maximum value of bits used by the NSTS subfield plus 1. For example, in response to the NSTS subfield using 3 bits, a maximum value of the NSTS subfield is 7, and a maximum quantity of streams that is indicated by the NSTS subfield is 8 (7+1=8). For example, in response to the NSTS subfield using 6 bits, a maximum value of the NSTS subfield is 15, and a maximum quantity of streams that is indicated by the NSTS subfield is 16 (15+1=16). In at least one embodiment, a value set of the NSTS subfield is denoted as [1, . . . , NSTN+1]. In this case, the $N^{th}$ stream is the $(NSTS+1)^{th}$ stream, that is, NSTS is equal to N. In at least one embodiment, the NSTS is equivalently replaced with the NSS, and the NSTS subfield is equivalently replaced with the NSS subfield.

In an example, the physical layer packet extension thresholds information field includes packet extension threshold subfield sets indicating modulation thresholds corresponding to different nominal packet padding values. In other words, the physical layer packet extension thresholds information field includes a plurality of packet extension threshold subfield sets corresponding to different nominal packet padding values, each packet extension threshold subfield set includes a plurality of packet extension threshold subfields, and each packet extension threshold subfield indicates a modulation threshold corresponding to an NSS of n and an RU with an index b. A value range of n is [1, . . . , N]. The index b herein is considered as an RU allocation index, and indicates an RU size. For example, a value range of b is [m, . . . , M], where [m, . . . , M] is a bit list formed by sequentially setting all bits set to 1 in the RU index bitmask subfield, and m is a least significant bit in the bit list. Using Table 3 as an example, a value range of b is [0, . . . , 3], that is, m is equal to 0, and M is equal to 3.

Refer to FIG. 7 for an example. FIG. 7 shows that the physical layer packet extension thresholds information field includes a packet extension threshold subfield set indicating a plurality of packet extension thresholds that correspond to a nominal packet padding value of 8 µs and a packet extension threshold subfield set indicating a plurality of packet extension thresholds that correspond to a nominal packet padding value of 16 µs. In at least one embodiment, a packet extension threshold subfield set indicating a plurality of packet extension thresholds that correspond to a nominal packet padding value of 8 µs is referred to as PPET8 NSTSn RUb subfields, and any subfield of the PPET8 NSTSn RUb subfields is referred to as a PPET8 NSTSn RUb subfield, indicating a modulation threshold corresponding to an NSTS of n and an RU with an index b. For example, in response to the PPET8 NSTSn RUb subfield occupying 3 bits, the PPET8 NSTSn RUb subfields indicates eight modulation thresholds. Similarly, a packet extension threshold subfield set indicating a plurality of packet extension thresholds that correspond to a nominal packet padding value of 16 µs is referred to as PPET16 NSTSn RUb subfields, and any subfield of the PPET16 NSTSn RUb subfields is referred to as a PPET16 NSTSn RUb subfield, indicating a modulation threshold corresponding to an NSTS of n and an RU with an index b. Alternatively, to be simpler, the PPET8 NSTSn RUb subfield is referred to as a PPET8 for short, that is, a PPET8 represents a PPET8 NSTSn RUb subfield. Similarly, the PPET16 NSTSn RUb subfield is referred to as a PPET16 for short.

FIG. 7 provides indications of a $1^{st}$ stream to an $N^{th}$ stream in an exhaustive or traversal manner and provides indications of RU sizes from a minimum granularity. The value of n traverses from 1 to N, that is, n is an element in [1, . . . , N], and b traverses from m to M. That is, the PPET16 NSTSn RUb and PPET8 NSTSn RUb subfields are present for all values of n and b where 1≤n≤(N) and where b=[m, . . . , M] is the set of integers equal to the ordered list of bit positions of all bits that are set to 1 in the RU Index Bitmask subfield, with m being the lowest value.

In at least one embodiment, the PPET8 NSTSn RUb subfield/PPET16 NSTSn RUb subfield indicates the modulation threshold corresponding to the NSTS of n and the RU with the index b. Alternatively, the PPET8 NSTSn RUb subfield/PPET16 NSTSn RUb subfield indicates the NSTS of n, the RU with the index b, and the modulation threshold. The modulation threshold indicates a modulation scheme, that is, the modulation threshold indicated by the PPET8 NSTSn RUb subfield/PPET16 NSTSn RUb subfield indicates a modulation scheme.

For example, a correspondence between the PPET8 NSTSn RUb subfield/PPET16 NSTSn RUb subfield and the modulation scheme is shown in Table 4. The modulation threshold indicated by the PPET8 NSTSn RUb subfield/ PPET16 NSTSn RUb subfield is similar to a constellation index in Table 4, to indirectly indicate the modulation scheme.

TABLE 4

| Constellation index (constellation index) | |
|-------------------------------------------|---|
| Constellation index | Corresponding transmission constellation |
| 0 | BPSK |
| 1 | QPSK |
| 2 | 16-QAM |
| 3 | 64-QAM |
| 4 | 256-QAM |
| 5 | 1024-QAM |

TABLE 4-continued

| Constellation index (constellation index) | |
|---|---|
| Constellation index | Corresponding transmission constellation |
| 6 | Reserved |
| 7 | None |

A structure of the physical layer packet extension thresholds field sent by the first device to the second device is shown in FIG. 7. The second device obtains the physical layer packet extension thresholds field of the first device, and determines, by using a combination of the PPET8 NSTSn RUb subfield and PPET16 NSTSn RUb subfield, a to-be-used nominal packet padding value. Specifically, the second device determines the nominal packet padding value according to Table 5. To be specific, in response to a result of comparison between a modulation scheme used by the second device and a modulation threshold indicated by the PPET8 NSTSn RUb subfields and a result of comparison between a modulation scheme used by the second device and a modulation threshold indicated by the PPET16 NSTSn RUb subfields meet a condition of a row in Table 5, the nominal packet padding value is a value corresponding to the row.

As shown in Table 5, in response to the result of comparison between the modulation scheme used by the second device and the modulation threshold indicated by the PPET8 meeting the condition 1, and the result of comparison between the modulation scheme used by the second device and the modulation threshold indicated by the PPET16 meeting the condition 2, the nominal packet padding value is a value corresponding to the condition 1 and the condition 2.

To be specific, in response to the constellation index x corresponding to the modulation scheme used by the second device being greater than or equal to the modulation threshold indicated by the PPET8, and the constellation index x corresponding to the modulation scheme used by the second device being less than the modulation threshold indicated by the PPET16 or the PPET16 being set to none, the nominal packet padding value is 8 µs. In response to the constellation index x corresponding to the modulation scheme used by the second device being greater than the modulation threshold indicated by the PPET8 or the PPET8 being set to none, and the constellation index x corresponding to the modulation scheme used by the second device being greater than or equal to the modulation threshold indicated by the PPET16, the nominal packet padding value is 16 µs. That is, in response to the condition 1 and the condition 2 of a row in Table 5 being met, the nominal packet padding value is a value in the row.

TABLE 5

PPE thresholds of PPET8 and PPET16 (PE thresholds per PPET8 and PPET16)

| Condition 1 | Condition 2 | Nominal packet padding value |
|---|---|---|
| Result of comparison between a constellation index x of an HE PPDU with an NSTS value n and an RU allocation index = (b + DCM) and a PPET8 NSTSn RU(b + DCM) subfield. (Result of comparison of the constellation index x of an HE PPDU with NSTS value n and RU allocation size that corresponds to the RU Allocation index = (b + DCM) to the value in the PPET8 NSTSn RU(b + DCM) subfield) | Result of comparison between a constellation index x of an HE PPDU with an NSTS value n and an RU allocation index = (b + DCM) and a PPET16 NSTSn RU(b + DCM) subfield. (Result of comparison of the constellation index x of an HE PPDU with NSTS value n and RU allocation size that corresponds to the RU Allocation index = value (b + DCM) to the value in the PPET16 NSTSn RU(b + DCM) subfield) | An HE PPDU uses a nominal packet padding value corresponding to the constellation index = x, NSTS = n, and RU allocation index = (b + DCM). (Nominal packet padding for an HE PPDU transmitted to this STA using the constellation index = x, NSTS = n and RU allocation size that corresponds to the RU Allocation index = (b + DCM)) |
| x is greater than or equal to a modulation threshold. indicated by PPET8 (x greater than or equal to PPET8). | x is less than a modulation threshold indicated by PPET16 or PPET16 is set to none. (x less than PPET16 or PPET16 equal to None) | 8 µs |
| x is greater than a modulation threshold indicated by PPET8 or PPET8 is set to none. (x greater than PPET8 or PPET8 equal to None) | x is greater than or equal to a modulation threshold indicated by PPET16. (x greater than or equal to PPET16) | 16 µs |
| All other combinations not listed in the table (All other combinations not otherwise listed in this table). | | 0 µs |

Note:
In response to the HE PPDU using dual-carrier modulation (dual carrier modulation, DCM), DCM = 1; otherwise, DCM = 0 (NOTE: DCM = 1 in response to the HE PPDU using DCM; DCM = 0 otherwise).

The modulation scheme in Table 5 refers to a modulation scheme based on the modulation scheme corresponding to RUb and with DCM being considered. "None" in Table 5 is understood as that a corresponding condition is not considered. For example, in response to a PPET8 subfield being set to none, an indication of the PPET8 subfield is not used for determining the nominal packet padding value.

As a quantity of streams supported by each device changes from 8 to 16, a supported modulation scheme changes from 1K quadrature amplitude modulation (quadrature amplitude modulation, QAM) to 4KQAM, and a supported bandwidth changes from 160 MHz to 320 MHz. A receiver uses more processing time in these cases, and a larger nominal packet padding value is to be indicated, for example, 20 µs or a nominal packet padding value of other durations.

Figure 8:
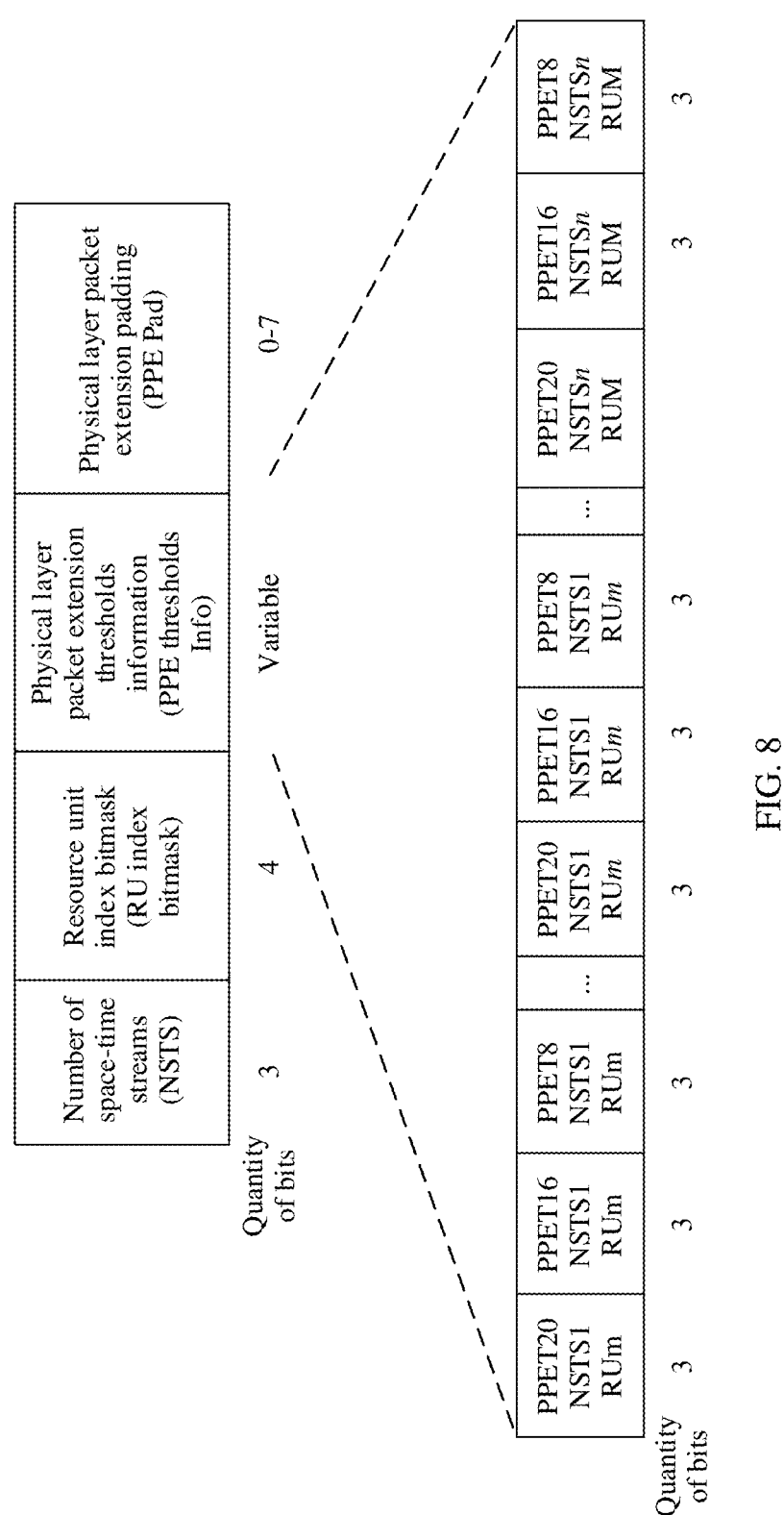
FIG. 8 is a schematic diagram depicting a structure of a physical layer packet extension thresholds information field according to at least one embodiment.

For example, the structure shown in FIG. 7 is still used, and a field indicating a nominal packet padding value of 20 µs is added to the physical layer packet extension thresholds information field shown in FIG. 7. For example, a packet extension threshold subfield set indicating a plurality of packet extension thresholds that correspond to a nominal packet padding value of 20 µs is added to the physical layer packet extension thresholds information field shown in FIG. 7. The set of subfields indicates modulation thresholds corresponding to different NSTSs and different RU sizes. However, the nominal packet padding value determined by the second device based on the modulation threshold is greater than 16 µs, for example, 20 µs. Similar to the PPET8 NSTSn RUb subfields, for ease of description, the set of subfields is denoted as PPET20 NSTSn RUb subfields, as shown in FIG. 8. That is, each PPET20 NSTSn RUb subfield in the PPET20 NSTSn RUb subfields indicates a modulation threshold corresponding to an NSTS of n and an RU with an index b.

Same as the PPET16 NSTSn RUb subfields, a value range of n is [1, . . . , N], and a value range of b is [m, . . . , M] in the PPET20 NSTSn RUb subfields. A difference lies in that a length of an NSTS subfield in FIG. 8 is longer than a length of the NSTS subfield in FIG. 7. For example, the NSTS subfield occupies 4 bits. In this case, the value range of n is [1, . . . , N], and N is equal to 16.

Similarly, a length of an RU index bitmask subfield in FIG. 8 is longer than a length of the RU index bitmask subfield in FIG. 7, that is, the RU index bitmask subfield in FIG. 8 occupies more bits. For example, the RU index bitmask field occupies 5 bits. In this case, a maximum granularity of an RU indicated by the RU index bitmask subfield is 3×996. For another example, the RU index bitmask subfield occupies 6 bits. In this case, a maximum granularity of an RU indicated by the RU index bitmask subfield is 4×996. Certainly, the RU index bitmask subfield occupies more bits, and an RU size is 242+484, 484+996, 242+484+996, 2×996+484, 2×996+996, 3×996+484, or the like. In this case, in the value range [m, . . . , M] of b, M is greater than or equal to 5.

Similarly, considering occurrence of a higher modulation scheme, a constellation index corresponding to any PPET20 NSTSn RUb subfield in the PPET20 NSTSn RUb subfields corresponds to more bits, for example, 4 bits, and indicates 16 modulation thresholds. In at least one embodiment, a quantity of bits occupied by the NSTS subfield is not limited, a quantity of bits occupied by the RU index bitmask field is not limited, and a quantity of bits corresponding to the constellation index corresponding to the PPET20 NSTSn RUb subfield is not limited.

The PPET20 NSTSn RUb subfield, the PPET16 NSTSn RUb subfield, and the PPET8 NSTSn RUb subfield respectively indicate a modulation threshold corresponding to an NSTS of n and an RU with an index b. For ease of description, the modulation threshold indicated by the PPET20 NSTSn RUb subfield is referred to as a first modulation threshold, the modulation threshold indicated by the PPET16 NSTSn RUb subfield is referred to as a second modulation threshold, and the modulation threshold indicated by the PPET8 NSTSn RUb subfields is referred to as a third modulation threshold below. For ease of description, the PPET20 NSTSn RUb subfield, the PPET16 NSTSn RUb subfield, and the PPET8 NSTSn RUb subfield is referred to as the PPET20/16/8 NSTSn RUb subfield In at least one embodiment. The PPET20 NSTSn RUb subfields, the PPET16 NSTSn RUb subfields, and the PPET8 NSTSn RUb subfields is referred to as the PPET20/16/8 NSTSn RUb subfields In at least one embodiment.

The second device determines, by using a combination of the PPET8 NSTSn RUb subfield, the PPET16 NSTSn RUb subfield, and the PPET20 NSTSn RUb subfield, a to-be-used nominal packet padding value. In other words, the second device determines the nominal packet padding value based on a result of comparison between the used modulation scheme and the first modulation threshold, the second modulation threshold, and the third modulation threshold respectively. Specifically, the second device determines the nominal packet padding value according to Table 6. In response to a condition 1, a condition 2, and a condition 3 of a row in Table 6 being met, the second device determines a value corresponding to the row as a nominal packet padding value to be used. To be specific, in response to the second device determines that conditions of a row in Table 6 being met, the second device determines to use a value shown in the row as the nominal packet padding value.

TABLE 6

| | PPE thresholds of PPET8, PPET16, and PPET20 | | | |
|---|---|---|---|---|
| No. | Condition 1 | Condition 2 | Condition 3 | Nominal packet padding value |
| 1 | x is greater than or equal to a modulation threshold indicated by PPET8 (x greater than or equal to PPET8). | x is less than a modulation threshold indicated by PPET16 or PPET16 is set to none (x less than PPET16 or PPET16 equal to None). | x is less than a modulation threshold indicated by PPET20 or PPET20 is set to none (x less than PPET20 or PPET20 equal to None). | 8 µs |
| 2 | x is greater than a modulation threshold indicated by PPET8 or PPET8 is set to none (x greater than PPET8 or PPET8 equal to None). | x is greater than or equal to a modulation threshold indicated by PPET16 (x greater than or equal to PPET16). | x is less than a modulation threshold indicated by PPET20 or PPET20 is set to none (x less than PPET20 or PPET20 equal to None). | 16 µs |
| 3 | x is greater than a modulation threshold indicated | x is greater than a modulation threshold indicated by PPET16 | x is greater than or equal to a modulation | 20 µs |

TABLE 6-continued

| | | | Nominal packet |
|---|---|---|---|
| | PPE thresholds of PPET8, PPET16, and PPET20 | | |
| No. | Condition 1 | Condition 2 | Condition 3 | padding value |
|---|---|---|---|---|
| | by PPET8 or PPET8 is set to none (x greater than PPET8 or PPET8 equal to None). | or PPET16 is set to none (x greater than PPET16 or PPET16 equal to None). | threshold indicated by PPET20 (x greater than or equal to PPET20). | |

Note:
In response to the HE PPDU using DCM, DCM = 1; otherwise, DCM = 0 (NOTE: DCM = 1 in response to the HE PPDU using DCM; DCM = 0 otherwise).

As shown in Table 6, in response to the condition 1, the condition 2, and the condition 3 in the first row being met, the nominal packet padding value is 8 μs. In response to the condition 1, the condition 2, and the condition 3 in the second row being met, the nominal packet padding value is 16 μs. In response to the condition 1, the condition 2, and the condition 3 in the third row being met, the nominal packet padding value is 20 μs.

From FIG. 7 and FIG. 8, as a quantity of streams and RU sizes and types increase, modulation thresholds corresponding to the $1^{st}$ stream to the $N^{th}$ stream and various RU sizes are indicated in an exhaustive or traversal manner, and nominal packet padding values are indirectly indicated by using the modulation thresholds. Consequently, overheads are large. In particular, more different RUs are introduced in 802.11be, so that overheads of the PPE thresholds field are large.

To reduce the overheads of the PPE thresholds field, some MRUs or RUs is combined, that is, multiple types of RUs of different sizes have a same index. In other words, a relationship between an RU index bitmask subfield and an RU size shown in Table 7 is obtained through extension based on Table 3.

TABLE 7

| RU allocation index | RU allocation size |
|---|---|
| 0 (bitmap 100000) | 242 |
| 1 (bitmap 01000) | 484 |
| 2 (bitmap 001000) | 242 + 484/996 |
| 3 (bitmap 000100) | 996 + 484/2 × 996/242 + 484 + 996 |
| 4 (bitmap 000010) | 2 × 996 + 484/3 × 996 |
| 5 (bitmap 000001) | 3 × 996 + 484/4 × 996 |

In Table 7, multiple types of RUs of different sizes have a same index, that is, multiple types of RUs of different sizes corresponds to one PPET20/16/8 NSTSn RUb subfield, to reduce the overheads of the PPE thresholds field. However, as shown in Table 7, although the overheads of the PPE thresholds field are reduced in response to multiple types of RUs of different sizes corresponding to a same index reducing, the PPE thresholds field are not flexible.

In view of this, at least one embodiment provides a nominal packet padding value indication method, to reduce overheads of a PPE thresholds field, and more flexibly indicate a nominal packet padding value corresponding to each NSTS and each RU size. In a case of no conflict, the NSTS in at least one embodiment is replaced with the NSS. The NSS is used as an example below.

The technical solutions provided in at least one embodiment are described below in detail with reference to the accompanying drawings. In the following description, an example in which a receiver is a first device and a transmitter is a second device is used to describe how the first device indicates, to the second device, a nominal packet padding value used by the second device. Refer to FIG. 9. FIG. 9 is a schematic flowchart of a nominal packet padding value indication manner according to at least one embodiment. The procedure is described as follows.

S901: A first device generates a PPDU. The PPDU includes a physical layer packet extension thresholds present subfield and a physical layer packet extension thresholds field, a value of the physical layer packet extension thresholds present subfield is 1, and the physical layer packet extension thresholds field includes an NSS subfield, an RU index bitmask subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by a second device in response to a modulation scheme being higher than or equal to the modulation threshold. A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the value range of b does not include y.

S902: The first device sends the PPDU to the second device, and the second device receives the PPDU.

S903: The second device determines a to-be-used nominal packet padding value based on a modulation threshold that is indicated by the physical layer packet extension thresholds field and that corresponds to the NSS of n and an RU with an index m1.

In at least one embodiment, a modulation threshold corresponding to an RU is indicated without traversing all RUs of different sizes. For example, the PPE thresholds field omits a PPET20 NSSn RUy subfield, a PPET16 NSSn RUy subfield, and a PPET8 NSSn RUy subfield corresponding to the NSS of n and the RU with the index y, while the PPE thresholds field still indicates the modulation threshold corresponding the NSS of n and the RU with the index y. That is, the value range of n is a subset of [1, . . . , N], N is an integer greater than or equal to 1, the value range of b is a subset of [m, . . . , M], m and M are integers greater than or equal to 0, and the value range of b does not include y. That is, the PPE thresholds field does not include the PPET20 NSSn RUy subfield, the PPET16 NSSn RUy subfield, and the PPET8 NSSn RUy subfield.

In at least one embodiment (referred to as an implementation 1 In at least one embodiment), in at least one embodiment, that some bits in the RU index bitmask subfield are set to 0 is redefined. For example, an index (that is, an index) is still configured for an RU corresponding to a bit set to 0, but a modulation threshold corresponding to the RU corresponding to the bit set to 0 in the RU index bitmask subfield is not indicated. According to the stipulation of 802.11ax, the PPE thresholds field omits a PPET20/16/8 NSSn RUb subfield corresponding to an RU corresponding to a bit set to 0. However, in at least one embodiment, an index is still configured for the RU corresponding to the bit set to 0. Therefore, even in response to the PPET20/16/8 NSSn RUb subfield corresponding to the RU corresponding to the bit set to 0 being omitted in the PPE thresholds field, a modulation threshold corresponding to the RU corresponding to the bit set to 0 is still indicated. The second device determines, based on the modulation threshold, a nominal packet padding value corresponding to the RU corresponding to the bit set to 0.

In other words, an index of the RU corresponding to the bit set to 0 is y, that is, in response to a value of the RU index modulation threshold corresponding to the NSS of n and the RU with the index y is equal to a modulation threshold corresponding to the NSS of n and an RU with an index m1. That is, for a same NSS, that the value of the RU index bitmask subfield corresponding to the RU with the index y is 0 indicates that the modulation threshold corresponding to the NS S of n and the RU with the index y is the modulation threshold corresponding to the NSS of n and the RU with the index m1. For example, m1 is a smallest index in indexes that correspond to a bit being 1 in the RU index bitmask subfield and that are greater than y. In other words, for an equation between the modulation threshold corresponding to the NSS of n and the RU with the index y and the modulation threshold corresponding to the NSS of n and the RU with the index m1, a condition 1 is to be met, that is, the bit corresponding to the RU with the index y in the RU index bitmask is set to 0, and m1 is the smallest index in indexes that correspond to a bit being 1 in the RU index bitmask subfield and that are greater than y.

For ease of understanding, refer to Table 8, which is a table of a correspondence between an RU index bitmask, an RU allocation index, an RU size, and a nominal packet padding value.

TABLE 8

| RU/ MRU | 242 (RU0) | 484 (RU1) | 242 + 484/996 (RU2) | 996 + 484/2 × 996/ 242 + 484 + 996 (RU3) | 2 × 996 + 484/ 3 × 996 (RU4) | 3 × 996 + 484/ 4 × 996 (RU5) |
|---|---|---|---|---|---|---|
| RU allocation index | 0 | 1 | 2 | 3 | 4 | 5 |
| RU bitmask index | 0 | 0 | 1 | 0 | 0 | 1 |
| Nominal packet padding value | 0 µs | 0 µs | Self-defined (value corresponding to the RU2) | Same as a value corresponding to the RU5 | Same as a value corresponding to the RU5 | Self-defined (value corresponding to the RU5) | bitmask subfield corresponding to the RU with the index y being 0, the value range of b does not include y. That is, the PPE thresholds field does not include the PPET20/16/8 NSSn RUy subfield corresponding to the NSS of n and the RU with the index y, while the PPE thresholds field still implicitly indicates the modulation threshold corresponding to the NSS of n and the RU with the index y. Because the PPET20/16/8 NSSn RUy subfield is omitted in the PPE thresholds field, overheads of the PPE thresholds field is reduced. In addition, the omitted PPET20/16/8 NSSn RUy subfield actually has a corresponding constellation index. A corresponding constellation index is redefined for an RU (that is, the RU with the index y) corresponding to the omitted PPET20/16/8 NSSn RUy subfield. Therefore, even in response to there are multiple types of RUs, different types of RUs corresponding to different constellation indexes. This is more flexible than that multiple types of RUs correspond to a same constellation index. Certainly, in at least one embodiment, multiple types of RUs also corresponds to a same constellation index.

The following describes how to indicate the modulation threshold corresponding to the NSS of n and the RU with the index y in response to the PPET20/16/8 NSSn RUy subfield corresponding to the NSS of n and the RU with the index y being omitted in the PPE thresholds field. For example, the following several cases is included.

Case 1: In a packet extension threshold subfield set that corresponds to a same nominal packet padding value, the Self-defined in Table 8 means that a nominal packet padding value corresponding to an RU is determined by the RU. Table 8 uses an example in which six types of RUs/ MRUs are included. For ease of description, the six types of RUs/MRUs are denoted as RU0, RU1, RU2, RU3, RU4, and RU5 in Table 8.

In at least one embodiment, that some bits in the RU index bitmask subfield are set to 0 are redefined. For example, in Table 8, bits that correspond to the RU3 and the RU4 and that are set to 0 in the RU index bitmask subfield are redefined, that is, the RU3 and the RU4 still have corresponding constellation indexes, instead of directly specifying that nominal packet padding values corresponding to the RU3 and the RU4 are 0.

Because the values corresponding to the RU3 and the RU4 in the RU index bitmask subfield are 0, the PPET20/ 16/8 NSSn RUb subfield corresponding to the RU3 or the RU4 is omitted in the PPE thresholds field. An understanding is that b=3 or 4. To provide modulation thresholds corresponding to the RU3 and the RU4, in at least one embodiment the modulation thresholds corresponding to the RU3 and the RU4 are the same as modulation thresholds corresponding to other RUs. For example, the modulation threshold corresponding to the NSS of n and the RU with the index y is equal to the modulation threshold corresponding to the NSS of n and the RU with the index m1, where m1 is the smallest index in indexes that correspond to a bit being 1 in the RU index bitmask subfield and that are greater than y.

The RU3 is used as an example, that is, y=3. As shown in Table 8, m1=5. In other words, the modulation threshold corresponding to the RU3 is the modulation threshold corresponding to the RU5. Similarly, the modulation threshold corresponding to the RU4 is the modulation threshold corresponding to the RU5. The RU1 is used as another example, that is, y=1. As shown in Table 8, y=1, and m1=2. In other words, the modulation threshold corresponding to the RU1 is the modulation threshold corresponding to the RU2. Although the PPET20/16/8 NSSn RUb subfield corresponding to the RU with the index y is omitted in the PPE thresholds field, the modulation threshold corresponding to the RU with the index y is still determined by using a PPET20/16/8 NSSn Rub subfield corresponding to another RU.

Certainly, in response to m1 that meets the condition 1 not existing, that is, in response to no index corresponding to a bit being 1 in the RU index bitmask subfield being greater than y, that the value of the RU index bitmask subfield corresponding to the RU with the index y being 0 indicates that a nominal packet padding value corresponding to the NSS of n and the RU with the index y is another fixed value, for example, the nominal packet padding value is 20 microseconds or another value. That is, Table 8 does not include the column of the RU5. In this case, the protocol specifies a value as the nominal packet padding value. For example, the nominal packet padding value is 20 microseconds, and the second device determines that the nominal packet padding value corresponding to the RU with the index y is 20 microseconds.

In an alternative solution, in at least one embodiment, for an equation between the modulation threshold corresponding to the NSS of n and the RU with the index y and the modulation threshold corresponding to the NSS of n and the RU with the index m1, a condition 2 is to be met. Condition 2: The bit corresponding to the RU with the index y in the RU index bitmask is set to 0, m1 is the smallest index in indexes that correspond to a bit being 1 in the RU index bitmask subfield and that are greater than y, and at least one of bits in the RU index bitmask subfield that correspond to RUs with indexes less than y is set to 1.

Still refer to Table 8. RU3 is used as an example, that is, y=3. In response to y=3, m1=5, and RUs with indexes less than 3 including the RU0, the RU1, and the RU2, the bit and the RU1, the bits corresponding to the RU0 and the RU1 in the RU index bitmask do not include a bit set to 1, that is, the condition 2 is not met. In this case, the modulation threshold corresponding to the RU1 is not determined based on the modulation threshold corresponding to the RU2. For example, in Table 8, the nominal packet padding value corresponding to the modulation threshold corresponding to the RU1 is 0 microseconds.

That is, as shown in Table 8, in response to there being no index that corresponds to a bit being 1 in the RU index bitmask subfield and that is greater than y, the nominal packet padding value that is used by the second device is 0 microseconds. In response to y is the smallest index in indexes that corresponding to a bit being 1 in the RU index bitmask subfield and that are greater than y, bits corresponding to RUs with indexes less than y in the RU index bitmask include a bit set to 1, and bits corresponding to RUs with indexes greater than y in the RU index bitmask include a bit set to 1, the nominal packet padding value used by the second device is determined based on a modulation threshold corresponding to a closest RU with an index greater than y, where the index of the closest RU refers to an index having a smallest difference with y. In response to y being the smallest index in indexes that correspond to a bit being 1 in the RU index bitmask subfield and that are greater than y, but bits corresponding to RUs with indexes less than y in the RU index bitmask subfield are all set to 0, the nominal packet padding value that is used by the second device is 20 microseconds.

In an alternative solution, m1 is a largest index in indexes that correspond to a bit being 1 in the RU index bitmask subfield and that are less than y. In other words, for an equation between the modulation threshold corresponding to the NSS of n and the RU with the index y and the modulation threshold corresponding to the NSS of n and the RU with the index m1, a condition 3 is to be met. Condition 3: The bit corresponding to the RU with the index y in the RU index bitmask is set to 0, and m1 is the largest index in indexes that correspond to a bit being 1 in the RU index bitmask subfield and that are less than y.

For ease of understanding, refer to Table 9, which is a table of a correspondence between an RU index bitmask, an RU allocation index, an RU size, and a nominal packet padding value.

TABLE 9

| RU/MRU | 242 (RU0) | 484 (RU1) | 242 + 484/996 (RU2) | 996 + 484/ 2 × 996/ 242 + 484 + 996 (RU3) | 2 × 996 + 484/ 3 × 996 (RU4) | 3 × 996 + 484/ 4 × 996 (RU5) |
|---|---|---|---|---|---|---|
| RU allocation index | 0 | 1 | 2 | 3 | 4 | 5 |
| RU bitmask index | 0 | 0 | 1 | 0 | 1 | 0 |
| Nominal packet padding value | 0 µs | 0 µs | Self-defined | Same as a value corresponding to the RU2 | Self-defined | Same as a value corresponding to the RU4 | corresponding to the RU2 in the RU index bitmask includes a bit set to 1, that is, the condition 2 is met. In this case, the modulation threshold corresponding to the RU3 is equal to the modulation threshold corresponding to the RU5. The RU2 is used as an example, that is, y=1. In response to y=1, m1=2, and RUs with indexes less than 2 including the RU0

Self-defined in Table 9 means that a nominal packet padding value corresponding to an RU is determined by the RU. Table 9 uses an example in which six types of RUs/MRUs are included. For ease of description, the six types of RUs/MRUs are denoted as RU0, RU1, RU2, RU3, RU4, and RU5 in Table 9.

Similar to Table 8, because the values corresponding to the RU3 and the RU5 in the RU index bitmask subfield are 0, the PPET20/16/8 NSSn Rub subfield corresponding to the RU3 or the RU5 is omitted in the PPE thresholds field. An understanding is that b=3 or 5. To provide modulation thresholds corresponding to the RU3 and the RU5, in at least one embodiment that the modulation thresholds corresponding to the RU3 and the RU5 are the same as modulation thresholds corresponding to other RUs. For example, in response to the condition 3 being met, the modulation threshold corresponding to the NSS of n and the RU with the index y is the modulation threshold corresponding to the NSS of n and the RU with the index m1.

RU3 is used as an example, that is, y=3. The index m1 of the RU2 is 2 and is less than 3, and m1 is the largest index in indexes that correspond to the RUs and that correspond to a bit being 1 in the RU index bitmask. Therefore, the modulation threshold corresponding to the NSS of n and the RU with the index 3 (RU3) is equal to the modulation threshold corresponding to the NSS of n and the RU with the index 2 (RU2). Similarly, the RU5 in Table 9 is used as an example, that is, y=5. The largest index in indexes that correspond to the RUs and that correspond to a bit being 1 in the RU index bitmask is the index corresponding to the RU4, and the index 4 corresponding to the RU is smaller than the index corresponding to the RU5. Therefore, the modulation threshold corresponding to the NSS of n and the RU with the index 5 (RU5) is equal to the modulation threshold corresponding to the NSS of n and the RU with the index 4 (RU4). Although the PPET20/16/8 NSSn Rub subfield corresponding to the RU3 and the RU5 is omitted in the PPE thresholds field, modulation thresholds corresponding to the RU3 and the RU5 is still determined by using the PPET20/16/8 NSSn Rub subfield corresponding to the RU2 and the RU4.

Certainly, in response to m1 that meets the condition 3 not existing, that is, no index corresponding to a bit being 1 in the RU index bitmask subfield is less than y, that the value of the RU index bitmask subfield corresponding to the RU with the index y is 0 indicates that a nominal packet padding value corresponding to the NSS of n and the RU with the index y is another fixed value, for example, the nominal packet padding value is 0 microseconds or another value. For example, for the RU3, Table 9 does not include the column of the RU2. In this case, the protocol specifies a value as the nominal packet padding value. For example, the nominal packet padding value is 0 microseconds. Alternatively, for the RU 5, Table 9 does not include the column of the RU4. In this case, the protocol specifies a value as the nominal packet padding value. For example, the nominal packet padding value is 0 microseconds.

In an alternative solution, in at least one embodiment, for an equation between the modulation threshold corresponding to the NSS of n and the RU with the index y and the modulation threshold corresponding to the NSS of n and the RU with the index m1, a condition 4 is to be met. Condition 4 is: The bit corresponding to the RU with the index y in the RU index bitmask is set to 0, m1 is the largest index in indexes that correspond to a bit being 1 in the RU index bitmask subfield and that are less than y, and at least one of bits in the RU index bitmask that correspond to RUs with indexes less than y is set to 1.

The example in Table 9 is still used. The RU3 is used as an example, that is, y=3. In response to y=3, m1=2, and RUs with indexes less than 3 including the RU0, the RU1, and the RU2, the bit corresponding to the RU2 in the RU index bitmask includes a bit set to 1, that is, the condition 4 is met.

In this case, the modulation threshold corresponding to the RU3 is equal to the modulation threshold corresponding to the RU2. The RU5 is used as an example, that is, y=5. In response to y=5, m1=4, and RUs with indexes less than 5 including the RU0, the RU1, the RU2, the RU3, and the RU4, the bits corresponding to the RU2 and the RU4 in the RU index bitmask include a bit set to 1, that is, the condition 4 is met. In this case, the modulation threshold corresponding to the RU5 is equal to the modulation threshold corresponding to the RU4. The RU2 is used as an example, that is, y=2. In response to y=2, m1=1, and RUs with indexes less than 1 including the RU0, the bit corresponding to the RU0 in the RU index bitmask does not include a bit set to 1, that is, the condition 4 is not met. In this case, the modulation threshold corresponding to the RU2 is not determined based on the modulation threshold corresponding to the RU1. For example, in Table 9, the nominal packet padding value corresponding to the modulation threshold corresponding to the RU2 is fixed to 0 microseconds.

if there is no index that corresponds to a bit being 1 in the RU index bitmask subfield and that is less than y, the nominal packet padding value that is used by the second device is 0 microseconds. In response to y being the largest index in indexes that correspond to a bit being 1 in the RU index bitmask subfield and that are less than y, bits corresponding to RUs with indexes greater than y in the RU index bitmask include a bit set to 1, and bits corresponding to RUs with indexes less than y in the RU index bitmask include a bit set to 1, the nominal packet padding value used by the second device is determined based on a modulation threshold corresponding to a closest RU with an index less than y, where the index of the closest RU has a smallest difference with y. In response to y being the largest index in indexes that correspond to a bit being 1 in the RU index bitmask subfield and that are less than y, but bits corresponding to RUs with indexes greater than y in the RU index bitmask subfield are all set to 0, the nominal packet padding value that is used by the second device is 20 microseconds.

In response to the RU index bitmask value corresponding to the index y being 0, but an RU used by the second device being less than or equal to 2×996, a quantity of streams is less than or equal to 8, and a modulation scheme is lower than or equal to 1KQAM, according to the manner shown in Table 8 or Table 9, in response to the nominal packet padding value used by the second device being greater than 16 microseconds, for example, 20 microseconds, in this case, the nominal packet padding value used by the second device is 16 microseconds by default, for better compatibility with existing regulations of 802.11ax.

The solution in the foregoing case 1 is considered as follows: In response to all values before a value set to 0 in an RU index bitmask subfield being 0, a nominal packet padding value corresponding to an RU corresponding to a bit set to 1 in the RU index bitmask subfield is 0 microseconds. In response to a bit set to 0 in the RU index bitmask subfield being located between two bits that are set to 1 in the RU index bitmask subfield, a modulation threshold corresponding to an RU corresponding to the bit set to 0 in the RU index bitmask subfield is determined based on a modulation threshold of an RU closest to the bit whose value is 0 in the RU index bitmask subfield. A difference between the index of the closest RU and the index of the RU corresponding to the bit of the RU index bitmask subfield whose value is 0 is the smallest. In response to all values after the bit set to 0 in the RU index bitmask subfield being 0, the nominal packet padding value corresponding to the RU corresponding to the bit set to 0 in the RU index bitmask subfield is 20 microseconds.

For ease of understanding, refer to Table 10, which is a table of a correspondence between an RU index bitmask, an RU allocation index, an RU size, and a nominal packet padding value.

TABLE 10

| RU/MRU | 242 (RU0) | 484 (RU1) | 242 + 484/ 996 (RU2) | 996 + 484/2 × 996/ 242 + 484 + 996 (RU3) | 2 × 996 + 484/3 × 996 (RU4) | 3 × 996 + 484/4 × 996 (RU5) |
|---|---|---|---|---|---|---|
| RU allocation index | 0 | 1 | 2 | 3 | 4 | 5 |
| RU bitmask index | 0 | 1 | 0 | 0 | 1 | 0 |
| Nominal packet padding value | 0 µs | Self-defined | Same as a value corresponding to the RU4 | Same as a value corresponding to the RU4 | Self-defined | 20 µs |

The RU2 in Table 10 is used as an example. The RU2 has an RU index bitmask of 0, and is located between the RU1 whose RU index bitmask is set to 1 and the RU4 whose RU index bitmask is set to 1. In this case, the modulation threshold corresponding to the RU2 is determined based on the modulation threshold corresponding to the RU4. The RU0 is used as an example. The RU index bitmask value corresponding to the RU0 is 0, the RU0 is located before the RU1 to the RU5, and the RU index bitmask value of the RU1 is 1. In this case, the nominal packet padding value corresponding to the RU0 is 0 microseconds. The RU5 is used as an example. The RU index bitmask value corresponding to the RU5 is 0, and the RU5 is located after the RU0 to the RU4. In this case, the nominal packet padding value corresponding to the RU5 is 20 microseconds.

Case 2: A bit corresponding to the RU with the index y in the RU index bitmask is set to 0, and a nominal packet padding value corresponding to the NSS of n and the RU with the index y is a fixed value. For example, the bit corresponding to the RU with the index y in the RU index bitmask is set to 0, and the nominal packet padding value corresponding to the NSS of n and the RU with the index y is 0 microseconds. Different from case 1, in this case, the second device directly determines a nominal packet padding value for sending a data packet to the first device. This is simple.

In an alternative solution of the case 2, in response to the bit corresponding to the RU with the index y in the RU index bitmask being set to 0, and RU index bitmask values corresponding to indexes less than y not including 1, the nominal packet padding value corresponding to the NSS of n and the RU with the index y is a fixed value, for example, 0 microseconds. The RU3 in Table 9 is used as an example, that is, y=3. RUs corresponding to indexes less than 3 include the RU0, the RU1, and the RU2. Because the RU index bitmask value corresponding to the RU2 includes 1, the nominal packet padding value corresponding to the RU3 is determined based on a modulation threshold corresponding to another RU. The RU2 in Table 9 is used as an example, that is, y=2. RUs corresponding to indexes less than 2 include the RU0 and the RU1. Because RU index bitmask values corresponding to the RU0 and the RU1 do not include 1, the nominal packet padding value corresponding to the RU2 is a fixed value.

In Table 8 and Table 9, one index (RU allocation index) corresponds to multiple types of RUs of different sizes is merely an example. For example, in Table 9, RU allocation indexes corresponding to a 242+484 RU and a 996 RU are both 2. In at least one embodiment, a quantity of RU types corresponding to one RU allocation index is not limited. For example, one RU corresponds to one RU allocation index. In other words, a correspondence shown in Table 11 is also applicable to at least one embodiment. In the foregoing RUs of different sizes, the RU is a single RU, for example, an RU with 996 subcarriers (shown as 996 in the table), or is an MRU, for example, an MRU including an RU with 996 subcarriers and an RU with 484 subcarriers (shown as 996+484 in the table), or an MRU including two RUs with 996 subcarriers separately (shown as 2×996 in the table).

TABLE 11

| RU/MRU | 242 | 484 | 242 + 484 | 996 | 996 + 484/2 × 996 | 2 × 996 + 484/3 × 996 | 3 × 996 + 484/4 × 996 |
|---|---|---|---|---|---|---|---|
| RU allocation index | 0 | 1 | 2 | 3 | 4 | 5 | 6 |

Different from the implementation 1, in at least one embodiment 2, in at least one embodiment a nominal packet padding value corresponding to an RU corresponding to a bit set to 0 in the RU index bitmask subfield is a fixed value. This is more direct.

For example, in response to the bit in the RU index bitmask subfield corresponding to the RU with the index y being set to 0, the nominal packet padding value corresponding to the NSS of n and the RU with the index y is a fixed value. For example, the nominal packet padding value corresponding to the NSS of n and the RU with the index y is 8 microseconds, 16 microseconds, or 20 microseconds.

For another example, in response to the bit in the RU index bitmask subfield corresponding to the RU with the index y being set to 0, and at least one bit whose value is 1 existing before the bit set to 0, the nominal packet padding value corresponding to the NSS of n and the RU with the index y is a fixed value. For example, the nominal packet padding value corresponding to the NSS of n and the RU with the index y is 8 microseconds, 16 microseconds, or 20 microseconds.

In the implementation 2, besides the PPET20/16/8 NSSn Rub subfield corresponding to the RU with the index y, a PPET20/16/8 NSSn Rub subfield corresponding to an RU with another index is also omitted in the PPE thresholds field. This further reduces overheads.

In embodiment 3, an NSS range indicated by the NSS subfield in the PPE thresholds field is used to assist the second device in determining a nominal packet padding value for sending data.

For example, an NSS used by the second device is greater than a value indicated by the NSS subfield in the PPE thresholds field, and the nominal packet padding value that is used by the second device is a fixed value, for example, 8 microseconds, 16 microseconds, or 20 microseconds. In this way, in the PPE thresholds field, the PPET20/16/8 NSSn Rub subfield corresponding to the RU with the index y is omitted, and the second device only is to pay attention to the value indicated by the NSS subfield. This is simpler.

For example, the value indicated by the NSS subfield in the PPE thresholds field is 9, and the NSS used by the second device is 12 streams. The second device directly determines that the to-be-used nominal packet padding value is a fixed value, for example, 8 microseconds, 16 microseconds, or 20 microseconds, without considering an indication about an RU in the PPE thresholds field.

For another example, the NSS used by the second device is greater than the value indicated by the NSS subfield in the PPE thresholds field, and the nominal packet padding value that is used by the second device is determined based on the value indicated by the NSS subfield and the modulation threshold corresponding to the RU with the index y. For example, the value indicated by the NSS subfield in the PPE thresholds field is 9, and the NSS used by the second device is 12 streams. In response to the second device determining that the used RU is y, the to-be-used nominal packet padding value is determined based on a modulation threshold corresponding to the NSS of 9 and the RU with the index y.

The at least one embodiment is applied to a scenario in which one index corresponds to one type of RU, or is applied to a scenario in which one index correspond to a plurality of RUs of different sizes. In a scenario in which one index corresponds to a plurality of RUs of different sizes, in response to the second device using DCM, the index y corresponds to a plurality of RUs of different sizes. For this case, at least one embodiment further provides a corresponding nominal packet padding value indication method, and the following two indication methods is included.

Indication method 1: In response to the bit in the RU index bitmask corresponding to the RU with the index y is set to 0, and the second device uses DCM, the nominal packet padding value corresponding to the RU with the index y is determined based on a modulation threshold corresponding to an RU with an index y+1. That is, in response to the second device using DCM, the second device determines the nominal packet padding value based on the modulation threshold corresponding to a PPET20/16/8 NSSn RU(y+1) subfield. For example, the RU2 in Table 9 is used as an example, that is, y=2. In response to the second device using DCM, the second device determines, based on the modulation threshold corresponding to the RU3, the nominal packet padding value corresponding to the RU2.

Indication method 2: In response to an RU selected by the second device being not a largest RU in the plurality of RUs of different sizes that correspond to the index y, in response to the bit in the RU index bitmask corresponding to the index y being set to 0, and the second device uses DCM, the nominal packet padding value corresponding to the RU with the index y is determined based on the modulation threshold corresponding to the NSS of n and the RU with the index y. For example, the RU2 in Table 9 is used as an example, that is, y=2. In response to the second device using DCM, the second device determines that the nominal packet padding value corresponding to the RU2 is still determined based on the modulation threshold corresponding to the RU2, instead of the modulation threshold of the RU3. The RU selected by the second device is not the largest RU in the plurality of RUs of different sizes corresponding to the index y. For example, an RU allocated to the second device is an RU2 (242+484), and the second device uses DCM. In this case, the second device determines the nominal packet padding value based on the modulation threshold corresponding to the RU2. In response to the RU allocated to the second device being an RU2 (996), the second device determines the nominal packet padding value based on the modulation threshold corresponding to the RU3.

In response to the second device sending data to the first device, nominal packet padding is performed to reserve sufficient processing time for the first device. Usually, time consumed by the first device to process received data is mainly consumed by a multiple-input multiple-output (multiple-in multiple out, MIMO) demodulation module and an FEC decoding module of the first device. Complexity of MIMO demodulation is positively correlated with the NSS, and complexity of FEC decoding is positively correlated with a quantity of RU blocks obtained after equivalent coding on an RU allocated to the second device. Based on this, the quantity of RU blocks obtained after equivalent coding on the RU is used to assist in determining the nominal packet padding value. Alternatively, the NSS and the quantity of RU blocks obtained after equivalent coding on the RU is used to assist in determining the nominal packet padding value. That is, a packet extension threshold corresponding to the quantity of RU blocks obtained after equivalent coding on the RU is set to indicate the nominal packet padding value, or a packet extension threshold corresponding to the NSS and the quantity of RU blocks obtained after equivalent coding on the RU is set to indicate the nominal packet padding value. Compared with that the nominal packet padding value is indicated by using the modulation threshold corresponding to the NSS and the RU size, in at least one embodiment, the PPE thresholds field is simplified, and overheads of the PPE thresholds field is reduced.

The following separately describes a solution in which the quantity of RU blocks obtained after equivalent coding on the RU is used to assist in determining the nominal packet padding value, and a solution in which the NSS and the quantity of RU blocks obtained after equivalent coding on the RU are used to assist in determining the nominal packet padding value.

Figure 10:
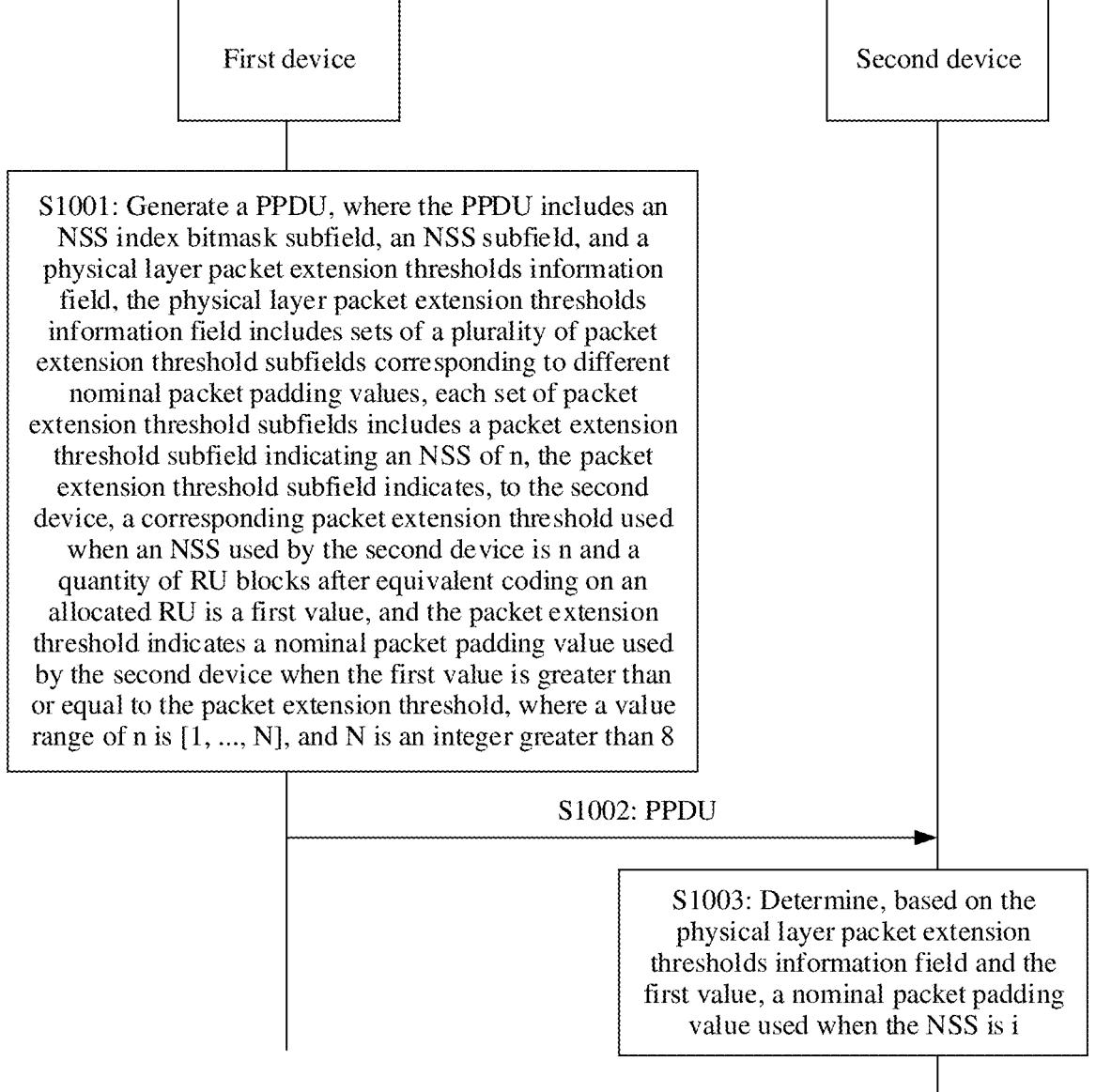
FIG. 10 is a schematic flowchart of a nominal packet padding value indication method 2 according to at least one embodiment.

Refer to FIG. 10. FIG. 10 shows another nominal packet padding value indication method according to at least one embodiment. To be specific, a nominal packet padding value is indicated by using a quantity of RU blocks obtained after equivalent coding on an RU. A procedure of the method is described as follows.

S1001: A first device generates a PPDU. The PPDU includes an NSS index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set includes a packet extension threshold subfield indicating an NSS of n, and the packet extension threshold subfield indicates, to a second device, a corresponding packet extension threshold used in response to an NSS used by the second device being n and a quantity of RU blocks after equivalent coding on an allocated RU being a first value. The packet extension threshold indicates a nominal packet padding value used by the second device in response to the first value being greater than or equal to the packet extension threshold. A value range of n is [1, . . . , NT], and N is an integer greater than 8.

S1002: The first device sends the PPDU to the second device, and the second device receives the PPDU.

S1003: The second device determines, based on the physical layer packet extension thresholds information field and the first value, a nominal packet padding value used in response to the NSS being i.

In an example, the first value is related to a maximum quantity of RU242s that is included in an RU allocated to the second device and a quantity of coded bits carried on each subcarrier of a single space-time stream. For example, the first value satisfies the following relationship:

$$N_{CBPRU} = N_{RU242} \times N_{BPSCS}.$$

$N_{CBPRU}$ is the first value, and $N_{RU242}$ is the maximum quantity of RU242s that is included in the RU allocated to the second device. For example, the RU allocated to the second device is an RU996, and the RU996 includes four RU242s. Therefore, $N_{RU242}=4$. In response to a bandwidth being not greater than 320 MHz, a value range of $N_{RU242}$ is 0 to 16. $N_{BPSCS}$ is the quantity of coded bits carried on each subcarrier of a single space-time stream. For example, in response to a modulation scheme being binary phase shift keying (Binary Phase Shift Keying, BPSK), $N_{BPSCS}=1$. In response to the modulation scheme being 64QAM, $N_{BPSCS}=6$. In response to the modulation scheme being 4096QAM, $N_{BPSCS}=12$. In response to the second device using a DCM modulation scheme, $N_{RU242}$ is twice that in response to the second device not using the DCM modulation scheme.

Figure 11:
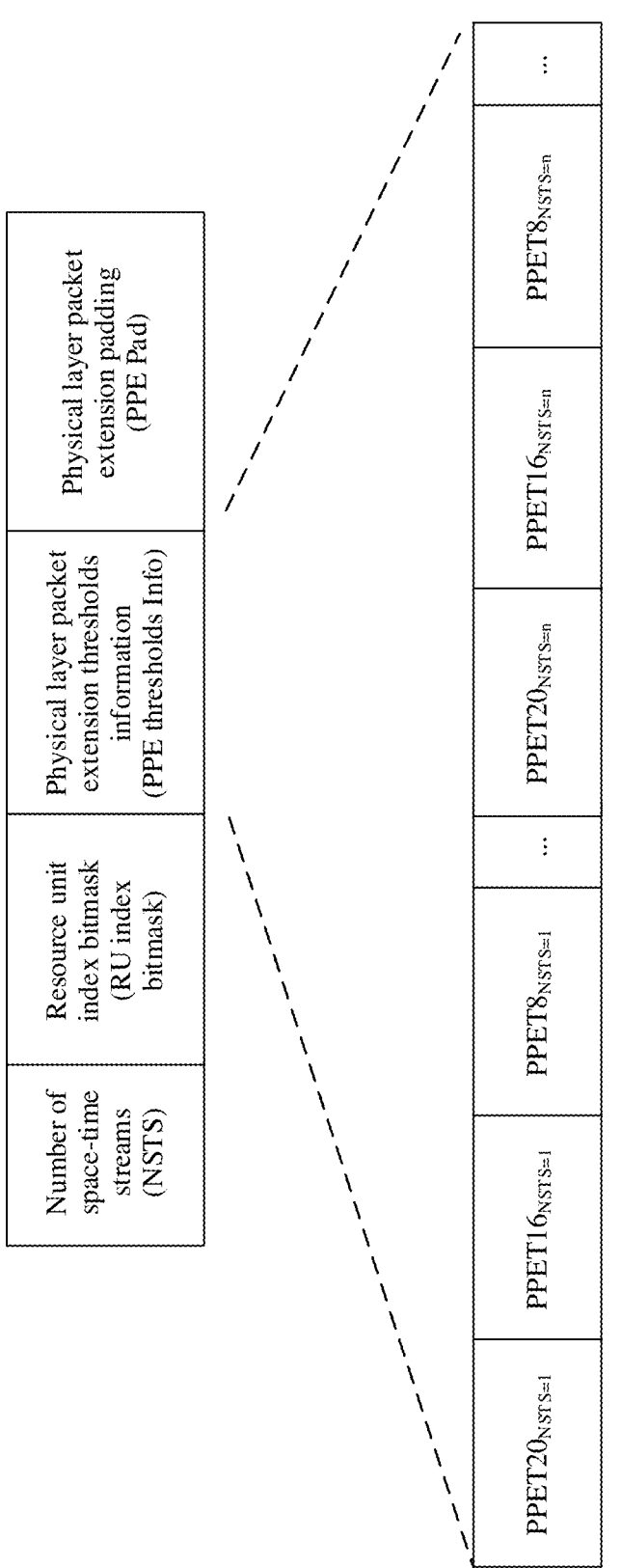
FIG. 11 is a schematic diagram depicting a structure of a physical layer packet extension thresholds information field according to at least one embodiment.

Each NSS corresponds to a plurality of packet extension thresholds. Refer to FIG. 11 for an example. FIG. 11 is a new structure of a physical layer packet extension thresholds information field according to at least one embodiment. The physical layer packet extension thresholds information field includes a plurality of packet extension threshold subfield sets corresponding to different nominal packet padding values, and each packet extension threshold subfield set includes a plurality of packet extension threshold subfields indicating an NS S of n. As shown in FIG. 11, the physical layer packet extension thresholds information field includes a set of a plurality of packet extension threshold subfields that indicates a nominal packet padding value of 20 μs. The physical layer packet extension thresholds information field further includes a set of a plurality of packet extension threshold subfields that indicates a nominal packet padding value of 16 μs. The physical layer packet extension thresholds information field further includes a set of a plurality of packet extension threshold subfields that indicates a nominal packet padding value of 8 μs. For ease of description, In at least one embodiment, a set of a plurality of packet extension threshold subfields that indicates a nominal packet padding value of 20 μs is referred to as a set of first subfields, a set of a plurality of packet extension threshold subfields that indicates a nominal packet padding value of 16 μs is referred to as a set of second subfields, and a set of a plurality of packet extension threshold subfields that indicates a nominal packet padding value of 8 μs is referred to as a set of third subfields.

A first subfield in the set of first subfields indicates a first packet extension threshold corresponding to the NSS of n. The first packet extension threshold indicates a first nominal packet padding value used by the second device in response to the first value corresponding to the allocated RU being greater than or equal to the first packet extension threshold. For example, the first nominal packet padding value is 20 microseconds. As shown in FIG. 11, the first subfield is denoted as a $PPET20_{NSS=n}$, where a value range of n is [1, . . . , N], and N is an integer greater than or equal to 8.

Similarly, a second subfield in the set of second subfields indicates a second packet extension threshold corresponding to the NSS of n. The second packet extension threshold indicates a second nominal packet padding value used by the second device in response to the first value corresponding to the allocated RU being greater than or equal to the second packet extension threshold. For example, the second nominal packet padding value is 16 microseconds. As shown in FIG. 11, the second subfield is denoted as a $PPET16_{NSS=n}$, where a value range of n is [1, . . . , N], and N is an integer greater than or equal to 8. A third subfield in the set of third subfields indicates a third packet extension threshold corresponding to the NSS of n. The third packet extension threshold indicates a third nominal packet padding value used by the second device in response to the first value corresponding to the allocated RU being greater than or equal to the third packet extension threshold. For example, the third nominal packet padding value is 8 microseconds. As shown in FIG. 11, the third subfield is denoted as a $PPET8_{NSS=n}$, where a value range of n is [1, . . . , N], and N is an integer greater than or equal to 8.

In response to sending data to the first device, the second device determines, based on a combination of the $PPET20_{NSS=n}$, the $PPET16_{NSS=n}$, and the $PPET8_{NSS=n}$, a to-be-used nominal packet padding value. In other words, for an NSS, the second device determines the nominal packet padding value based on a result of comparison between $N_{CBPRU}$ and the first packet extension threshold, the second packet extension threshold, and the third packet extension threshold respectively. Specifically, the second device determines the nominal packet padding value according to Table 12. In response to a condition 1, a condition 2, and a condition 3 of a row in Table 12 being met, the second device determines a value corresponding to the row as a nominal packet padding value to be used. To be specific, in response to the second device determining that conditions of a row in Table 12 are met, the second device determines to use a value shown in the row as the nominal packet padding value. In Table 12, a $PPET20_{NSS=n}$ represents a first packet extension threshold corresponding to the NSS of n, a $PPET16_{NSS=n}$ represents a second packet extension threshold corresponding to the NSS of n, and a $PPET8_{NSS=n}$ represents a third packet extension threshold corresponding to the NSS of n.

TABLE 12

| No. | Condition 1 | Condition 2 | Condition 3 | Nominal packet padding value |
|-----|-------------|-------------|-------------|------------------------------|
| 1 | $N_{CBPRU} \geq PPET8_{Nss=n}$ | $N_{CBPRU} < PPET16_{Nss=n}$ | $N_{CBPRU} < PPET20_{Nss=n}$ | 8 μs |
| 2 | $N_{CBPRU} > PPET8_{Nss=n}$ | $N_{CBPRU} \geq PPET16_{Nss=n}$ | $N_{CBPRU} < PPET20_{Nss=n}$ | 16 μs |
| 3 | $N_{CBPRU} > PPET8_{Nss=n}$ | $N_{CBPRU} > PPET16_{Nss=n}$ | $N_{CBPRU} \geq PPET20_{Nss=n}$ | 20 μs |
| | Other combinations not listed | | | 0 |

For example, the second device uses an NSS of i. In response to $N_{CBPRU}$ being greater than or equal to a first packet extension threshold corresponding to a first subfield corresponding to the NSS of i, the second device determines that a to-be-used nominal packet padding value is 20 microseconds. In response to $N_{CBPRU}$ being greater than or equal to a second packet extension threshold corresponding to a second subfield corresponding to the NSS of i, and being less than a first packet extension threshold corresponding to a first subfield corresponding to the NSS of i, the second device determines that a to-be-used nominal packet padding value is 16 microseconds. In response to the NSS being i, and $N_{CBPRU}$ being greater than or equal to a third packet extension threshold corresponding to a third subfield corresponding to the NSS of i, and is less than a second packet extension threshold corresponding to a second subfield corresponding to the NSS of i, the second device determines that a to-be-used nominal packet padding value is 8 microseconds.

Further, to reduce overheads of a physical layer packet extension thresholds information field, first subfields, second subfields, and third subfields corresponding to some NSSs is omitted in at least one embodiment.

In an example, the NSS index bitmask subfield occupies at least 8 bits, and is indicated, in a bit mapping manner, that a packet extension threshold corresponding to an NSS does not exist, that is, the physical layer packet extension thresholds information field does not include a first subfield, a second subfield, and a third subfield that correspond to the NSS. For example, in response to a $j^{th}$ bit of the NSS index bitmask subfield being 0, the physical layer packet extension thresholds information field does not include a first subfield, a second subfield, and a third subfield corresponding to an NSS of j. An understand is that j is located in [1, . . . , N]. Correspondingly, in response to the $j^{th}$ bit of the NSS index bitmask subfield being 1, the physical layer packet extension thresholds information field includes the first subfield, the second subfield, and the third subfield corresponding to the NSS of j. Alternatively, in response to a $j^{th}$ bit of the NSS index bitmask subfield being 1, the physical layer packet extension thresholds information field does not include a first subfield, a second subfield, and a third subfield corresponding to the NSS of n. Correspondingly, in response to the $j^{th}$ bit of the NSS index bitmask subfield being 0, the physical layer packet extension thresholds information field includes the first subfield, the second subfield, and the third subfield corresponding to the NSS of j.

In another example, in response to the NSS used by the second device being greater than an NSS corresponding to a most significant bit of bits not set to 0 in the NSS index bitmask subfield, the nominal packet padding value used by the second device is a fixed value, for example, 20 microseconds. This is simpler.

Refer to FIG. 12. FIG. 12 shows another nominal packet padding value indication method according to at least one embodiment. To be specific, a nominal packet padding value is indicated by using a packet extension threshold corresponding to an NSS and a quantity of RU blocks obtained after equivalent coding on an RU. A procedure of the method is described as follows.

S1201: A first device generates a PPDU. The PPDU includes an NSS subfield and a physical layer packet extension thresholds information field. The physical layer packet extension thresholds information field includes packet extension threshold subfields corresponding to different nominal packet padding values. The packet extension thresholds field indicates a packet extension threshold to a second device, and the packet extension threshold indicates a nominal packet padding value used in response to a second value being greater than or equal to the packet extension threshold, where the second value is related to a quantity of RU blocks obtained after equivalent coding on a resource unit RU allocated to the second device and an NSS used by the second device, a value range of the NSS is [1, . . . , N], and N is an integer greater than 8. the packet extension threshold indicated by the packet extension thresholds field is considered as a packet extension threshold corresponding to the second value obtained in response to the packet extension thresholds fields indicating, to the second device, that the NSS used by the second device is n and RU blocks obtained after equivalent coding on the allocated resource unit are quantized (equivalence).

S1202: The first device sends the PPDU to the second device, and the second device receives the PPDU.

S1203: The second device determines, based on the physical layer packet extension thresholds information field and the second value, a to-be-used nominal packet padding value.

In at least one embodiment, the second value is related to a quantity of RU blocks obtained after equivalent coding on an RU allocated to the second device and an NSS used by the second device. For example, the second value satisfies the following relationship:

$$P_{index} = f(\text{NSTS}, N_{CBPRU})$$

$P_{index}$ is the second value, NSS is a quantity of space-time streams corresponding to an RU allocated to the second device, and $N_{CBPRU}$ is the quantity of RU blocks obtained after equivalent coding on the RU allocated to the second device.

$P_{index} = f(\text{NSTS}, N_{CBPRU})$ shows an example in which a value of $P_{index}$ is determined by using NSTS and $N_{CBPRU}$, or is determined by using another parameter. $P_{index}$ is determined by using $N_{CBPRU}$ and $P_{index}$ in more than one manner. As an example, $P_{index} = \text{NSTS} \times N_{CBPRU}$.

A difference between at least one embodiment and the embodiment shown in FIG. 10 lies in that the physical layer packet extension threshold information field does not separately indicate a packet extension threshold related to an NSS, so that the physical layer packet extension thresholds information field is further simplified, to reduce overheads of the physical layer packet extension thresholds information field.

Refer to FIG. 13 for an example. FIG. 13 is a new structure of a physical layer packet extension thresholds information field according to at least one embodiment. The physical layer packet extension thresholds information field includes packet extension threshold subfields corresponding to different nominal packet padding values. For example, the physical layer packet extension thresholds information field includes a packet extension threshold subfield (referred to as a fourth subfield in at least one embodiment) corresponding to a nominal packet padding value of 20 μs. The physical layer packet extension thresholds information field includes a packet extension threshold subfield (referred to as a fifth subfield in at least one embodiment) corresponding to a nominal packet padding value of 16 μs. The physical layer packet extension thresholds information field includes a packet extension threshold subfield (referred to as a sixth subfield in at least one embodiment) corresponding to a nominal packet padding value of 8 μs. As shown in FIG. 13, the fourth subfield is denoted as a PPET20, and indicates a fourth packet extension threshold; the fifth subfield is denoted as a PPET16, and indicates a fifth packet extension threshold; and the sixth subfield is denoted as a PPET8, and indicates a sixth packet extension threshold.

In response to sending data to the first device, the second device determines, based on a combination of the PPET20, the PPET16, and the PPET8, a to-be-used nominal packet padding value. In other words, the second device first determines the second value based on the used NSS and the RU allocated to the second device, then compares the second value with the fourth packet extension threshold, the fifth packet extension threshold, and the sixth packet extension threshold respectively, and determines the nominal packet padding value based on a final comparison result. Specifically, the second device determines the nominal packet padding value according to Table 13. In response to a condition 1, a condition 2, and a condition 3 of a row in Table 13 being met, the second device determines a value corresponding to the row as a nominal packet padding value to be used. To be specific, in response to the second device determines that conditions of a row in Table 13 being met, the second device determines to use a value shown in the row as the nominal packet padding value. In Table 13, the PPET20 corresponds to the fourth packet extension threshold, the PPET16 corresponds to the fifth packet extension threshold, and the PPET8 corresponds to the sixth packet extension threshold.

TABLE 13

| No. | Condition 1 | Condition 2 | Condition 3 | Nominal packet padding value |
|-----|-------------|-------------|-------------|------------------------------|
| 1 | $P_{index} \geq$ PPET8$_{Nss-n}$ | $P_{index} <$ PPET16$_{Nss-n}$ | $P_{index} <$ PPET20$_{Nss-n}$ | 8 μs |
| 2 | $P_{index} >$ PPET8$_{Nss-n}$ | $P_{index} \geq$ PPET16$_{Nss-n}$ | $P_{index} <$ PPET20$_{Nss-n}$ | 16 μs |
| 3 | $P_{index} >$ PPET8$_{Nss-n}$ | $P_{index} >$ PPET16$_{Nss-n}$ | $P_{index} \geq$ PPET20$_{Nss-n}$ | 20 μs |
| | Other combinations not listed | | | 0 |

That is, in response to the second value being greater than the fourth packet extension threshold, the second device determines that the to-be-used nominal packet padding value is 20 microseconds. In response to the second value being greater than or equal to the fifth packet extension threshold and is less than the fourth packet extension threshold, the second device determines that the to-be-used nominal packet padding value is 16 microseconds. In response to the second value being greater than or equal to the sixth packet extension threshold and is less than the fifth packet extension threshold, the second device determines that the to-be-used nominal packet padding value is 8 microseconds.

In response to one or more of an NSS, an RU size, and a modulation scheme used by the second device being different, the nominal packet padding value used by the second device is different. In the foregoing embodiment, the NSS, the RU size, and the modulation scheme are combined to indicate the nominal packet padding value. To further reduce overheads, at least one embodiment further provides a nominal packet padding value indication method. In the method, a first device notifies a second device of a packet extension threshold range, and the second device determines, based on one or more of parameters of an NSS, an RU, and an order of a modulation scheme that are used, a third value that affects a nominal packet padding value, to determine a to-be-used nominal packet padding value based on the third value and the packet extension threshold range sent by the first device. In this method, because the first device sends a packet extension threshold range, overheads of the physical layer packet extension thresholds field is reduced.

Refer to FIG. 14. FIG. 14 shows another nominal packet padding value indication method according to at least one embodiment. To be specific, a nominal packet padding value is indicated by using a quantity of RU blocks obtained after equivalent coding on an RU and a packet extension threshold corresponding to an NSS. A procedure of the method is described as follows.

S1401: A first device generates a PPDU.

S1402: The first device sends the PPDU and a first packet extension threshold range to a second device, and the second device receives the PPDU and the first packet extension threshold range. The first packet extension threshold range indicates a nominal packet padding value used by the second device to send data to the first device in response to a third value being within the first packet extension threshold range, and different packet extension threshold ranges corresponding to different nominal packet padding values.

S1403: The second device determines, based on the received first packet extension threshold range and the third value, a nominal packet padding value used by the second device.

In at least one embodiment, the third value is related to one or more factors that affect the nominal packet padding value used by the second device. For example, the third value is related to one or more of parameters of an NSS, an RU size, and a modulation scheme that are used by the second device. For example, the third value satisfies the following relationship:

$$x=f(\text{NSTS,RU,Modulation})$$

x is the third value, NSS is an NSS used by the second device, RU is an RU size used by the second device, and Modulation is an order of a modulation scheme used by the second device.

Note that x=f(NSTS,RU,Modulation) shows only an example in which x is related to the NSS, the RU size, and the modulation scheme. A specific correspondence between x and the NSS, the RU size, and the modulation scheme is not limited in at least one embodiment.

For example, in response to NSS=a, a corresponding packet extension threshold is b; in response to NSS=c, a corresponding packet extension threshold is d; or in response to NSS=e, a corresponding packet extension threshold is f. x is considered as a function related to b, d, and f, for example, x=b+d+f; for another example, x=b×(d+f).

A plurality of packet extension threshold ranges is predefined, and different packet extension threshold ranges correspond to different nominal packet padding values. For example, the first packet extension threshold range is [0, p1], and corresponds to a nominal packet padding value of 0 microseconds. The second packet extension threshold range is (p1, p2], and corresponds to a nominal packet padding value of 8 microseconds. The third packet extension threshold range is (p2, p3], and corresponds to a nominal packet padding value of 20 microseconds.

In response to sending data to the first device, the second device calculates a third value based on a used NSS, an RU size, and Modulation, and then compare the third value with a packet extension threshold range sent by the first device, to determine, based on a comparison result, a to-be-used nominal packet padding value. In response to the third value being within the packet extension threshold range, the second device determines that the to-be-used nominal packet padding value is a nominal packet padding value corresponding to the packet extension threshold range.

Different from the foregoing solution in which the first device notifies the second device of a packet extension threshold range, the second device determines a third value, and determines a nominal packet padding value, in an alternative solution, the first device notifies the second device of an impact range of each parameter on a nominal packet padding value, and the second device determines a to-be-used nominal packet padding value based on each parameter used for sending data and an impact range separately corresponding to each parameter. In this way, impact of the NSS, the RU size, and the modulation scheme on the nominal packet padding value is separately indicated, and the NSS, the RU size, and the modulation scheme is not to be combined to indicate the nominal packet padding value. For example, the NSS has 16 impact results, the RU has 6 impact results, and the modulation scheme has 8 impact results. In this case, the first device feeds back 16+6+8 impact results to the second device. Therefore, in comparison with providing nominal packet padding values corresponding to all NSSs, RUs, and modulation thresholds in an exhaustive or traversal manner, the nominal packet padding value indication method provided in at least one embodiment further reduces overheads.

In the foregoing embodiments described herein, the methods provided in at least one embodiment are separately described from a perspective of interaction between the first device and the second device. To implement functions in the foregoing methods provided in at least one embodiment, the first device and the second device includes a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

The following describes communication apparatuses for implementing the foregoing methods in at least one embodiment with reference to the accompanying drawings. Therefore, all the foregoing content is used in the following embodiments. Repeated content is not described again.

Figure 15:
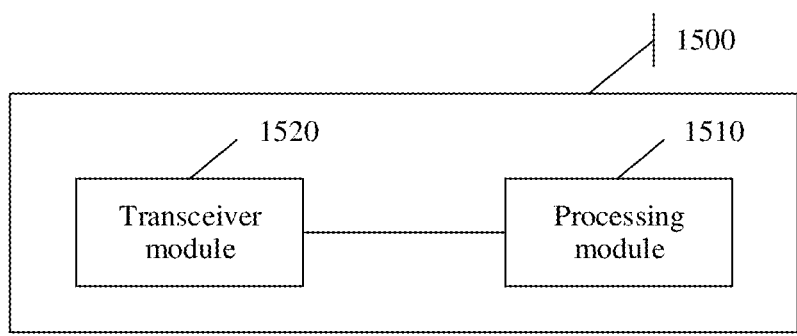
FIG. 15 is a schematic diagram depicting a structure of a communication apparatus according to at least one embodiment.

FIG. 15 is a schematic block diagram of a communication apparatus 1500 according to at least one embodiment. The communication apparatus 1500 correspondingly implements functions or steps implemented by the first device or the second device in the foregoing method embodiments. The communication apparatus includes a processing module 1510 and a transceiver module 1520. Optionally, the communication apparatus further includes a storage unit. The storage unit is configured to store instructions (code or a program) and/or data. The processing module 1510 and the transceiver module 1520 is coupled to the storage unit. For example, the processing module 1510 reads the instructions (the code or the program) and/or the data in the storage unit, to implement a corresponding method. The foregoing units is disposed independently, or is partially or completely integrated.

In at least one embodiment, the communication apparatus 1500 correspondingly implements behavior and functions of the first device in the method embodiments.

In an example 1, the processing module 1510 is configured to generate a PPDU, and the transceiver module 1520 is configured to send the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of $[1, \ldots, N]$, and N is an integer greater than or equal to 1. A value range of b is a subset of $[m, \ldots, M]$, and m and M are integers greater than or equal to 0. In response to a value of the RU index bitmask subfield corresponding to an RU with an index y being 0, the value range of b does not include y.

In a packet extension threshold subfield set that corresponds to a same nominal packet padding value, that the value of the RU index bitmask subfield corresponding to the RU with the index y is 0 indicates that a modulation threshold corresponding to the NSS of n and the RU with the index y is a modulation threshold corresponding to an NSTS of n and an RU with an index m1, where m1 is a smallest index in indexes that correspond to a bit being 1 in the RU index bitmask subfield and that are greater than y; or m1 is a largest index in indexes that correspond to a bit being 1 in the RU index bitmask subfield and that are less than y.

In at least one embodiment, a value of the RU index bitmask subfield corresponding to an index less than y includes 1.

In at least one embodiment, in response to no index corresponding to a bit being 1 in the RU index bitmask subfield being greater than y, that the value of the RU index bitmask subfield corresponding to the RU with the index y being 0 indicating that a nominal packet padding value corresponding to the NSS of n and the RU with the index y is 20 microseconds.

In an example 2, the processing module 1510 is configured to generate a PPDU, and the transceiver module 1520 is configured to send the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of $[1, \ldots, N]$, and N is an integer greater than or equal to 1. A value range of b is a subset of $[m, \ldots, M]$, and m and M are integers greater than or equal to 0. In response to a value of the RU index bitmask subfield corresponding to an RU with an index y being 0, in physical layer packet extension threshold subfields corresponding to a same nominal packet padding value, that the value of the RU index bitmask subfield corresponding to the RU with the index y is 0 indicates that a nominal packet padding value corresponding to the RU with the index y is 0 microseconds, and the value range of b does not include y.

In at least one embodiment of the example 2, a value of the RU index bitmask subfield corresponding to an index less than x does not include 1.

In an example 3, the processing module 1510 is configured to generate a PPDU, and the transceiver module 1520 is configured to send the PPDU to a second device. The PPDU includes a physical layer packet extension thresholds present subfield and a physical layer packet extension thresholds field, a value of the physical layer packet extension thresholds present subfield is 1, and the physical layer packet extension thresholds field includes an RU index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the second device in response to a modulation scheme being higher than or equal to the modulation threshold.

A value range of n is a subset of $[1, \ldots, N]$, and N is an integer greater than or equal to 1. A value range of b is a subset of $[m, \ldots, M]$, and m and M are integers greater than or equal to 0. In response to an RU with an index y corresponding to a bit set to 0 in the RU index bitmask subfield, the value range of b does not include y, and the physical layer packet extension thresholds field indicates that a nominal packet padding value corresponding to the RU with the index y is 8 microseconds, 16 microseconds, or 20 microseconds.

In at least one embodiment, at least one bit whose value is 1 exists before the bit set to 0.

In at least one embodiment, in response to a used NSS being greater than a value indicated by the NSS subfield, the physical layer packet extension thresholds field indicates that a nominal packet padding value used by the communication apparatus is 8 microseconds, 16 microseconds, or 20 microseconds. Alternatively, in response to a used NSS being greater than a value indicated by the NSS subfield, the physical layer packet extension thresholds field indicates that the communication apparatus determines the to-be-used nominal packet padding value based on the used NSS and a modulation threshold corresponding to the RU with the index y.

In an example 4, the processing module 1510 is configured to generate a PPDU, and the transceiver module 1520 is configured to send the PPDU to a second device. The PPDU includes an NSS index bitmask subfield, an NSS subfield, and a physical layer packet extension thresholds information field. The physical layer packet extension thresholds information field includes a plurality of packet extension threshold subfield sets corresponding to different nominal packet padding values, and each packet extension threshold subfield set includes a plurality of packet extension threshold subfields indicating an NSS of n. The packet extension threshold subfield indicates, to the second device, a corresponding packet extension threshold used in response to an NSS used by the second device is n and a quantity of RU blocks obtained after equivalent coding on an allocated RU being a first value, and the packet extension threshold subfield indicating a nominal packet padding value used by the second device in response to the first value being greater than or equal to the packet extension threshold. A value range of n is $[1, \ldots, N]$, and N is an integer greater than 8.

In at least one embodiment, the first value satisfies the following formula:

$$N_{CBPRU} = N_{RU242} \times N_{BPSCS}.$$

$N_{CBPRU}$ is the first value, $N_{RU242}$ is a maximum quantity of RU242s that is included in the RU, and $N_{BPSCS}$ is a quantity of coded bits carried on each subcarrier of a single space-time stream.

In at least one embodiment, the plurality of packet extension threshold subfield sets include a set of first packet extension threshold subfields that corresponds to a first nominal packet padding value, and a first packet extension threshold subfield in the set of first packet extension threshold subfields indicates, to the second device, a corresponding first packet extension threshold used in response to the quantity of RU blocks obtained after equivalent coding on the allocated resource unit RU being the first value and the NSS used by the second device being n. The first packet extension threshold indicates that a nominal packet padding value used by the second device in response to the first value corresponding to the allocated RU being greater than or equal to the first packet extension threshold is the first nominal packet padding value, and the first nominal packet padding value is 20 microseconds.

In at least one embodiment, the plurality of packet extension threshold subfield sets further include a set of second packet extension threshold subfields that corresponds to a second nominal packet padding value, and a second packet extension threshold subfield in the set of second packet extension threshold subfields indicates, to the second device, a corresponding second packet extension threshold used in response to the quantity of RU blocks obtained after equivalent coding on the allocated resource unit RU being the first value and the NSS used by the second device being n. The second packet extension threshold indicates that a nominal packet padding value used by the second device in response to the first value corresponding to the allocated RU being greater than or equal to the second packet extension threshold being the second nominal packet padding value, and the second nominal packet padding value being 16 microseconds.

In at least one embodiment, the plurality of packet extension threshold subfield sets further include a set of third packet extension threshold subfields that corresponds to a third nominal packet padding value, and a third packet extension threshold subfield in the set of third packet extension threshold subfields indicates, to the second device, a corresponding third packet extension threshold used in response to the quantity of RU blocks obtained after equivalent coding on the allocated resource unit RU being the first value and the NSS used by the second device being n. The third packet extension threshold indicates that a nominal packet padding value used by the second device in response to the first value corresponding to the allocated RU being greater than or equal to the third packet extension threshold being the third nominal packet padding value, and the third nominal packet padding value being 8 microseconds.

In at least one embodiment, the NSS index bitmask subfield occupies at least 8 bits, an $i^{th}$ bit of the NSS index bitmask subfield is 0, and the physical layer packet extension thresholds information field does not include a packet extension threshold subfield set that corresponds to an NSS of i.

In at least one embodiment, in response to the physical layer packet extension thresholds information field indicating that the NSS used by the second device is greater than an NSS corresponding to a most significant bit of bits not set to 0 in the NSS index bitmask subfield, a nominal packet padding value used by the second device in response to the first value corresponding to the allocated RU being greater than or equal to the packet extension threshold being 20 microseconds.

In an example 5, the processing module 1510 is configured to generate a PPDU, and the transceiver module 1520 is configured to send the PPDU to a second device. The PPDU includes an NSS subfield and a physical layer packet extension thresholds information field. The physical layer packet extension thresholds information field includes packet extension threshold subfields corresponding to different nominal packet padding values, the packet extension threshold subfield indicates a packet extension threshold, and the packet extension threshold subfield indicates a nominal packet padding value used by the second device in response to a second value being greater than or equal to the packet extension threshold. A value range of n is [1, . . . , N], N is an integer greater than 8, and the second value is related to an NSS used by the second device and a quantity of RU blocks obtained after equivalent coding on an allocated RU.

In at least one embodiment, the physical layer packet extension thresholds information field includes a first packet extension threshold subfield corresponding to a first nominal packet padding value. The first packet extension threshold subfield indicates a first packet extension threshold, the first packet extension threshold indicates that a nominal packet padding value used by the second device in response to the second value being greater than or equal to the first packet extension threshold being the first nominal packet padding value, and the first nominal packet padding value being 20 microseconds.

In at least one embodiment, the physical layer packet extension thresholds information field includes a second packet extension threshold subfield corresponding to a second nominal packet padding value. The second packet extension threshold subfield indicates a second packet extension threshold, the second packet extension threshold indicates that a nominal packet padding value used by the second device in response to the second value being greater than or equal to the second packet extension threshold being the second nominal packet padding value, and the second nominal packet padding value being 16 microseconds.

In at least one embodiment, the physical layer packet extension thresholds information field includes a third packet extension threshold subfield corresponding to a third nominal packet padding value. The third packet extension threshold subfield indicates a third packet extension threshold, the third packet extension threshold indicates that a nominal packet padding value used by the second device in response to the second value being greater than or equal to the third packet extension threshold being the third nominal packet padding value, and the third nominal packet padding value being 8 microseconds.

In an example 6, the processing module 1510 is configured to generate a PPDU, and the transceiver module 1520 is configured to send the PPDU and a first packet extension threshold range. In response to a third value being within the first packet extension threshold range, the first packet extension threshold range indicates a nominal packet padding value used by the communication apparatus 1500 to send data to the first device. Different packet extension threshold ranges correspond to different nominal packet padding values.

In at least one embodiment, the third value satisfies the following relationship:

$$x = f(\text{NSTS}, \text{RU}, \text{Modulation})$$

x is the third value, NSS is an NSS used by the communication apparatus 1500, RU is an RU size used by the communication apparatus 1500, and Modulation is an order of a modulation scheme used by the communication apparatus 1500.

In at least one embodiment, the processing module 1510 is implemented as a processor or a processor-related circuit component, and the transceiver module 1520 is implemented as a transceiver or a transceiver-related circuit component, or a communication interface.

In at least one embodiment, the communication apparatus 1500 correspondingly implements behavior and functions of the second device in the method embodiments.

In an example 1, the transceiver module 1520 is configured to receive a physical layer protocol data unit PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the communication apparatus 1500 in response to a modulation scheme being higher than or equal to the modulation threshold. A value range of n is a subset of [1, . . . , N], and N is an integer greater than or equal to 1. A value range of b is a subset of [m, . . . , M], and m and M are integers greater than or equal to 0. In response to a value of the RU index bitmask subfield corresponding to an RU with an index y being 0, the value range of b does not include y.

The processing module 1510 is configured to determine, based on a modulation threshold that corresponds to the NSS of n and an RU with an index m1 and that is indicated by the physical layer packet extension thresholds field, a modulation threshold corresponding to the NSS of n and the RU with the index y, where m1 is a smallest index in indexes that correspond to a bit being 1 in the RU index bitmask subfield and that are greater than y; or m1 is a largest index in indexes that correspond to a bit being 1 in the RU index bitmask subfield and that are less than y.

In at least one embodiment, a value of the RU index bitmask subfield corresponding to an index less than y includes 1.

In at least one embodiment, in response to no index corresponding to a bit being 1 in the RU index bitmask subfield being greater than y, the processing module 1510 is configured to determine that a nominal packet padding value corresponding to an RU with an index x is 20 microseconds.

In at least one embodiment, the communication apparatus 1500 uses DCM, and the processing module 1510 is configured to determine a to-be-used nominal packet padding value based on a modulation threshold corresponding to the NSS of n and an RU with an index y+1, where the index y corresponds to a plurality of RUs of different sizes. Alternatively, the processing module 1510 is configured to determine the nominal packet padding value based on the modulation threshold corresponding to the NSS of n and the RU with the index y, where the index y corresponds to a plurality of RUs of different sizes, and an RU used by the communication apparatus 1500 is not a largest RU in the plurality of RUs of different sizes.

In an example 2, the transceiver module 1520 is configured to receive a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the communication apparatus 1500 in response to a modulation scheme being higher than or equal to the modulation threshold. A value range of n is a subset of $[1, \ldots, N]$, and N is an integer greater than or equal to 1. A value range of b is a subset of $[m, \ldots, M]$, and m and M are integers greater than or equal to 0. In response to a value of the RU index bitmask subfield corresponding to an RU with an index y being 0, the value range of b does not include y.

The processing module 1510 is configured to determine, based on the physical layer packet extension thresholds field, that a nominal packet padding value corresponding to the RU with the index y is 0 microseconds.

In at least one embodiment, a value of the RU index bitmask subfield corresponding to an index less than y does not include 1.

In an example 3, the transceiver module 1520 is configured to receive a PPDU from a first device. The PPDU includes a physical layer packet extension thresholds present subfield and a physical layer packet extension thresholds field, a value of the physical layer packet extension thresholds present subfield is 1, and the physical layer packet extension thresholds field includes a resource unit RU index bitmask subfield, a number of spatial streams NSS subfield, and a physical layer packet extension thresholds information field. The physical layer packet extension thresholds information field includes a plurality of packet extension threshold subfield sets corresponding to different nominal packet padding values, each packet extension threshold subfield set indicates a modulation threshold corresponding to an NSS of n and an RU with an index b, and the modulation threshold is used to determine a nominal packet padding value used by the communication apparatus 1500 in response to a modulation scheme being higher than or equal to the modulation threshold. A value range of n is a subset of $[1, \ldots, N]$, and N is an integer greater than or equal to 1. A value range of b is a subset of $[m, \ldots, M]$, and m and M are integers greater than or equal to 0. In response to an RU with an index y corresponding to a bit set to 0 in the RU index bitmask subfield, the value range of b does not include y.

The processing module 1510 is configured to determine, based on the physical layer packet extension thresholds field, that a nominal packet padding value corresponding to the RU with the index y is 8 microseconds, 16 microseconds, or 20 microseconds.

In at least one embodiment, at least one bit whose value is 1 exists before the bit set to 0.

In at least one embodiment, in response to an NSS used by the communication apparatus 1500 being greater than a value indicated by the NSS subfield, the processing module 1510 is further configured to determine that the nominal packet padding value corresponding to the RU with the index y is 8 microseconds, 16 microseconds, or 20 microseconds. Alternatively, in response to an NSS used by the communication apparatus 1500 being greater than a value indicated by the NSS subfield, the processing module 1510 is further configured to determine, based on a modulation threshold corresponding to the used NSS and the RU with the index y, the nominal packet padding value corresponding to the RU with the index y.

In an example 4, the transceiver module 1520 is configured to receive a PPDU from a first device. The PPDU includes an NSS index bitmask subfield, an NSS subfield, and a physical layer packet extension thresholds information field. The physical layer packet extension thresholds information field includes a plurality of packet extension threshold subfield sets corresponding to different nominal packet padding values, each packet extension threshold subfield set includes a plurality of packet extension threshold subfields indicating an NSS of n, and the packet extension threshold subfield indicates, to the communication apparatus 1500, a corresponding packet extension threshold used in response to a used NSS being n and a quantity of RU blocks obtained after equivalent coding on an allocated resource unit RU being a first value, where the packet extension threshold subfield indicates a nominal packet padding value used by the communication apparatus 1500 in response to the first value being greater than or equal to the packet extension threshold, a value range of n is $[1, \ldots, N]$, and N is an integer greater than 8.

The processing module 1510 is configured to determine, based on the physical layer packet extension thresholds information field and the first value, a nominal packet padding value used in response to an NSS being j, where j is an integer greater than or equal to 1.

In at least one embodiment, the first value satisfies the following formula:

$$N_{CBPRU} = N_{RU242} \times N_{BPSCS}.$$

$N_{CBPRU}$ is the first value, $N_{RU242}$ is a maximum quantity of RU242s that is included in the RU, and $N_{BPSCS}$ is a quantity of coded bits carried on each subcarrier of a single space-time stream.

In at least one embodiment, the plurality of packet extension threshold subfield sets include a set of first packet extension threshold subfields that corresponds to a first nominal packet padding value, and a first packet extension threshold subfield in the set of first packet extension threshold subfields indicates, to the communication apparatus 1500, a corresponding first packet extension threshold used in response to the quantity of RU blocks obtained after equivalent coding on the allocated resource unit RU being the first value and the NSS used by the communication apparatus 1500 being n. The first packet extension threshold indicates the first nominal packet padding value used by the communication apparatus 1500 in response to the first value corresponding to the allocated RU being greater than or equal to the first packet extension threshold, and the first nominal packet padding value is 20 microseconds.

In response to the NSS being j, and $N_{CBPRU}$ is greater than or equal to the first nominal packet padding value corresponding to the first packet extension threshold subfield in response to the NSS being j, the communication apparatus 1500 determines that the nominal packet padding value used in response to the NSS being j being the first nominal packet padding value.

In at least one embodiment, the plurality of packet extension threshold subfield sets further include a set of second packet extension threshold subfields that corresponds to a second nominal packet padding value, and a second packet extension threshold subfield in the set of second packet extension threshold subfields indicates, to the communication apparatus 1500, a corresponding second packet extension threshold used in response to the quantity of RU blocks obtained after equivalent coding on the allocated resource unit RU being the first value and the NSS used by the communication apparatus 1500 being n. The second packet extension threshold indicates the second nominal packet padding value used by the communication apparatus 1500 in response to the first value corresponding to the allocated RU being greater than or equal to the second packet extension threshold, and the second nominal packet padding value being 16 microseconds.

In response to the NSS being j, and $N_{CBPRU}$ being greater than or equal to the second nominal packet padding value corresponding to the second packet extension threshold subfield in response to the NS S being j, and less than the first nominal packet padding value corresponding to the first packet extension threshold subfield in response to the NS S being j, the communication apparatus 1500 determines that the nominal packet padding value used in response to the NS S being j being the second nominal packet padding value.

In at least one embodiment, the plurality of packet extension threshold subfield sets further include a set of third packet extension threshold subfields that corresponds to a third nominal packet padding value, and a third packet extension threshold subfield in the set of third packet extension threshold subfields indicates, to the communication apparatus 1500, a corresponding third packet extension threshold used in response to the quantity of RU blocks obtained after equivalent coding on the allocated resource unit RU being the first value and the NSS used by the communication apparatus 1500 being n. The third packet extension threshold indicates the third nominal packet padding value used by the communication apparatus 1500 in response to the first value corresponding to the allocated RU being greater than or equal to the third packet extension threshold, and the third nominal packet padding value being 8 microseconds.

In response to the NSS being j, and $N_{CBRU}$ being greater than or equal to the third nominal packet padding value corresponding to the third packet extension threshold subfield in response to the NSTS being j, and less than the second nominal packet padding value corresponding to the second packet extension threshold subfield in response to the NSTS being j, the communication apparatus 1500 determines that the nominal packet padding value used in response to the NS S being j is the third nominal packet padding value.

In at least one embodiment, the NSS index bitmask subfield occupies at least 8 bits, an $i^{th}$ bit of the NSS index bitmask subfield is 0, and the physical layer packet extension thresholds information field does not include a set of subfields that corresponds to an NSS of i.

In at least one embodiment, in response to the NSS used by the communication apparatus 1500 being greater than an NSS corresponding to a most significant bit of bits not set to 0 in the NSS index bitmask subfield, the processing module 1510 is further configured to use a nominal packet padding value of 20 microseconds in response to the first value corresponding to the allocated RU being greater than or equal to the packet extension threshold.

In an example 5, the transceiver module 1520 is configured to receive a PPDU from a first device. The PPDU includes an NSS subfield and a physical layer packet extension thresholds information field. The physical layer packet extension thresholds information field includes packet extension threshold subfields corresponding to different nominal packet padding values, the packet extension threshold subfield indicates a packet extension threshold, and the packet extension threshold subfield indicates a nominal packet padding value used by the communication apparatus 1500 in response to a second value being greater than or equal to the packet extension threshold. A value range of n is [1, . . . , N], N is an integer greater than 8, and the second value is related to an NSS used by the second device and a quantity of RU blocks obtained after equivalent coding on an allocated RU.

The processing module 1510 is configured to: determine the second value based on the used NSS and the quantity of RU blocks obtained after equivalent coding on the allocated resource unit RU; and determine a to-be-used nominal packet padding value based on the second value and the physical layer packet extension thresholds information field.

In at least one embodiment, the processing module 1510 is specifically configured to determine the second value according to the following relationship:

$P_{index}=f(NSS,N_{CBPRU})$. NSS is an NSS corresponding to the RU allocated to the communication apparatus 1500. $N_{CBPRU}$ is the quantity of RU blocks obtained after equivalent coding on the RU allocated to the communication apparatus 1500, and satisfies the following relationship:

$$N_{CBPRU}=N_{RU242}\times N_{BPSCS}.$$

$N_{RU242}$ is a maximum quantity of RU242s that is included in the RU, and $N_{BPSCS}$ is a quantity of coded bits carried on each subcarrier of a single space-time stream.

In at least one embodiment, the physical layer packet extension thresholds information field includes a first packet extension threshold subfield corresponding to a first nominal packet padding value. The first packet extension threshold subfield indicates a first packet extension threshold, the first packet extension threshold indicates that a nominal packet padding value used by the communication apparatus 1500 in response to the second value being greater than or equal to the first packet extension threshold being the first nominal packet padding value, and the first nominal packet padding value being 20 microseconds.

In response to the second value being greater than or equal to the first packet extension threshold, the processing module 1510 determines that the nominal packet padding value used by the communication apparatus 1500 is the first nominal packet padding value.

In at least one embodiment, the physical layer packet extension thresholds information field includes a second packet extension threshold subfield corresponding to a second nominal packet padding value. The second packet extension threshold subfield indicates a second packet extension threshold, the second packet extension threshold indicates that a nominal packet padding value used by the communication apparatus 1500 in response to the second value being greater than or equal to the second packet extension threshold being the second nominal packet padding value, and the second nominal packet padding value being 16 microseconds.

In response to the second value being greater than or equal to the second packet extension threshold, and the second value being less than the first packet extension threshold, the processing module 1510 determines that the nominal packet padding value used by the communication apparatus 1500 is the second nominal packet padding value.

In at least one embodiment, the physical layer packet extension thresholds information field includes a third packet extension threshold subfield corresponding to a third nominal packet padding value. The third packet extension threshold subfield indicates a third packet extension threshold, the third packet extension threshold indicates that a nominal packet padding value used by the communication apparatus 1500 in response to the second value being greater than or equal to the third packet extension threshold being the third nominal packet padding value, and the third nominal packet padding value being 8 microseconds.

In response to the second value being greater than or equal to the third packet extension threshold, and the second value being less than the second packet extension threshold, the processing module 1510 determines that the nominal packet padding value used by the communication apparatus 1500 is the third nominal packet padding value.

In an example 6, the transceiver module 1520 is configured to receive a PPDU and a first packet extension threshold range from a first device. In response to a third value being within the first packet extension threshold range, the first packet extension threshold range indicates a nominal packet padding value used by the communication apparatus 1500 to send data to the first device. Different packet extension threshold ranges correspond to different nominal packet padding values. The third value is related to one or more parameters of an NSS, an RU size, and a modulation scheme that are used by the communication apparatus 1500.

In response to the third value being within the first packet extension threshold range, the processing module 1510 determines that the nominal packet padding value used by the communication apparatus 1500 is a nominal packet padding value corresponding to the first packet extension threshold range.

In at least one embodiment, the third value satisfies the following relationship:

$$x = f(NSTS, RU, Modulation)$$

x is the third value, NSS is an NSS used by the communication apparatus 1500, RU is an RU size used by the communication apparatus 1500, and Modulation is an order of a modulation scheme used by the communication apparatus 1500.

In at least one embodiment, the processing module 1510 is implemented as a processor or a processor-related circuit component, and the transceiver module 1520 is implemented as a transceiver or a transceiver-related circuit component, or a communication interface.

Figure 16:
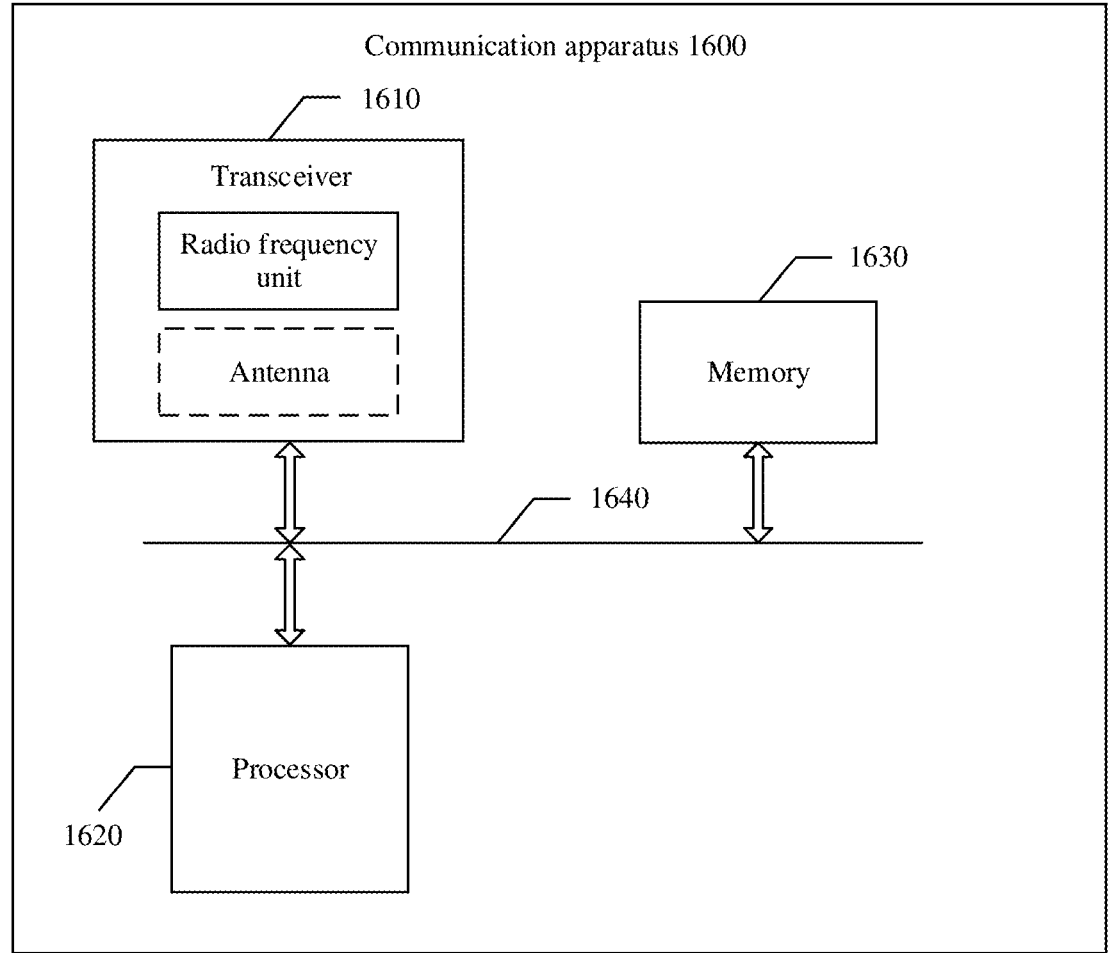
FIG. 16 is a schematic diagram depicting another structure of a communication apparatus according to at least one embodiment.

FIG. 16 shows a communication apparatus 1600 according to at least one embodiment. The communication apparatus 1600 is an AP or a STA, and implements functions of the first device or the second device in the methods provided in at least one embodiment. Alternatively, the communication apparatus 1600 is an apparatus that supports the first device to implement a corresponding function in the methods provided in at least one embodiment, or an apparatus that supports the second device to implement a corresponding function in the methods provided in at least one embodiment. The communication apparatus 1600 is a chip or a chip system. In at least one embodiment, the chip system includes a chip, or includes a chip and another discrete component.

The communication apparatus 1600 includes at least one processor 1620, configured to implement or support the communication apparatus 1600 to implement functions of the first device or the second device in the methods provided in at least one embodiment, for example, generating the foregoing PPDU. The communication apparatus 1600 further includes at least one memory 1630, configured to store program instructions and/or data. The memory 1630 is coupled to the processor 1620. The coupling in at least one embodiment is an indirect coupling or a communication connection between apparatuses, units, or modules in an electrical form, a mechanical form, or another form, and is used for information exchange between the apparatuses, the units, or the modules. The processor 1620 cooperates with the memory 1630. The processor 1620 executes the program instructions and/or the data stored in the memory 1630, so that the communication apparatus 1600 implements a corresponding method. At least one of the at least one memory is located in the processor.

The communication apparatus 1600 further includes a transceiver 1610, configured to communicate with another device by using a transmission medium, so that an apparatus in the communication apparatus 1600 communicates with the another device. For example, in response to the communication apparatus being a terminal, the another device is a network device. Alternatively, in response to the communication apparatus being a network device, the another device is a terminal. The processor 1620 sends and receive data by using the transceiver 1610. The transceiver 1610 is specifically a transceiver. The communication apparatus 1600 further includes a radio frequency unit. The radio frequency unit is independent of the communication apparatus 1600, or is integrated into the communication apparatus 1600. Certainly, the transceiver 1610 further includes an antenna, for example, a remote antenna independent of the communication apparatus 1600, or an antenna integrated into the communication apparatus 1600. In hardware implementation, the transceiver module 1520 is the transceiver 1610.

A specific connection medium between the transceiver 1610, the processor 1620, and the memory 1630 is not limited in at least one embodiment. In at least one embodiment, the memory 1630, the processor 1620, and the transceiver 1610 are connected by using a bus 1640 in FIG. 16. The bus is represented by using a thick line in FIG. 16. A manner of connection between other components is merely an example for description, and imposes no limitation. The bus is classified into an address bus, a data bus, a control bus, and the like. For ease of representation, only one thick line is used to represent the bus in FIG. 16, but this does not mean that there is only one bus or only one type of bus.

In at least one embodiment, the processor 1620 is a general purpose processor, a digital signal processor, an application-specific integrated circuit, a field programmable gate array or another programmable logic device, a discrete gate or a transistor logic device, or a discrete hardware component, and implements or performs the methods, steps, and logical block diagrams disclosed in at least one embodiment. The general-purpose processor is a microprocessor, any conventional processor, or the like. The steps of the methods disclosed with reference to at least one embodiment is directly executed and accomplished through a hardware processor, or is directly executed and accomplished by using a combination of hardware in the processor and a software module.

In at least one embodiment, the memory 1630 is a non-volatile memory, such as a hard disk drive (hard disk drive, HDD) or a solid-state drive (solid-state drive, SSD), or is a volatile memory (volatile memory), such as a random access memory (random-access memory, RAM). The memory is any other medium that carries or stores expected program code in a form of an instruction structure or a data structure and that is accessed by a computer, but is not limited thereto. The memory in at least one embodiment alternatively is a circuit or any other apparatus that implements a storage function, and is configured to store the program instructions and/or the data.

The communication apparatus in the foregoing embodiments is a terminal, a circuit, a chip used in a terminal, or another combined component, component, or the like that has a function of the terminal. In response to the communication apparatus being a terminal, the transceiver module is a transceiver, and includes an antenna, a radio frequency circuit, and the like. The processing module is a processor, for example, a central processing unit (central processing unit, CPU). In response to the communication apparatus being a component that has a function of the terminal, the transceiver module is a radio frequency unit, and the processing module is a processor. In response to the communication apparatus being a chip or a chip system, the transceiver module is an input/output interface of the chip or the chip system, and the processing module is a processor of the chip or the chip system.

In a product form, the AP and the STA in at least one embodiment is alternatively implemented by using one or more field programmable gate arrays (field programmable gate array, FPGA), programmable logic devices (programmable logic device, PLD), controllers, state machines, logic gates, discrete hardware components, any other appropriate circuits, or any combination of circuits that perform the various functions described in at least one embodiment.

The first device in at least one embodiment is an AP or a STA. The second device is an AP or a STA. The APs in various product forms have any function of the AP in the foregoing method embodiments. Details are not described herein again. The STAs in various forms have any function of the STA in the foregoing method embodiments. Details are not described herein again.

At least one embodiment further provides a communication system. Specifically, the communication system includes a second device and a first device, or further includes more first devices and second devices. For example, the communication system includes the second device and the first device that are configured to implement related functions in FIG. 9, FIG. 10, FIG. 12, or FIG. 14.

The first device is separately configured to implement a function related to the first device in FIG. 9, FIG. 10, FIG. 12, or FIG. 14. The second device is configured to implement a function related to the second device in FIG. 9, FIG. 10, FIG. 12, or FIG. 14. For example, the first device performs S901 to S902 in the embodiment shown in FIG. 9, and the second device performs S902 to S903 in the embodiment shown in FIG. 9. For example, the first device performs S1001 to S1002 in the embodiment shown in FIG. 10, and the second device performs S1002 to S1003 in the embodiment shown in FIG. 10. The first device performs S1001 to S1002 in the embodiment shown in FIG. 12, and the second device performs, for example, S1202 to S1203 in the embodiment shown in FIG. 10. The first device performs S1401 to S1402 in the embodiment shown in FIG. 14, and the second device performs, for example, S1402 to S1403 in the embodiment shown in FIG. 14.

At least one embodiment further provides a computer-readable storage medium, including instructions. In response to the instructions being run on a computer, the computer is enabled to perform the method performed by the first device or the second device in FIG. 9, FIG. 10, FIG. 12, or FIG. 14.

At least one embodiment further provides a computer program product, including computer program code. In response to the computer program code being run on a computer, the computer is enabled to perform the method performed by the first device or the second device in FIG. 9, FIG. 10, FIG. 12, or FIG. 14.

At least one embodiment provides a chip system. The chip system includes a processor, further includes a memory, and is configured to implement the function of the first device or the second device in the foregoing methods. The chip system includes a chip, or includes a chip and another discrete component.

At least one embodiment further provides a communication apparatus, including a processor and an interface. The processor is configured to perform the nominal packet padding value indication method in any one of the foregoing method embodiments, or the processor is configured to perform the nominal packet padding value determining method in any one of the foregoing method embodiments.

The communication apparatus is a chip. The processor is implemented by hardware, or is implemented by software. In response to the processor being implemented by the hardware, the processor is a logic circuit, an integrated circuit, or the like. In response to the processor being implemented by the software, the processor is a general-purpose processor. The general-purpose processor is implemented by reading software code stored in a memory. The memory is integrated into the processor, or is located outside the processor and exist independently.

The terms "system" and "network" is used interchangeably in at least one embodiment. "At least one" means one or more, and "a plurality of" means two or more. "And/or" describes an association relationship between associated objects, and represents that three relationships exist. For example, A and/or B represents the following cases: Only A exists, both A and B exist, and only B exists, where A and B is singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c represent: a, b, c, a and b, a and c, b and c, or a, b, and c, where a, b, and c is singular or plural.

In addition, unless otherwise stated, ordinal numbers such as "first" and "second" in at least one embodiment are for distinguishing between a plurality of objects, but are not intended to limit an order, a time sequence, priorities, or importance of the plurality of objects. For example, a first packet extension threshold and a second packet extension threshold are merely used to distinguish between different packet extension thresholds, but do not indicate that the two packet extension thresholds have different priorities, importance, or the like.

Indexes of the foregoing processes do not mean execution sequences in at least one embodiment. The execution sequences of the processes should be determined according to functions and internal logic of the processes, and should not be construed as any limitation on the implementation processes of at least one embodiment.

In addition, the term "for example" in at least one embodiment is used to represent an example or a description. Any embodiment or implementation solution described as an "example" in at least one embodiment should not be explained as being more preferred than another embodiment or implementation solution. That is, using the word "example" is intended to describe a concept in a specific manner.

All or some of the methods in at least one embodiment is implemented by using software, hardware, firmware, or any combination thereof. In response to the software being used to implement the embodiments, all or a part of the embodiments is implemented in a form of a computer program product. The computer program product includes one or more computer instructions. In response to the computer program instructions being loaded and executed on a computer, the procedures or functions according to at least one embodiment are all or partially generated. The computer is a general-purpose computer, a dedicated computer, a computer network, a network device, user equipment, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium is any usable medium accessible to the computer, or a data storage device, such as a server or a data center, integrating one or more usable media. The usable medium is a magnetic medium (for example, a floppy disk, a hard disk, or a magnetic tape), an optical medium (for example, a digital video disc (digital video disc, DVD for short)), a semiconductor medium (for example, an SSD), or the like.

The foregoing descriptions are merely specific implementations of at least one embodiment, but are not intended to limit the protection scope of at least one embodiment. Any variation or replacement readily figured out by a person skilled in the art within the technical scope disclosed in at least one embodiment shall fall within the protection scope of at least one embodiment. Therefore, the protection scope of at least one embodiment shall be subject to the protection scope of the claims.

What is claimed is:

1. A nominal packet padding value indication method, comprising:

generating, by a first device, a physical layer protocol data unit (PPDU), wherein the PPDU includes a physical layer packet extension thresholds present subfield and a physical layer packet extension thresholds field, a value of the physical layer packet extension thresholds present subfield is 1, the physical layer packet extension thresholds field includes a resource unit (RU) index bitmask subfield, a number of spatial streams (NSS) subfield, and a physical layer packet extension thresholds information field, wherein the physical layer packet extension thresholds information field includes a plurality of packet extension threshold subfield sets, each packet extension threshold subfield set indicates a modulation threshold corresponding to an NSS of n and an RU or a multiple resource unit (MRU) with an index b, b is an integer greater than or equal to 0, and the modulation threshold is used to determine a nominal packet padding value to be used, wherein a value range of n is a subset of [1, ..., N], N is an integer greater than 1, a value range of b is a subset of

[m, ..., M], m and M are integers greater than or equal to 0, and a value of a bit in the RU index bitmask subfield corresponding to an RU or MRU with an index y is 0, y is an integer greater than or equal to 0, the value range of b does not include y, wherein the physical layer packet extension thresholds field is usable to indicate the modulation threshold corresponding to the NSS of n and the RU with the index y; and in a packet extension threshold subfield set, the value of the bit in the RU index bitmask subfield corresponding to the RU or MRU with the index y is 0 indicates that a modulation threshold corresponding to the NSS of n, n is an integer greater than 0, and the RU or MRU with the index y is same with a modulation threshold corresponding to an NSS of n and an RU or MRU with an index m1, wherein m1 is a largest index in indexes that correspond to a bit being 1 in the RU index bitmask subfield and that are less than y;

and sending, by the first device, the PPDU.

2. The method according to claim 1, wherein multiple types of RUs or MRUs of different sizes correspond to a same RU allocation index.

3. The method according to claim 1, wherein the plurality of packet extension threshold subfield sets correspond to different nominal packet padding values.

4. The method according to claim 1, wherein the NSS subfield indicates a value of N.

5. A nominal packet padding value determining method, comprising:

receiving, by a second device, a physical layer protocol data unit (PPDU), wherein the PPDU includes a physical layer packet extension thresholds present subfield and a physical layer packet extension thresholds field, a value of the physical layer packet extension thresholds present subfield is 1, and the physical layer packet extension thresholds field includes a resource unit (RU) index bitmask subfield, a number of spatial streams (NSS) subfield, and a physical layer packet extension thresholds information field, wherein the physical layer packet extension thresholds information field includes a plurality of packet extension threshold subfield sets, each packet extension threshold subfield set indicates a modulation threshold corresponding to an NSS of n and an RU or a multiple resource unit (MRU) with an index b, b is an integer greater than or equal to 0, and the modulation threshold is used to determine a nominal packet padding value to be used, wherein a value range of n is a subset of [1, ..., N], N is an integer greater than 1, a value range of b is a subset of [m, ..., M], m and M are integers greater than 0, and a value of a bit in the RU index bitmask subfield corresponding to an RU or MRU with an index y is 0, y is an integer greater than or equal to 0, the value range of b does not include y, wherein the physical layer packet extension thresholds field is usable to indicate the modulation threshold corresponding to the NSS of n and the RU with the index y; and determining, by the second device, that a modulation threshold corresponding to the NSS of n and the RU or MRU with the index y is same with a modulation threshold corresponding to an NSS of n, n is an integer greater than 0, and an RU or MRU with an index m1 in a packet extension threshold subfield set, wherein m1 is a largest index in indexes that correspond to a bit being 1 in the RU index bitmask subfield and that are less than y.

6. The method according to claim 5, wherein multiple types of RUs or MRUs of different sizes correspond to a same RU allocation index.

7. The method according to claim 5, wherein the plurality of packet extension threshold subfield sets correspond to different nominal packet padding values.

8. The method according to claim 5, wherein the NSS subfield indicates a value of N.

9. An apparatus, comprising:

a memory storing program instructions; and at least one processor coupled to the memory, wherein the program instructions, when executed by the at least one processor, enable the apparatus to:

generate and send a physical layer protocol data unit (PPDU), wherein the PPDU includes a physical layer packet extension thresholds present subfield and a physical layer packet extension thresholds field, a value of the physical layer packet extension thresholds present subfield is 1, the physical layer packet extension thresholds field includes a resource unit (RU) index bitmask subfield, a number of spatial streams (NSS) subfield, and a physical layer packet extension thresholds information field, wherein the physical layer packet extension thresholds information field includes a plurality of packet extension threshold subfield sets, each packet extension threshold subfield set indicates a modulation threshold corresponding to an NSS of n and an RU or a multiple resource unit (MRU) with an index b, b is an integer greater than or equal to 0, and the modulation threshold is used to determine a nominal packet padding value to be used, wherein a value range of n is a subset of [1, . . . , N], N is an integer greater than 1, a value range of b is a subset of [m, . . . , M], m and M are integers greater than or equal to 0, and a value of a bit in the RU index bitmask subfield corresponding to an RU or MRU with an index y is 0, y is an integer greater than or equal to 0, the value range of b does not include y, wherein the physical layer packet extension thresholds field is usable to indicate the modulation threshold corresponding to the NSS of n and the RU with the index y; and in a packet extension threshold subfield set, the value of the bit in the RU index bitmask subfield corresponding to the RU or MRU with the index y is 0 indicates that a modulation threshold corresponding to the NSS of n, n is an integer greater than 0, and the RU or MRU with the index y is same with a modulation threshold corresponding to an NSS of n and an RU or MRU with an index m1, wherein m1 is a largest index in indexes that correspond to a bit being 1 in the RU index bitmask subfield and that are less than y.

10. The apparatus according to claim 9, wherein multiple types of RUs or MRUs of different sizes correspond to a same RU allocation index.

11. The apparatus according to claim 9, wherein the plurality of packet extension threshold subfield sets correspond to different nominal packet padding values.

12. The apparatus according to claim 9, wherein the NSS subfield indicates a value of N.

13. An apparatus, comprising:

a memory storing program instructions; and at least one processor coupled to the memory, wherein the program instructions, when executed by the at least one processor, enable the apparatus to:

receive a physical layer protocol data unit (PPDU), wherein the PPDU includes a physical layer packet extension thresholds present subfield and a physical layer packet extension thresholds field, a value of the physical layer packet extension thresholds present subfield is 1, and the physical layer packet extension thresholds field includes a resource unit (RU) index bitmask subfield, a number of spatial streams (NSS) subfield, and a physical layer packet extension thresholds information field, wherein the physical layer packet extension thresholds information field includes a plurality of packet extension threshold subfield sets, each packet extension threshold subfield set indicates a modulation threshold corresponding to an NSS of n and an RU or a multiple resource unit (MRU) with an index b, b is an integer greater than or equal to 0, and the modulation threshold is used to determine a nominal packet padding value to be used, wherein a value range of n is a subset of [1, . . . , N], N is an integer greater than 1, a value range of b is a subset of [m, . . . , M], m and M are integers greater than 0, and a value of a bit in the RU index bitmask subfield corresponding to an RU or MRU with an index y is 0, y is an integer greater than or equal to 0, the value range of b does not include y, wherein the physical layer packet extension thresholds field is usable to indicate the modulation threshold corresponding to the NSS of n and the RU with the index y; and determine that a modulation threshold corresponding to the NSS of n and the RU or MRU with the index y is same with a modulation threshold corresponding to an NSS of n and an RU or MRU with an index m1 in a packet extension threshold subfield set, wherein m1 is a largest index in indexes that correspond to a bit being 1 in the RU index bitmask subfield and that are less than y.

14. The apparatus according to claim 13, wherein multiple types of RUs or MRUs of different sizes correspond to a same RU allocation index.

15. The apparatus according to claim 13, wherein the plurality of packet extension threshold subfield sets correspond to different nominal packet padding values.

16. The apparatus according to claim 13, wherein the NSS subfield indicates a value of N.

\* \* \* \* \*